(12) United States Patent
Park

(10) Patent No.: US 7,276,191 B2
(45) Date of Patent: Oct. 2, 2007

(54) CROSSLINKED FOAM WHICH HAS INNER-CAVITY STRUCTURE, AND PROCESS OF FORMING THEREOF

(76) Inventor: Jang Won Park, Baeksae Haeundae villa B-202, 1504-11 Jung-dong, Haeundae-gu, Busan 614-809 (KR)

( * ) Notice: Subject to any disclaimer, the term of this patent is extended or adjusted under 35 U.S.C. 154(b) by 0 days.

(21) Appl. No.: 10/536,894

(22) PCT Filed: Jul. 20, 2004

(86) PCT No.: PCT/KR2004/001809

§ 371 (c)(1),
(2), (4) Date: May 27, 2005

(87) PCT Pub. No.: WO2005/063864

PCT Pub. Date: Jul. 14, 2005

(65) Prior Publication Data

US 2006/0083912 A1    Apr. 20, 2006

(30) Foreign Application Priority Data

Dec. 19, 2003 (KR) ............... 10-2003-0094161

(51) Int. Cl.
*B29C 44/02* (2006.01)
*B29C 67/20* (2006.01)

(52) U.S. Cl. .......... 264/49; 264/46.4; 264/50; 264/51; 264/154; 264/321

(58) Field of Classification Search ....... 264/45.1, 264/50, 46.4, 51, 49, 154, 321
See application file for complete search history.

(56) References Cited

U.S. PATENT DOCUMENTS

| | | | | |
|---|---|---|---|---|
| 3,133,853 A * | 5/1964 | Knox | ........... | 428/160 |
| 4,557,970 A | 12/1985 | Holtrop et al. | | |
| 5,147,589 A * | 9/1992 | Chang et al. | ........... | 264/45.1 |
| 5,632,057 A * | 5/1997 | Lyden | ........... | 12/146 B |
| 6,129,798 A * | 10/2000 | Yang | ........... | 156/79 |
| 6,192,966 B1* | 2/2001 | Yang | ........... | 160/370.23 |

FOREIGN PATENT DOCUMENTS

| | | |
|---|---|---|
| CA | 2 407 580 A1 | 11/2001 |
| JP | 3-152135 A | 6/1991 |
| JP | 2002-19047 A | 1/2002 |
| JP | 2003-64215 A | 3/2003 |
| KR | 1996-14538 B1 | 10/1996 |
| KR | 10-0632141 B1 | 1/2005 |
| WO | WO-95/30711 A | 11/1995 |

* cited by examiner

*Primary Examiner*—Allan R. Kuhns
(74) *Attorney, Agent, or Firm*—Birch, Stewart, Kolasch & Birch, LLP

(57) ABSTRACT

A method and device for forming a cross-linked foam and a cross-linked foam are provided. The method includes the steps of preparing at least one foaming material for cross-linked foaming, the foaming material processed to have a plane or three-dimensional shape; forming at least one interfacing pattern on a surface of at least one of the foaming material using at least one interfacing material that prevents chemical and physical interaction between the foaming materials; and forming a cross-linked foam by foaming the foaming material having the interfacing pattern thereon, the cross-linked foam having a foam body and an internally-formed surface.

30 Claims, 47 Drawing Sheets (2B)

CROSSLINKED FOAM WHICH HAS INNER-CAVITY STRUCTURE, AND PROCESS OF FORMING THEREOF

BACKGROUND OF THE INVENTION

1. Field of the Invention

The present invention relates to a cross-linked foam and a manufacturing method thereof. More specifically, it relates to a cross-linked foam having various inner cavity structures formed by an internally-formed surface and a method and device for forming the inner cavity structure simultaneously with a body of the cross-linked foam.

2. Discussion of the Related Art

FIG. 30 is a flow chart illustrating process steps for manufacturing cross-linked foams according to a related art. In step S10, source materials including main material such as diverse resins and other additives are first weighed in accordance with a designed mixture standard depending on what kind of cross-linked foam is fabricated. Then the weighed resins and additives are mixed with a cross-liking agent and a foaming agent in a hermetical mixer or kneader in a milling process. Therefore, a mixed chemical compound is prepared.

In step S20, the prepared chemical compound is provided into a calendar roll or an extruding machine. The calender roll transforms the chemical compound in a form of sheet or film, e.g., a two dimensional shape, and the extruding machine transforms the chemical compound in a form of pellet, e.g., a three dimensional shape.

Step S30 shows various process steps for forming a desired cross-linked foam. The process of forming the cross-linked foam may be classified into a pressure cross-linked foaming method (pressure cross-linked foam molding) and a normal pressure cross-linked foaming method depending on machinery and equipment for the processes considering shapes and properties of the desired cross-linked foam.

The pressure cross-linked foaming method mainly uses a metallic mold(s) to make the desired cross-linked foam, and applies heat and pressure to the chemical compounds after an input of the chemical compound into the inner parts of the metallic mold(s). Therefore, the cross-linked foam having a discontinuous pattern is formed in accordance with an inner part shape of the metallic mold(s) by a decomposition action of the foaming agent. Such pressure cross-linked foaming method may includes, for example, a compression-press cross-linked foam molding method that uses a press machine, and a injection-press cross-linked foam molding method that uses an injection machine, as shown in the step S30 of FIG. 30.

When using the compression-press cross-linked foam molding method, the source materials are first put into the opened mold, and then the mold including the source material is closed. When using the injection-press cross-linked foam molding method, the source materials are put into the airtight injection mold. However, both in the compression-press and injection-press cross-linked foam molding methods, once the source material is provided into the mold, equipment such as press machine applies heat and pressure to the closed mold to foam the source material into a cross-linked foam In step S40, the applied pressure is released, and then the closed mold is open to de-mold the cross-linked foam. The de-molded material is then cured for a time period and cooled down to a desired temperature. In step S50, the cured and cooled cross-linked foam is then cut and trimmed to be a final product.

Although not shown in FIG. 30, the pressure cross-linked foaming method may also include a compression-rotary press cross-linked foam molding method where heating rolls and metallic press/conveyer belts are used to apply heat and pressure to the source materials for the cross-linked foam by way of inserting the source materials between the heating rolls and the metallic press/conveyer belts. Alternatively, the compression-rotary press cross-linked foam molding method may insert the source materials continuously with other textile materials or rubbery materials between the heating rolls and the metallic press/conveyer belts, whereas the foaming of the source material is induced at a point where the pressure is discharged. Thus, the cross-linked foam may have continuous and uniform surface and cross section.

The pressure cross-linked foaming method applies heat and pressure directly to the source materials using the metallic moulds and rolls. The compression-press cross-linked foam molding method produces various large or small industrial foams, for example, EVA, PE, rubbery large or small sponge panels, shoe components, sports goods and accessories, and the like. The injection-press cross-linked foam molding method generally produces various industrial foams having individual shape, for example, EVA-based shoe components, sports protectors and goods, bags, accessories and the like. The compression-rotary press cross-linked foam molding method produces various industrial continuous roll types or large panel type foams, for example, EVA, PE or other rubbery continuous rolls.

Meanwhile, the normal pressure cross-linked foaming method is widely used for forming a cross-linked foam having a continuous and uniform cross section. Unlike the pressure cross-linked forming method, the normal pressure cross-linked foaming method produces the cross-linked foams without a direct heat and pressure infliction on the source materials. The normal pressure cross-linked foaming method is classified into a chemically cross-linked foaming method and an electron irradiation cross-linked foaming method.

The chemically cross-linked foaming method adds and mixes a chemical cross-linking agent, a foaming agent, and an EVA based resin into a polyethylene resin that is a main source material. Thereafter, the mixture is extruded into a pellet type foaming material as shown in step S10 and S20 of FIG. 30. Then, through the step S30 of FIG. 30, the foaming materials are inserted into a hopper of the extruding machine that includes screws, heat appliers and extruding dies, and then the heat pre-determined by the material composition is applied to the foaming materials. After that, the melted foaming material passes through the extruding dies to provide a continuous and uniform cross section, and then the foaming material is foamed thereby (in step S30).

The electron irradiation cross-linked foaming method applies electron rays to a foaming material that is formed by extruding a polyethylene or polypropylene resin mixed with other additives and agents, thereby cross-linking the materials and heating the foaming material up to the foaming-agent's decomposing temperature to make the foams. This electron irradiation cross-linked foaming method differs from the chemically cross-linked foaming method in a way that this uses the electron rays to achieve the cross-linking and then heats the cross-linked foaming material to foam the cross-linked foaming material.

Meanwhile, in step S40, the cross-linked foam is cured for a time period and then cooled down to a certain temperature. In step S50, the cross-linked foam is then cut, trimmed and designed to be a final product.

Although not shown, the normal pressure cross-linked foaming method includes a calender cross-linked foaming method in which a mixture of a polyvinyl chloride based or polyolefin based resin with a chemical foaming agent, a cross-linking agent (plasticizer in case of polyvinyl chloride), a stabilizer and a surfactant is used. The calender cross-linked foaming method transforms the mixture into a continuous and uniform foaming material using the extruding machine, the storage mill and the calender roll, and then the foaming material is heated in the heating chamber of a conveyor to be foamed under a normal pressure condition. Thereafter, the foaming material is cooled down and cured for a time period to form the foams, and then a roll-shaped foam is obtained by way of winding the foams on the take-up roll.

In step S60 of FIG. 30, the foams finally obtained through the pressure cross-linked foaming method or normal pressure cross-linked foaming method may be attached to one of other molded materials formed with a material that is the same as or different from the foaming material, textiles, woods and metallic materials depending on an end use, property and purpose of the foams and then be re-formed.

Such a re-forming method may be classified into a heat/cold mold compression re-molding, a cold mold compression re-molding, a cold mold vacuum re-molding, and a blow re-molding. The heat/cold mold compression re-molding method forces the cross-linked foam to be inserted into the mold, and then the cross-linked foam in the mold is cooled down after being heated and pressed. The cold mold compression re-molding method pre-heats the cross-linked foam and then inserts it into the mold, and thereafter, the cross-linked foam is pressed and cooled down to form the finalized foam. The cold mold vacuum re-molding method applies heat to the cross-linked foam at a pre-determined temperature and then sucks the heated foam into the mold using a vacuum pressure, and thereafter, the foam is cooled down and de-molded to form the finalized foam. Furthermore, the blow re-molding method applies heat to the cross-linked foam to be softened and then inserts the high-pressure gas or the liquid into the cross-linked foam, such that the cross-linked foam is re-molded in the mold and becomes the finalized foam after being de-molded.

The cross-linked foams formed by the related art cross-linked foam fabrication methods have the following characteristics. The compression-press cross-linked foam molding method of the pressure cross-linked foaming method inserts the source material shaped like a sheet type or a particle type into the mold, and then applies heat to that source material, thereby manufacturing the foam having a uniform physical property. Furthermore, since the injection-press cross-linked foam molding method heats the source material in the cylinder of the feeder and then melts the material so as to be inserted into the mold, the source material can have the uniform property in all parts and the produced cross-linked foams may also have the uniform physical characteristics.

Meanwhile, since the normal pressure cross-linked foaming method inserts the source materials having a particle type into the extruding machine and then heats them to be softened, the cross-linked foam material can have the uniform cross section and the uniform physical property in all parts, and also the finalized foam may have the uniform property in all portions. Although the source material is formed of the several substances in the related art cross-linked foam fabrication, the finalized foam also has the determined property having the uniform density because the source material is transformed into a single unified material before the foam process. Moreover, in the related art methods described above, the foaming process does not make the foam having different density or different properties in every each portion because the same source material is used in the foam process. The related art cross-linked foaming method is hard to manufacture an inner cavity structure having various shapes and formations inside the foam at the same time when the foam is made. Therefore, the related art cross-linked foaming method does not make the density differentiation inside the finalized foam.

Therefore, when manufacturing the cross-linked foam having the complex physical properties and functions, the related art separately makes the cross-linked foams and then cuts, grinds and attaches the foams in additional fabrication steps to produce the foam having the diverse densities and desired inner structures. However, such additional processes may cause the fabrication difficulty, the low throughput and the degradation of design and quality, such that the desired cross-linked foam having the various physical properties and inner structures is hardly obtained. Moreover, the related art described hereinbefore may increase the process steps and costs and may cause industrial wastes because the foams each having different physical properties and functions are separately manufactured and compounded.

To overcome the above-mentioned disadvantages, the Korean Patent Application No. 2003-45282 titled "Method for Manufacturing EVA Based Foam" has disclosed a method including steps of 1) mixing an EVA resin, a cross-linking agent, a foaming agent, a colorant, a filler, an additive, and a rubber or a resin which can be mixed with the EVA resin, 2) performing a low melting point spinning on the resultant composition, 3) making the spinning filament into a tow or staple fiber to be used as a first material, selecting a second material from a group consisting of a water soluble PVA based staple fiber, a polyester based staple fiber and a natural fiber, and producing a non-woven fabric by mixing the first and second materials, 4) melting out a dissolved matter from the non-woven fabric, and 5) cross-linked foaming the non-woven fabric. This method has merits in that an air pore structure is formed in the foam. However, the method disclosed in the above-described Korean Patent Application No. 2003-45282 is not concerned with a method for designing or controlling the shape and structure of the inner surface shape and structure of the foam, whereby the cross-linked foam could not have the different densities and functions in the parts.

SUMMARY OF THE INVENTION

Accordingly, the present invention is directed to cross-linked foams and a manufacturing method and device thereof that substantially obviates one or more of the problems due to limitations and disadvantages of the related art.

An advantage of the present invention is to provide a method and device for forming a cross-linked foam that has at least one inner cavity structure and a cross-linked foam made by the method and device.

Another advantage of the present invention is to provide a method of forming cross-linked foam in which at least one interfacing pattern is formed between multi-layered foaming material and the interfacing pattern forms an inner cavity structure during a foaming process, and a cross-linked foam made by the method.

Another advantage of the present invention is to provide a method of forming a cross-linked foam in which a plurality of inner cavity structures separated from each other are formed in the same cross-linked foam, and a cross-linked foam made by the method.

Another advantage of the present invention is to provide a method of forming a cross-linked foam in which at least one independent molded layer separable from an internally-formed surface is formed, and a cross-linked foam made by the method.

Another advantage of the present invention to provide a method of forming a cross-linked foam in which a pressure and a volume of air in an inner cavity structure can be controlled diversely, and a cross-linked foam made by the method.

Another advantage of the present invention is to provide a method of forming a cross-linked foam in which an inner cavity is filled with materials that are the same as or different from the cross-linked foam, and a cross-linked foam made by the method.

Another advantage of the present invention is to provide a method of forming a cross-linked foam in which an inner cavity structure can easily be utilized as an air passage or a shock absorber, and a cross-linked foam made by the method.

Another advantage of the present invention is to provide a method of forming a cross-linked foam that can decrease a weight and increase physical properties and functions such as a shock absorbing power, a shape recovery force and resilience, etc., and a cross-linked foam made by the method.

Another advantage of the present invention is to provide a cross-linked foam that has differentiated physical properties and functions at its each portion.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a cross-linked foaming method comprises preparing at least one foaming material for a cross-linked foaming, the foaming material processed to have a plane or three-dimensional shape; forming at least one interfacing pattern on a surface of at least one of the foaming material using at least one interfacing material that prevents chemical and physical interaction between the foaming materials; and forming a cross-linked foam by foaming the foaming material having the interfacing pattern thereon, the cross-linked foam having a foam body and an internally-formed surface.

In another aspect, the present invention provides a cross-linked foam that comprises a foam body; and at least one inner cavity structure formed inside the foam body, wherein the foam body and the inner cavity structure are formed simultaneously.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings.

DETAILED DESCRIPTION OF THE ILLUSTRATED EMBODIMENTS

Reference will now be made in detail to illustrated embodiments of the present invention, examples of which are shown in the accompanying drawings. Wherever possible, similar reference numbers will be used throughout the drawings to refer to the same or similar parts.

Figure 31:
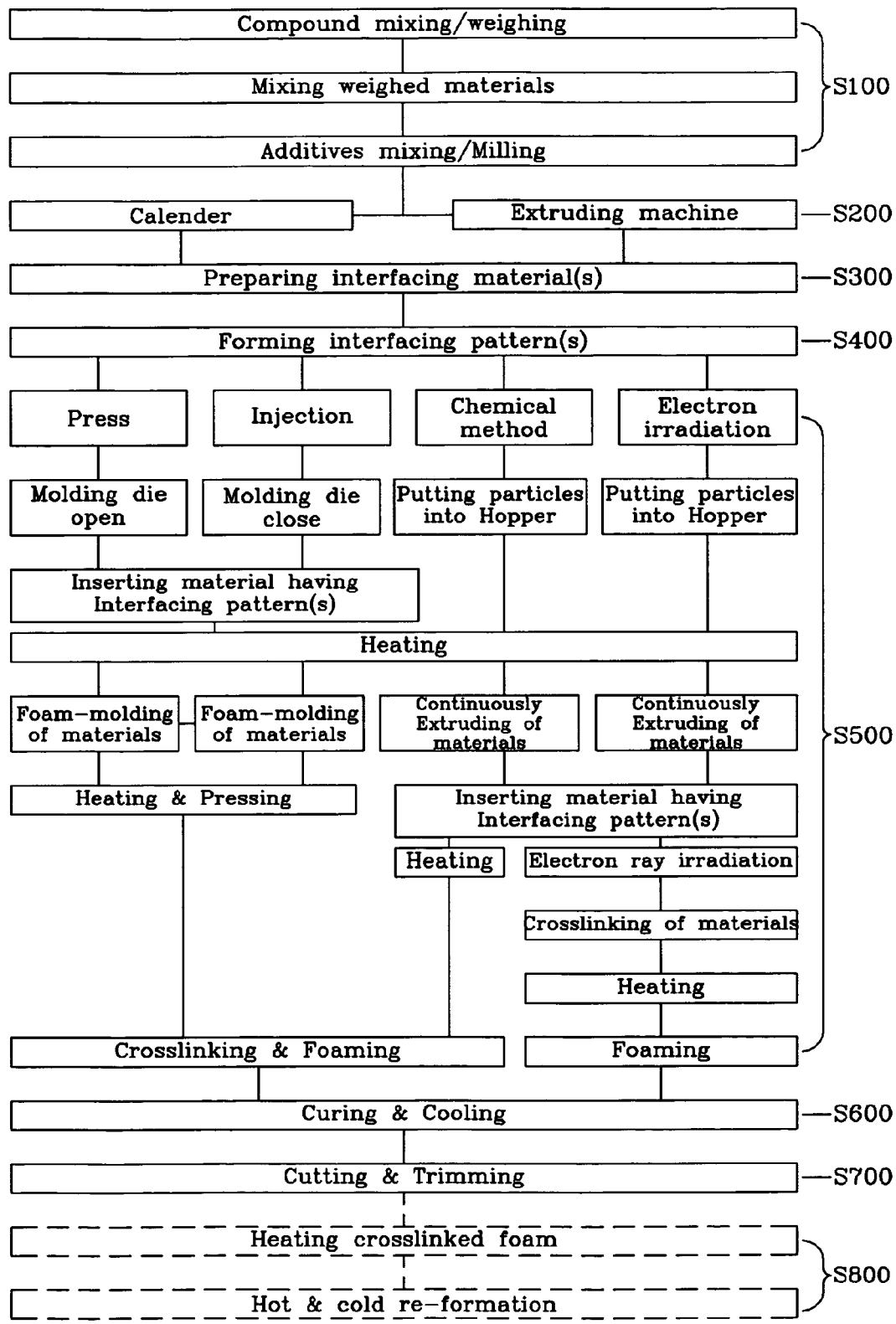
FIG. 31 is a flow chart illustrating process steps for manufacturing cross-linked foams according to the present invention.

FIG. 31 is a flow chart illustrating process steps for manufacturing cross-linked foams according to the present invention. As shown in FIG. 31, the forming method of the present invention includes a step of mixing source materials (S100), a step of shaping the mixed source materials (S200), a step of selecting an interfacing material(s) (S300), a step of forming an interfacing pattern(s) using the selected interfacing material (S400), a step of foaming a foaming material having the interfacing pattern to form a foam (S500), a step of cooling and curing the foam (S600), and a step of finalizing the foam (S700).

The step S100 selects a main resin as a source material among the various materials depending on the desired cross-linked foam's availabilities and physical properties, and then mixes the main resin with the other additives and agent. After planning the material composition, the source material and the sub materials are weighed by desired amounts in accordance with the material composition plan, and then the source material and sub materials are mixed in the airtight mixer or kneader. The step S100 may include adding a cross linking agent and a foaming agent into the mixture using an open mill.

The source material used in the step S100 can be selected from synthetic materials each having a possibility of becoming a foam using one of various cross-linked foaming methods. For example, such synthetic materials may include synthetic resins such as an EVA based resin, a polyolefin based resin containing PEs of a variety of densities, a polyvinyl based resin, a polyurethane basted resin, and LDPE (low density polyethylene)-added EVA, a copolymer thereof, a blend thereof, or a mixture thereof; a natural or synthetic rubber constituted by a mixture of a natural rubber, a styrene butadiene rubber (SBR) based, a poly-butadiene rubber (BR) based, an poly-isoprene rubber (IR) based, a chloroprene rubber (CR) based, an nitrile rubber (NRB) based, an EPDM rubber based, an ethylene-propylene rubber (EPR) based, and an acryl rubber (AR) based rubber, and/or an styrene butadiene rubber (SBR) added neoprene rubber (NR); and a composite material including an EPDM rubber added ethylene-vinyl acetate (EVA) and a poly-vinyl chloride (PVC) added nitrile butadiene rubber (NBR).

However, it is recommended to adopt EVA (ethylene-vinyl acetate) that can contain a variable percentage of an amount of vinyl acetate (VA %) or the polyethylene (PE) based synthetic resin having various densities as the source material.

When more than one source material among the above-mentioned materials is properly mixed with the sub materials to be a composite through the above-mentioned composition process, the composite becomes a foaming material with the foaming action suppressed by the calender roll or the extruder. At this time, the foaming material has a planar shape such as a film or sheet, or a three-dimensional shape such as a pellet, at step S200.

The foaming material according to the present invention is not limited to a specific shape or type, but the foaming material is weighed whenever it is used as a particle or sheet type at every foaming process. Further, when the foaming material is applied to the specific embodiment described hereinafter, the foaming material is recommended to have a plane shape, particularly a film shape, which has a precise surface roughness, regarding the advisable use. Namely, the EVA based or PE based film, or the material having the same surface roughness as them can be used for the foaming material.

Meanwhile, when converting a primary foaming material, such as the composite completed by the injection machine or the pellet having the foaming-inhibited state, into a secondary foaming material having the foaming-inhibited characteristic by the injection method, the primary foaming material having the particle type is softened inside a cylinder at a low temperature, e.g., 70-90 degrees Celsius, and then the softened primary foaming material is filled into an empty space of the molding die to perform the low temperature formation, e.g., less than 50 degrees Celsius. Therefore, at this time of forming the second foaming material, the foaming agent inside the primary foaming material is not decompositioned while the secondary foaming material is made.

When the press-type method is utilized, the second foaming material can be obtained if the primary foaming material having the sheet, film or pellet shape formed by the mold is processed at a condition where the foaming agent is not decompositioned (for example, at a heating temperature of less than 60-80 degrees Celsius, under the pressure of more than 150 Kg/cm$^2$, and at a cooling temperature of less than 50 degrees Celsius).

The normal pressure cross-linked foaming method, which forms the continuous pattern shape unlike the pressure cross-linked foaming method, softens the primary foaming material using the extrusion method similar to the injection method, and then produces the material having the continuous and uniform cross section. Therefore, any type of shapes of foaming material can be applied to the present invention only if it is possible to form the interfacing pattern on the foaming material with the foaming action suppressed.

Once the foaming material is prepared (S300), at least one interfacing pattern is formed on the surface of the foaming material in a specific shape (S400).

The interfacing pattern is for forming an internally-formed surface that forms an inner cavity structure in the cross-linked foam during the cross-linked foaming process, and the interfacing pattern is also for preventing the physical or chemical interaction between the foaming materials that face each other across the interfacing pattern.

The material for the interfacing pattern may be liquids having viscosity, powder or solid having a certain shape such as films, which is able to prevent the interaction between the foaming materials during the cross-linked foaming process. For example, the interfacing material may be selected from a group consisting of natural or synthetic paints or inks, natural or synthetic resins, papers, textiles, non-woven fabrics, and rubbery materials. Additionally, when selecting the interfacing material, it is considerable to be easily attached to the foaming material, to have the repeated reappearance during the foaming process, to have the possibility of obstructing the cubical expansion of the foam during the foaming process, or to have the easy elimination from the cross-linked foam if required after the foaming process.

The formation of the interfacing pattern may be achieved by printing, transcription, coating, deposition, lamination, spray, cloth attachment, inserting, attaching, or a modification thereof. In fact, any other method can be used as long as it is able to form the interfacing material on the surface of the foaming material. However, when the ink or the like containing various kinds of resins dissolved is used as an interfacing material, the printing method is desirably adopted in forming the interfacing pattern. Further, if more than two interfacing patterns are formed, each of the interfacing patterns may be formed with the same or different material. A foaming agent, which is the same as or different from the foaming agent contained in the foaming material, may be added to the interfacing material.

Moreover, a step of combining a foaming material having no interfacing pattern with the foaming material having the interfacing pattern may be further added. The foaming material having no interfacing pattern may be the same material as or different material from the foaming material having the interfacing pattern. A step of adding the material that is the same as or different from the foaming material having the interfacing pattern to the combined foaming material may be further added. A step of winding the foaming material having the interfacing pattern on a roll may further be added to easily separate the foaming material.

After completing the formation of the interfacing pattern on the foaming material, the cross-linked foaming process is performed by the pressure cross-linked foaming method, the normal pressure cross-linked foaming method, or any modified method thereof. According to the press-type method and the injection-type method of the pressure cross-linked foaming method, the molding die is opened and then the foaming material having the interfacing pattern is filled automatically or hand-operatedly into the hollow space of the molding die, thereby foaming the foaming material by applying heat and pressure thereto. In the chemical or electron irradiation method of the normal pressure cross-linked foaming method, the foaming material having the interfacing pattern is provided before the heating process for foaming and then the foaming process is performed (step S500 of FIG. 31). If the heat is applied to the foaming material or if the electron rays are irradiated on the foaming material during the cross-linked foaming process, the foaming material is cross-linked in a gel state by the heat infliction or the electron irradiation.

However, the foaming materials neighboring each other across the interfacing pattern are not physically/chemically coupled and interconnected until they reach the step of foaming. At this state, the foaming materials cubically expand at a specific rate and then the cross-linked foams are made. Portions of the foaming materials corresponding to the interfacing patterns are also cubically expanded at the same ratio as the other portions during the foaming process. However, because the physical and chemical connection of the foaming material is prevented by the interfacing pattern, an internally-formed surface is formed in the cross-linked foam at a position corresponding to the interfacing pattern. The internally-formed surface forms an empty space, i.e., an inner cavity. A shape and structure of the inner cavity can be easily controlled by changing a shape or material of the material for the interfacing pattern irrespective of manufacturing equipment and facilities. A certain amount of gas (for example, nitrogen gas ($N_2$), carbon dioxide ($CO_2$)) that is generated by a decomposition action of the foaming agent during the foaming process is trapped into the space (the inner cavity) formed by the internally-formed surface. The gas pressure of the inner cavity can be properly controlled by adding a certain amount of foaming agent or material that can increase a gas generation to the interfacing material before the foaming process. Whereas, the gas pressure in the inner cavity may be controlled by an external air-pumping device.

If the pressure cross-linked foaming method is adopted to form the cross-linked foam of the present invention, a material same as or different from the foaming material having the interfacing pattern may be input into a residual space of the mold where the foaming material having the interfacing pattern has already been laid, and then those materials may be foamed simultaneously to form the cross-linked foam. A combination or modification of the pressure cross-linked foaming method and the normal pressure cross-linked foaming method can be adopted for an embodiment of the present invention.

After the completion of foaming process, the foams are cooled down and cured to stabilize the property and size thereof at a predetermined condition at step S600 of FIG. 31. Thereafter, the foams are cut and trimmed at step S700, thereby completing the cross-linked foaming process according to the present invention. However, it is possible to re-mold the cross-linked foams using a compression molding, a vacuum molding, or a blow molding that injects air or liquid, depending on a usage of the cross-linked foam as in step S800 of FIG. 31. Although the primarily formed foams are re-molded, the shape and structure of the internally-formed surface are not affected by the mold's shape and structure or other equipment during the re-molding process. Meanwhile, the foaming process of the present invention may further include a step of inserting or filling a material that is the same as or different from the foaming material into the empty space formed by the internally-formed surface of the foam and then foaming the foaming material having the inserted or filled material. Also, the present invention may further include a step of forming an air passage in the foam extending from the surface of the foam to the internally-formed surface and then injecting a material that is the same as or different from the foaming material into the space formed by the internally-formed surface through the air passage before the foaming process. The method of injecting the material through the air passage makes it possible that a portion of the injected material is also formed on the surface of the foam, such that the foam can have the unified/integrated appearance between the internally-formed surface and the outer foam surface, wherein the material in the space formed by the internally-formed surface can be easily recognized from the outside. The type and phase of the material to be injected, filled or inserted into the space formed by the internally-formed surface is not limited, and the injected, filled or inserted material can be adhered to the internally-formed surface using an adhesive material depending on a kind of inserting material.

Now, a method for forming and controlling the shape of the inner cavity structure of the cross-linked foam will be explained in detail in accordance with the present invention.

Material Preparation for Manufacturing Cross-Linked Foam

In the present invention, the selection of a source material for manufacture of a foam is provided in the following three types. Tables 1-4 provide various examples of a material composition for forming a cross-linked foam according to the present invention.

Type A: This type mainly includes an EVA based resin and is classified into A1 and A2 types. This type of materials includes EVA resin having appropriate vinyl acetate content, a melting index and density as a main material. A foaming agent, a cross-linking agent, pigments, a variety of fillers, and functional additives are selectively added into and mixed with the main material depending on the foam application and fabrication process.

Table 1 of Type A (unit: Phr)

| Use | Material of Compound | Type A1 | Type A2 |
|---|---|---|---|
| EVA resin | EVA (VA 21%) | 100 | — |
| EVA resin | EVA (VA 15%) | — | 100 |
| foaming agent | AC based foaming agent | 12.0 | 15.5 |
| cross-linking agent | DCP (dicumyl peroxide) | 1.0 | 0.5 |
| filler | MgCO$_3$ | 6.0 | 3.5 |
| additive | Stearic acid | 0.8 | 1.0 |
| pigment | Pigment | 0.05 | 0.05 |

Type B: This type is classified into type B1 and type B2. The type B1 adopts an EVA based resin as a main material and includes polyethylene resin among the variety of synthetic resins as a sub material. On the contrary, the type B2 adopts the polyethylene resin as a main material, and includes the EVA based resin as a sub material. Furthermore, similar to the type A, a foaming agent, a cross-linking agent, pigments, a variety of fillers, and functional additives are selectively added into and mixed with the main and sub materials.

The main and sub materials for the type B are not confined to the EVA based resin and the polyethylene based resin, but many different synthetic resins such as polypropylene based resin, polyisobutylene based resin or poly olefine based resin may be selected as the main or sub materials.

Table 2 of Type B (unit: Phr)

| Use | Material of Compound | Type B1 | Type B2 |
|---|---|---|---|
| EVA resin | EVA (VA 15%) | 95.0 | 10.0 |
| synthetic resin | LDPE (low density polyethylene) | 5.0 | 90.0 |
| foaming agent | AC based | 1.0 | 14.0 |
| cross-linking agent | DCP (dicumyl peroxide) | 8.0 | 0.8 |
| filler | CaCO$_3$ | 7.0 | — |
| pigment | Pigment | 0.05 | 0.05 |

In case a composite material of the type B2 is cross-linked and foamed by an electron irradiation method, DCP (dicumyl peroxide) that is a kind of organic peroxide based cross-linking agent may be excluded.

Type C: For the main material, this type may include a variety of synthetic resins, such as an EVA based resin and polyethylene based resin, a natural rubber, or a synthetic rubber such as styrene butadiene rubber (SBR), poly-butadien rubber (BR), nitrile rubber (NRB), polyisoprene rubber, butyl rubber (IR), chloroprene rubber (CR), neoprene rubber (CR), EPDM rubber, polymer blended NBR, acryl rubber (AR), Urethane rubber (UR), and silicon rubber (SR), etc. A foaming agent, a cross-linking agent, pigments, a variety of fillers, and functional additives are selectively added into and mixed with such main materials. This type C is classified into type C1, C2, C3, C4 and C5. Meanwhile, the type C4 and C5 include at least one of a variety of natural and synthetic rubbers as a main material, and additionally include a foaming agent, a cross-linking agent, pigments, a variety of fillers, and functional additives as a sub material.

Table 3 of Types C1, C2 and C3 (unit: Phr)

| Use | Material of Compound | Type C1 | Type C2 | Type C3 |
|---|---|---|---|---|
| Synthetic resin | EVA (VA 15%), PE(LDPE) | EVA 90.0 | EVA 90.0 | PE 50.0 |
| rubber | Synthetic rubber | EPDM-5.0, IR-5.0 | SBR-10.0 | EPDM-20.0 |
| Synthetic resin foaming agent | AC based(C1, C2), DPT based(C3) | — | — | 30.0 |
| Cross-linking agent | DCP (dicumyl peroxide) | 3.5 | 4.0 | 4.0 |
| | MgCO$_3$ | 0.8 | 1.0 | 0.9 |
| filler | MgCO$_3$ | 15.0 | 15.0 | 40.0 |
| | clay | — | — | 40.0 |
| additive | paraffin wax | — | — | 10.0 |
| | zinc oxide | 2.0 | 1.5 | — |
| | stearic acid | 1.0 | 1.0 | 1.0 |
| | titanium oxide | 2.0 | 3.0 | — |

Table 4 of Types C4 and C5 (unit: Phr)

| Material of Compound | Type C4 | Type C5 |
|---|---|---|
| SBR rubber | 30.0 | — |
| Neoprene rubber | 70.0 | 100 |
| Carbon Black | 10. | — |
| ZE-O-SIL | 10. | 10.0 |
| Tellus-oil | — | 23.0 |
| Stearic Acid | 5.0 | 1.5 |
| Paraffin-oil | 30.0 | — |
| Diethyl thiouria | 2.5 | — |
| Zinc dimethyl dithiocarbamate | 1.7 | — |
| SRF | — | 10.0 |
| Clay | — | 5.0 |
| MgO | 20.0 | 3.0 |
| ZnO | 10.0 | — |
| Sulfur | 1.3 | 0.2 |
| Blowing Agent | 9.0 | 10.0 |

First Embodiment

Figure 1:
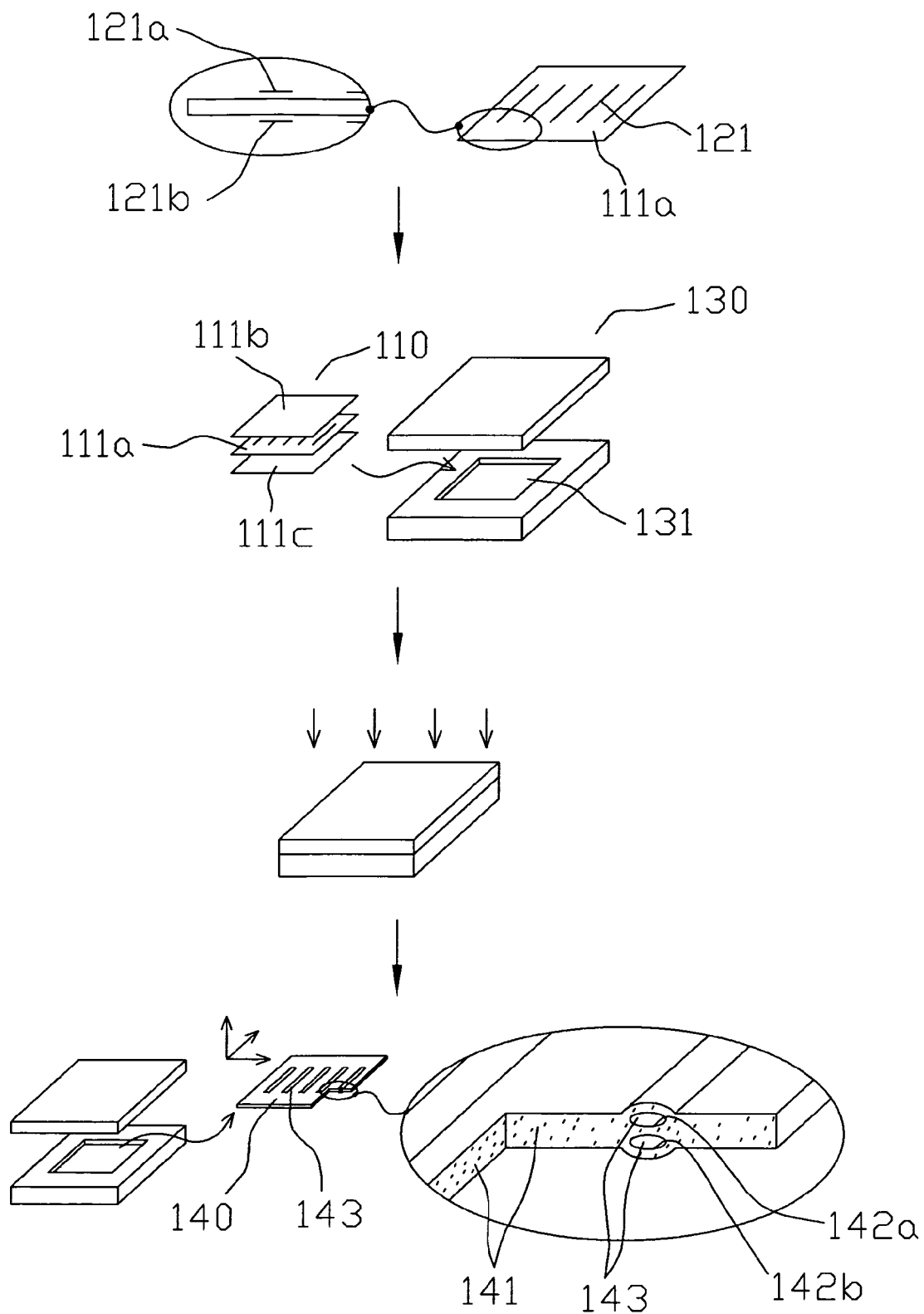
FIG. 1 illustrates a manufacturing process of a cross-linked foam having more than one internally-formed surface according to a first embodiment of the present invention.

FIG. 1 illustrates a manufacturing process of a cross-linked foam having more than one internally-formed surface according to a first embodiment of the present invention.

Material Preparation: Three sheets of film type materials 111a, 111b and 111c having a foaming rate of 150%, which are calender-molded, are cut to have the size of thickness 2 mm, width 100 mm, and length 100 mm.

Interfacing Pattern Formation: A silkscreen printing is performed on both sides of the first film type material 111a among the three sheets of film type materials 111a, 111b and 111c. Interfacing patterns 121a and 121b are printed on the first film type material 111a in a thickness of 70 micrometers by using a urethane-resin-based ink and the resultant structure is dried at a temperature of 60 degrees Celsius for 15 minutes. The interfacing patterns 121a and 121b have five-striped pattern shapes each having a width 2 mm and a length 50 mm, and each of the five-striped pattern shapes are spaced apart from each other by a distance of 8 mm.

Foaming Process: FIG. 1 shows a compression-press cross-linked foam molding method. In this method, the film type materials 111b and 111c are joined to the top and bottom surfaces of the first film type material 111a, respectively, thereby obtain a combination 110. The weight of the combination is measured, and the combination 110 is injected into a cavity 131 of a molding die 130 which has a width 100 mm, a length 100 mm, and a depth 6 mm. Then the combination 110 is heated and pressed for 480 seconds at a temperature of 150 to 160 degree C. under a pressure of 150 Kg/cm², such that the film type materials 111a, 111b and 111c are cross-linked and foamed.

Thereafter, the pressure is released, and sequentially the molding die 130 is quickly opened, thereby foaming the combination 110 to fabricate a foam 140. At this time, the foam 140 is foam-molded in accordance with the shape of the cavity 131 of the molding die 130. Therefore, the internally-formed surfaces 142a and 142b each forming the inner cavity 143 are formed at the intermediate portion of an inside 141 of the foam 140 correspondingly to the shape (stripes) of the interfacing pattern 121. Since the interfacing pattern 121 are consisting of the five-striped patterns each of which has a width 2 mm and a length 50 mm, five upper and lower inner cavities 143 are formed in the inside 141 of the foam, wherein each of the internally-formed surfaces 142a and 142b is a tube type having a diameter 3 mm and a length 75 mm. Due to the distance of 8 mm among the five-striped patterns, there are formed membranes, i.e., a cross-sectional portion between neighboring striped patterns 141, each of which has a width of 12 mm. The internally-formed surfaces 142a and 142b and the inner cavities 143 are formed in the foam irrespective of the shape of the cavity 131 of the molding die 130, but has a correlation with the interfacing pattern 121. The foam 140 has a dimension of width 150 mm, a length 150 mm, and a thickness 12 mm.

Second Embodiment

Figure 2:
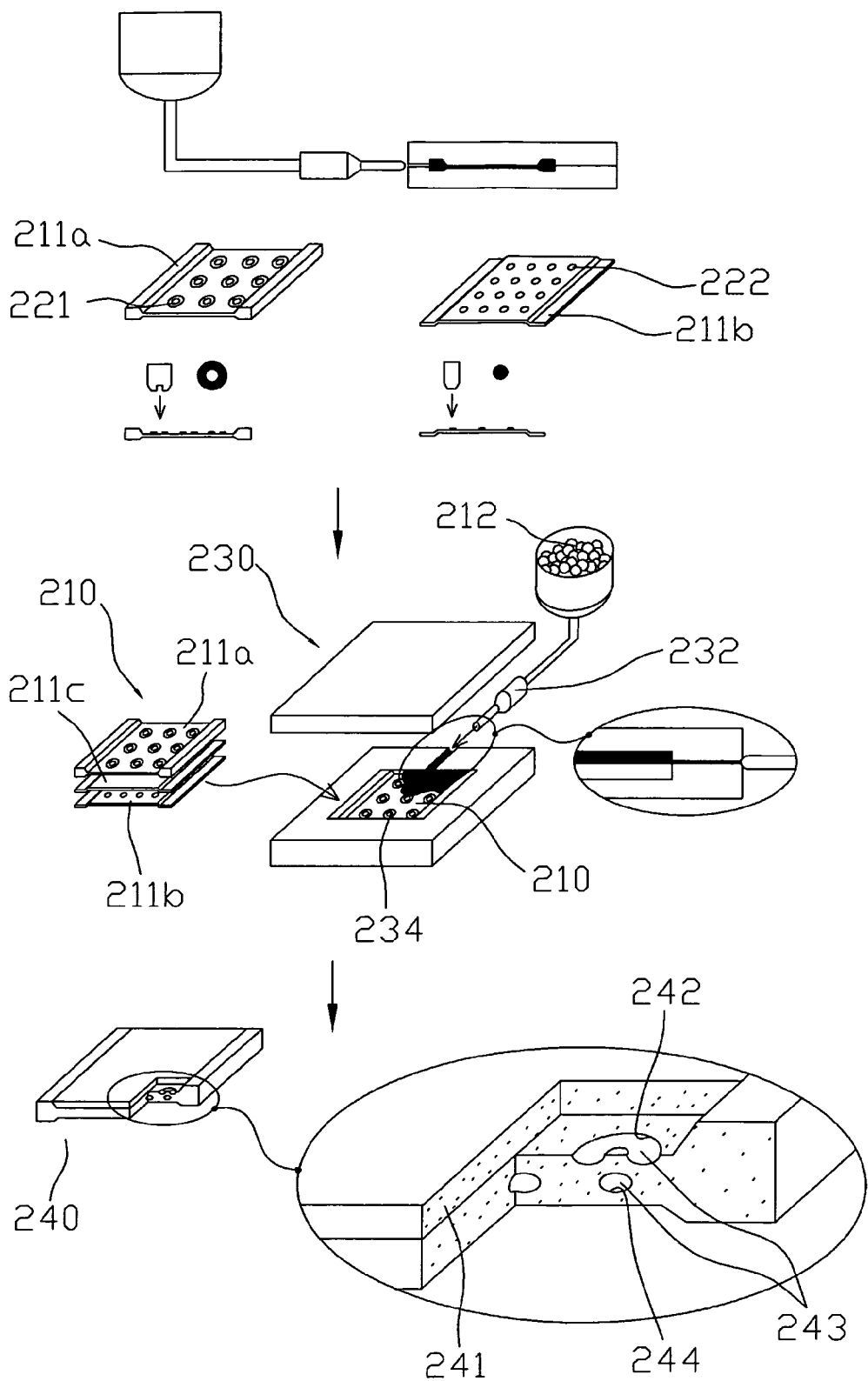
FIG. 2 illustrates a manufacturing process of a cross-linked foam according to a second embodiment of the present invention.

FIG. 2 illustrates a manufacturing process of a cross-linked foam according to a second embodiment of the present invention. The second embodiment is a modification of the first embodiment in which a double-layered internally-formed surfaces are formed in the foam.

Material Preparation: Three sheets of white materials 211a, 211b, and 211c having a foaming rate of 150% are injection-molded.

Interfacing Pattern Formation: Each surface of the first and second white materials 211a and 211b is pad printed to form first and second interfacing patterns 221 and 222. The first interfacing pattern 221 is formed on the first white material 211a, and has nine doughnut type patterns each of which has an inner circle having a diameter of 2 mm arranged at the center of the doughnut type pattern and an outer circle having a diameter of 6 mm. The second interfacing pattern 222 is formed on the second white material 211b, and is designed with sixteen circle patterns each having a diameter of 2 mm. The interfacing patterns 221 and 222 are printed by a thickness of 20 micrometers using acrylic-resin ink, and then thermal-dried at a temperature of 25 degrees Celsius for 30 minutes.

Foaming Process: In case of injection molding, the third material 211c is inserted between the printed surfaces of first and second materials 211a and 211b, thereby forming a combination 210. Then, the combination 210 is disposed into a molding die 230, and the molding die 230 is closed. A black-particle-type material 212 is injected into a residual space 234 of the molding die 230. The black-particle-type material 212 is heated, softened and melted in a material injector 232 at a temperature of 80 to 100 degrees Celsius before it is injected. Thereafter, the combination 210 and the injected material 212 are heated and pressed for 420 seconds at 170 degrees Celsius under a pressure of 6.5 Kg/cm² so as to prepare for a foaming process.

Thereafter, the pressure is released and subsequently the molding die 230 is quickly opened, thereby obtaining a single foam 240 having black and white colors derived from the combination 210 and material 212. The foam 240 has first and second internally-formed surfaces 242 and 244 forming an inner cavity 243 in an inside 241 of the foam 240. The first interfacing pattern 221 constituted by the nine doughnut type patterns on the material 211a becomes nine first internally-formed surfaces 242 each having a width of 3 mm and a diameter of 9 mm. Sixteen second internally-formed surfaces 244 each having a diameter of 3 mm are formed at the inside 241. The second internally-formed surfaces 244 are derived from the second interfacing pattern 222 having the sixteen circle patterns.

Third Embodiment

Figure 3:
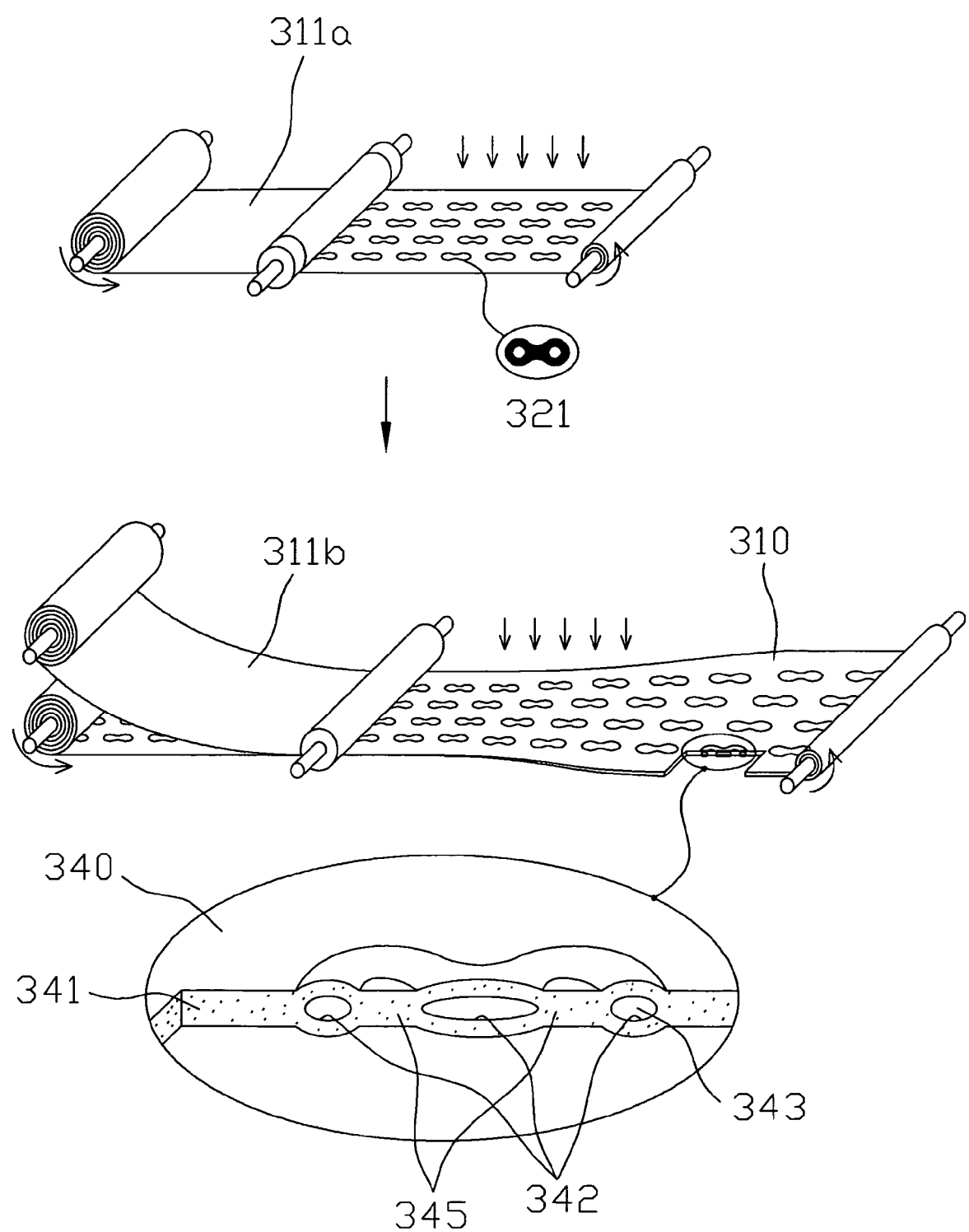
FIG. 3 illustrates a manufacturing process of a cross-linked foam according to a third embodiment of the present invention.

FIG. 3 illustrates a manufacturing process of a foam according to a third embodiment of the present invention. The third embodiment is a modification of the second embodiment.

Material Preparation: Two sheets of materials 311a and 311b having a foaming rate of 150% are extrusion-molded or calender-molded. Each of the materials has a width of 40 inches, a length of 10 yards, and a thickness of 2 mm.

Interfacing Pattern Formation: Peanut-shaped patterns 321 constituted by a pair of adjacent circles each of which has a diameter 6 mm, are arranged on the first material 311a. Each of the adjacent circles of the peanut-shaped patterns 321 has a centric circular opening having a diameter of 2 mm. Each of the peanut-shaped patterns are printed using a epoxy-resin-based ink on the first material 311a at a thickness of 40 micrometers with a margin of 10 mm from the up-and-bottom and left-and-right neighboring peanut-shaped patterns, and thermal-dried at a temperature of 60 degrees Celsius for 15 minutes.

Foaming Process: In case when the chemical or electron irradiation method is adopted, the second material 311b where the patterns 321 are not printed is temporarily joined and attached to the first material 311a through a compression roll and the like. Alternatively, a sheet type material rather than the second material 311b is attached to the surface of the first material 311a. Thus-obtained combination 310 is prepared in the step prior to a heating process in case of chemical cross-linked foam molding and in the step prior to an electron irradiation process in case of electron irradiation cross-linked foam molding. The combination 310 is heated and then cross-linked at a temperature 180 to 200 degrees Celsius through the chemical cross-linked foam molding, or irradiated by electron beams and heated through the electron irradiation cross-linked foam molding, thereby permitting the combination 310 to be foamed as a plane type foam 340. In an inside 341 of the plane type foam 340 which is foamed uniformly and continuously in a thickness of 6 mm, a peanut-shaped internally-formed surface 342 that forms an inner cavity 343 having a length of 9 mm and two columns 345 each of which has a width of 3 mm in between the portions of the inner cavity 343 are formed. The peanut-shaped internally-formed surfaces 342 are spaced apart from each other by a distance of 15 mm in the inside 341.

The inner cavity structures in the foams formed by the above-described first to third embodiments have shapes, densities, and structures independently from the shape of the molding die.

Fourth Embodiment

This fourth embodiment is to provide a method of controlling pressure and volume of a space, i.e., an inner cavity, formed by an internally-formed surface having a wide variety of shapes. Additionally, this embodiment forms the interfacing patterns by adding a foaming agent to the interfacing material (ink) so as to efficiently control pressure and volume of the air layer in the inner cavity.

A first foaming agent blended with the foaming material is desirably the same as a second foaming agent contained in the printed film in a way of a kind, a grade and a decomposition temperature, and those two foaming agents are simultaneously decomposed at a predetermined temperature. Such foaming agent of this embodiment is an AC based foaming agent having azodicarbonamide as a main component, which has a decomposition temperature of 155±3 degrees Celsius and a gas generation amount of 160 to 180 ml/g. The first foaming agent blended with the foaming material and the second foaming agent contained in the printed film are simultaneously decomposed at a predetermined temperature such that a predetermined amount of gases, such as nitrogen and carbon dioxide, is generated. Thus, the inner cavity filled with such gases is formed inside of the foam at a position corresponding to the interfacing pattern.

The following table 5 shows a comparison of volume and repulsive elasticity of the inner cavity and a specific gravity of foam in accordance with the contents of foaming agent in the interfacing materials.

TABLE 5

Influences of foaming agent contents on a foam

| Foaming Agent Content(%) | Foam Density (g/cc) | Volume of Inner Cavity (Cm$^3$) | Repulsive Elasticity (%) |
|---|---|---|---|
| 0 | 0.26 | 1.35 | 50 |
| 10 | 0.24 | 2.02 | 53 |
| 20 | 0.22 | 2.70 | 56 |

Figure 4:
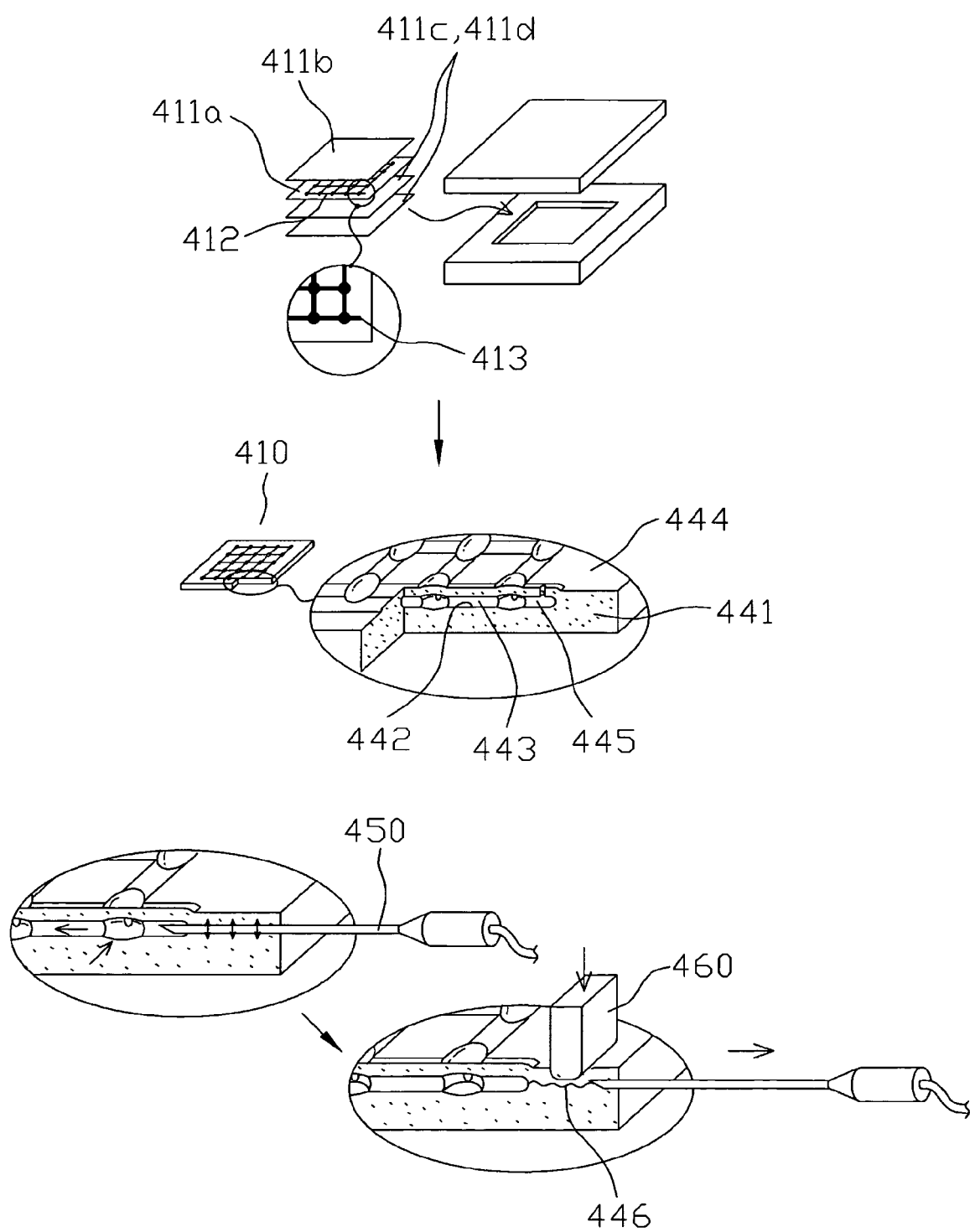
FIG. 4 illustrates a manufacturing process of a cross-linked foam according to a fourth embodiment of the present invention.

FIG. 4 illustrates a manufacturing process of a cross-linked foam according to the fourth embodiment of the present invention.

Material Preparation: Four sheets of materials 411a, 411b, 411c and 411d having a foaming rate of 150% are formed and cut into sizes each having a thickness of 2.5 mm, a width of 100 mm, and a length of 100 mm.

Interfacing Pattern Formation: Stripes, each of which has a width 3 mm and a length 80 mm, are arranged in vertical and horizontal directions and spaced apart from each other by a distance of 20 mm on a surface of the first material 411a. A designed pattern 412 including such stripes also has circles having a diameter 5 mm at crossing points of the stripes. An air passage 413 having a width of 2 mm and a length of 5 mm is attached to a bottom line portion of the designed pattern 412. Usually, the designed pattern 412 is screen-printed using a rubber-based ink so as to form an interfacing pattern having a thickness 70 m, and then dried.

Foaming Process: The second material 411b is disposed on the printed surface of the first material 411a, and the third and fourth material 411c and 411d are sequentially disposed on a surface of the first material 411a opposite to the printed surface, thereby completing a combination 410. Thereafter, the combination 410 of the first to fourth materials 411a-411d is disposed into a cavity of a molding die having a depth of 10 mm, a width of 100 mm and a length of 100 mm, and then heated and pressed so as to be foamed. Accordingly, the resultant foam 410 has a thickness of 15 mm, a width of 150 mm and a length of 150 mm. An internally-formed surface 442 of the foam 410 has an air injection passage 445 inside of the foam at a depth of 3 mm measured from a surface 444 of the foam 410. The inner cavity structure 443 formed by the internally-formed surface 442 serves as air passage. The inner cavity structure 443 is formed in the size of a width of 120 mm and a length of 120 mm, respectively. An air injector 450 is connected to the air passage 445, and air of appropriate pressure is injected. A portion 446 of the resultant foam 410 where the air injector 450 has passed is closed by an attachment 460 applied in such a manner as melting attachment or high-frequency attachment, whereby it is possible to obtain the foam in which the air pressure and the volume of the inner cavity structure are controlled properly.

Fifth Embodiment

Figure 5A:
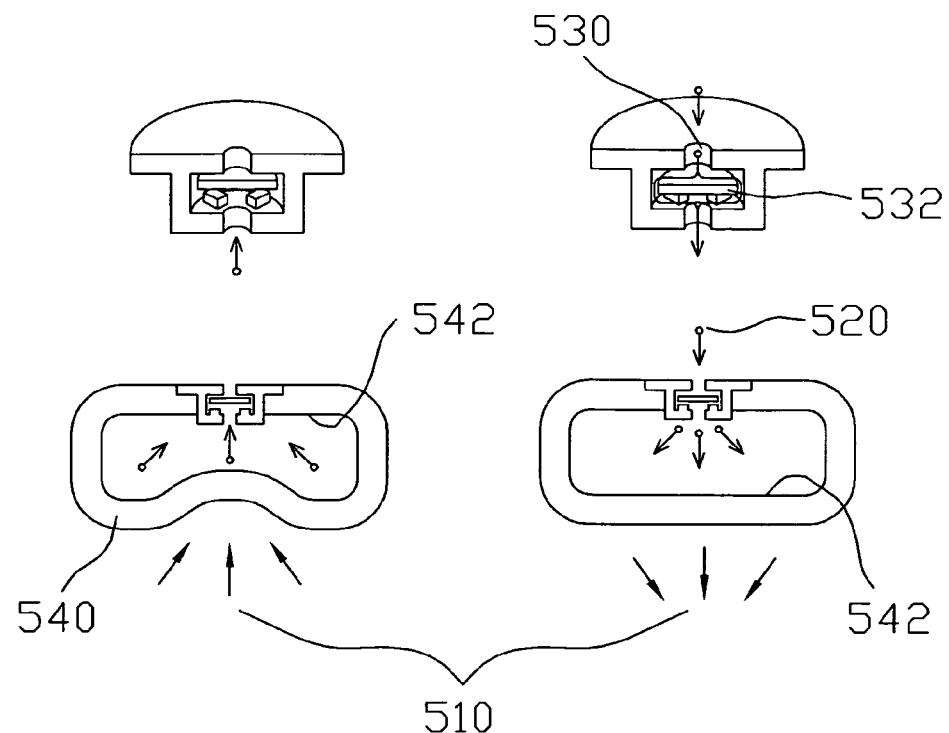
FIGS. 5a and 5b show manufacturing processes of a cross-linked foam according to a fifth embodiment of the present invention.
Figure 5B:
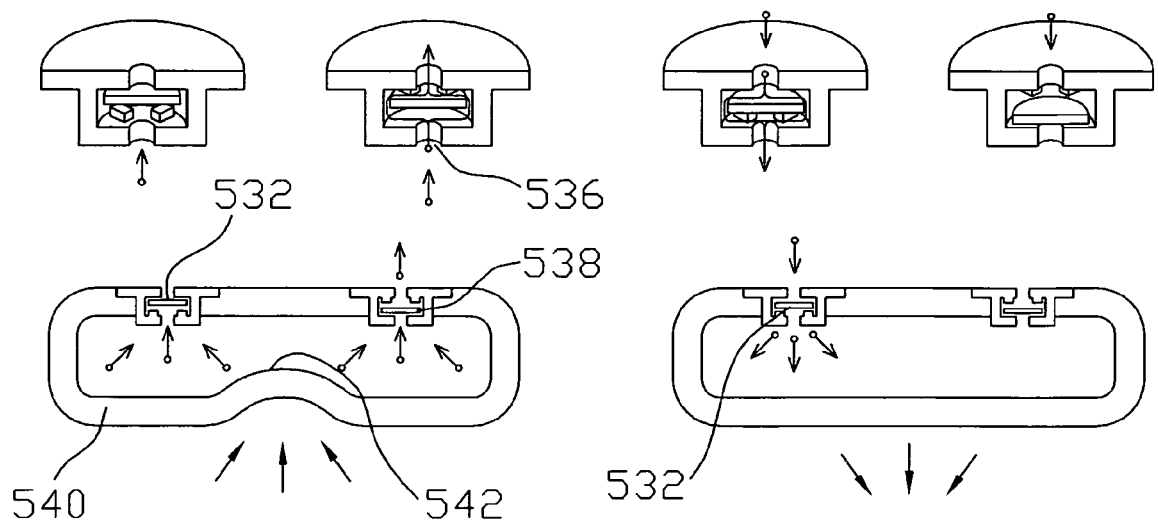

This fifth embodiment is a modification of the fourth embodiment, and provides an ability of controlling pressure and volume of a space formed by an internally-formed surface at FIGS. 5a and 5b show a cross-linked foam according to the fifth embodiment of the present invention.

FIG. 5a shows a structure utilizing a single check valve 532. When a pressure 510 repeatedly presses a foam 540, the space (the inner cavity) formed by the internally-formed surface 542 shrinks and then subsequently an external air 520 is introduced into the space formed by the internally-formed surface 542 through an air passage 530 and the check valve 532, thereby controlling the pressure and volume of the space formed by the internally-formed surface 542. FIG. 5b shows a structure utilizing two check valves 532 and 538. An amount of air less than that of air introduced through the first check valve 532 is discharged from the space formed by the internally-formed surface 542 of the foam 540 through a second air passage 536 and the second check valve 538 during the re-contraction operation of the space formed by the internally-formed surface 542. Therefore, the structure having the two check valves 532 and 538 controls the pressure more efficiently than that of FIG. 5a. In the fifth embodiment, more than one air passages are formed in the foam, and a variety of check valves are attached to the air passages, thereby obtaining the foam having the increased buffering abilities and the air suction/discharge functions without arranging an additional air bag or pump in the foam.

Sixth Embodiment

Figure 6:
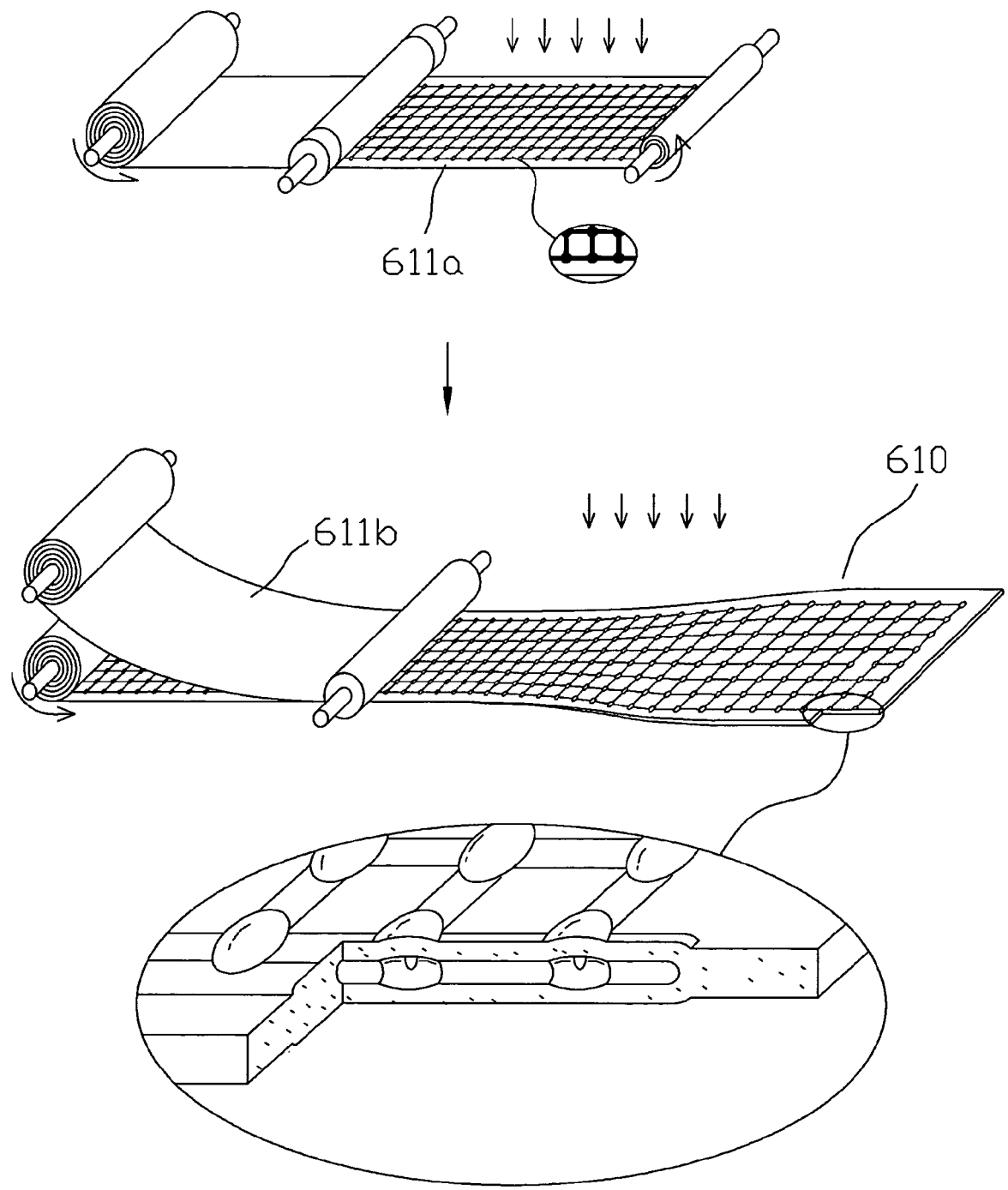
FIG. 6 illustrates a manufacturing process of a cross-linked foam according to a sixth embodiment of the present invention.

FIG. 6 illustrates a manufacturing process of a foam according to a sixth embodiment of the present invention. The sixth embodiment is a modification of the fourth embodiment.

Material Preparation: Two film-typed materials 611a and 611b having a foaming rate of 200% are calender-molded. Each of the first and second film-typed materials 611a and 611b has a width of 40 inches, a length of 10 yards, and a thickness of 2 mm.

Interfacing Pattern Formation: A designed pattern that is the same as the designed pattern 412 of the fourth embodiment is gravure-printed on a surface of the first film-typed material 611a at a thickness of approximately 40 micrometers using an epoxy-resin-based ink. The pattern is spaced apart from side edges of the first film-type material 611a by a distance of 1 inch.

Foaming Process: The second film-typed material 611b is attached to a front surface of the first film-typed material 611a where the designed pattern is printed using a pressure roll, thereby forming a combination 610 of the first and second film-typed materials 611a and 611b. The combination 610 obtained by temporarily attaching the material 611b on the printed surface of the materials 611a is foamed by a chemical method or an electron irradiation method. The internally-formed surface of the resultant foam is almost the same as those of FIG. 4. Furthermore, the air injection method is also the same as that of the fourth embodiment as described referring to FIG. 4.

Seventh Embodiment

Figure 7:
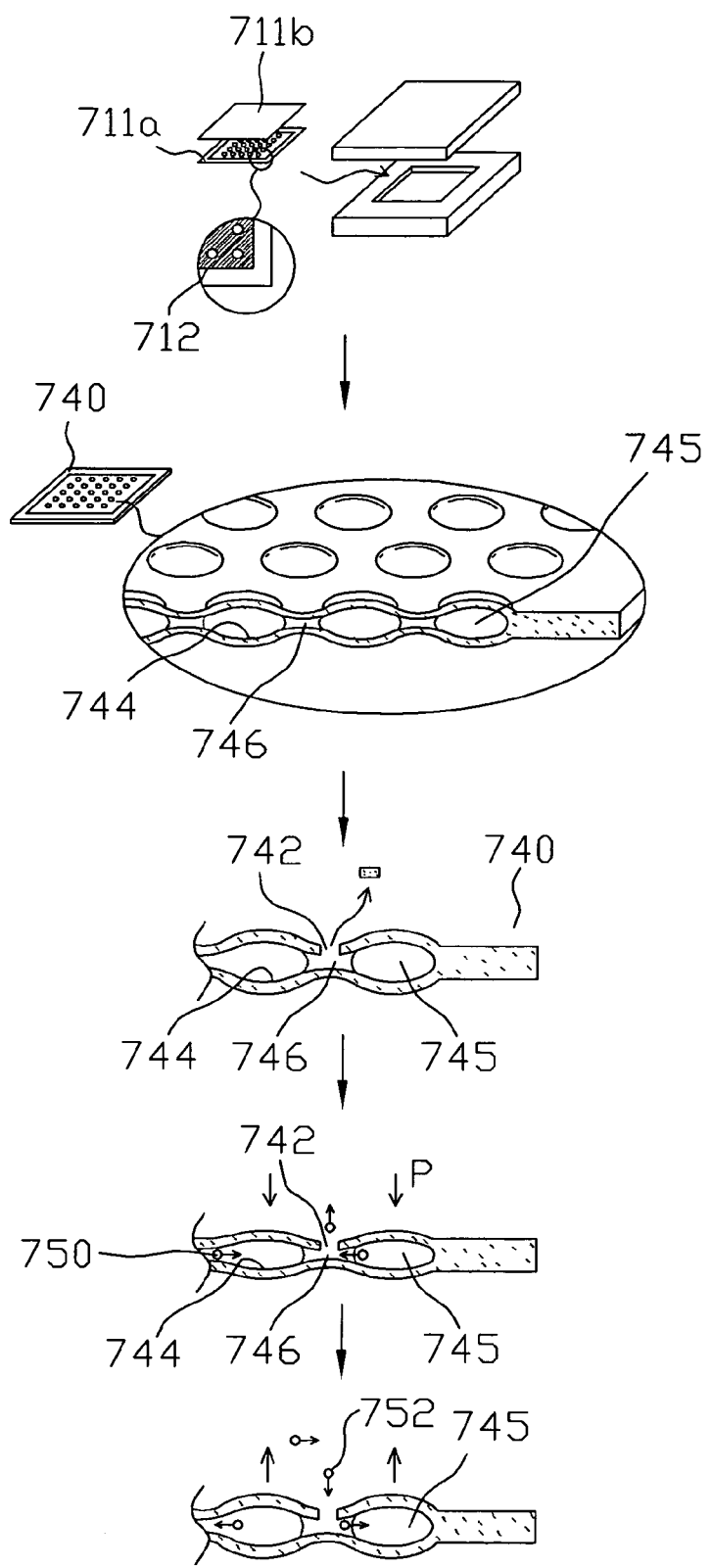
FIG. 7 illustrates a cross-linked foam having an air ventilating structure to improve a buffering function and an air permeability according to a seventh embodiment of the present invention.

FIG. 7 illustrates a cross-linked foam having an air ventilating structure to improve a buffering function and an air permeability according to a seventh embodiment of the present invention. The foam manufactured by the seventh embodiment has an internally-formed surface forming an inner cavity structure that is capable of sucking or discharging air.

Material Preparation: Two film-type materials 711a and 711b having a foaming rate of 150% are calender-molded, and then cut into a size having a thickness of 2 mm, a width of 1001 mm and a length of 100 mm, respectively.

Interfacing Pattern Formation: Circular patterns each having a diameter of 5 mm and a thickness of 50 micrometers is formed on the first film-type material 711a by way of printing a rubbery ink. The circular patterns are disposed in the range of 160 mm$^2$ (80 mm×80 mm) with a margin of 10 mm from the side edges, and spaced apart from one another by a distance of 10 mm. The printed circular patterns become an interfacing pattern 712.

Foaming Process: A second film-type material 711b is attached to the first film-type material 711a to cover the printed interfacing pattern 712, thereby forming a combination thereof. The thus-obtained combination is inserted into a cavity of a molding die which has a depth of 4 mm, a width of 100 mm and a length of 100 mm, and then the molding die presses and heats the combination to form a foam 740. After releasing the pressure and heat, the resultant foam 740 has a thickness of 6 mm, a width of 150 mm and a length of 150 mm. Thereafter, a punch forms three holes 742 each having a diameter of 1 mm from a foam surface to an internally-formed surface 744.

The foam 740 produced by this seventh embodiment has not only the internally-formed surface 744 but also columns 746 with the area range of 120 mm width and 120 mm length. Each of the columns 746 has a diameter of 7 mm and is spaced apart from the neighboring columns by a distance of 15 mm. Inner cavities 745 formed by the internally-formed surfaces 744 are connected to each other.

When a pressure P is applied from an external source to the foam 740, an air 750 in the inner cavity 745 is discharged to the outside through the holes 742. On the contrary, when the pressure P is released, the shape and volume of the foam 740 are restored by the restoring forces of the columns 746 as sucking an outside air 752 into the inner cavity 745.

According to the seventh embodiment, it is possible to manufacture a foam that is capable of sucking or discharging air only by the contracting/restoring action of the foam, which is controlled by adjusting the volume of the inner cavity and the size and number of holes provided therein for air suction and discharge. It is also possible to form the internally-formed surface in a multi-layered structure and a second internally-formed surface between the surface of the foam and the internally-formed surface so as to insert a thin synthetic resin plate into a space formed by the second internally-formed surface. The foam manufactured by the seventh embodiment can be applied widely to products which require shock absorbing forces and air permeability, such as shoe components, protective equipment, bed, chair, bag, floor material and sound proof material.

Eighth Embodiment

Figure 8:
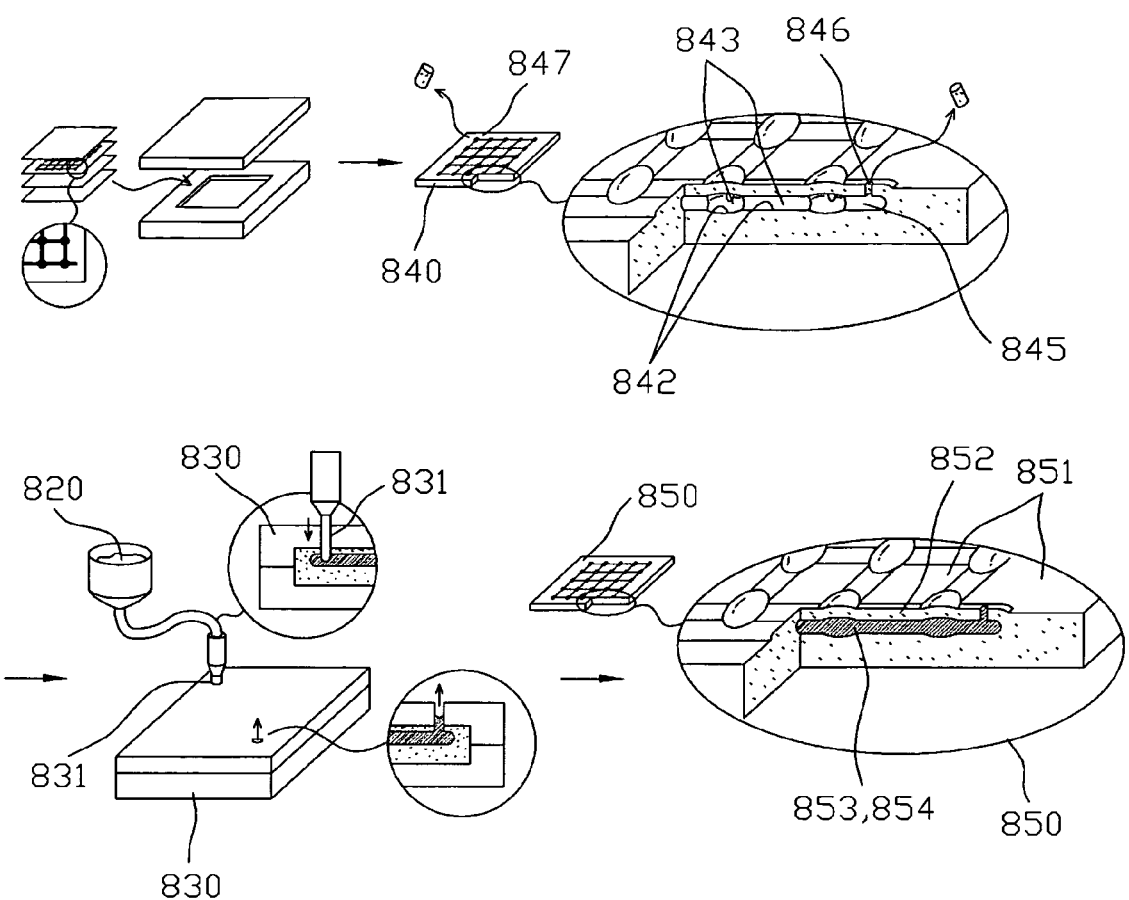
FIG. 8 illustrates a manufacturing process of a cross-linked foam according to an eighth embodiment of the present invention.

FIG. 8 illustrates a manufacturing process of a cross-linked foam according to an eighth embodiment of the present invention. In the eighth embodiment, the same or different materials are inserted into a space formed by an internally-formed surface having a variety of shapes.

First of all, a foam 840 is manufactured by the method of the fourth embodiment shown in FIG. 4 and is the same as the foam 410. Thereafter, an air hole 846 having a diameter of 1 mm is punched to an air injection passage 845 that is connected to an internally-formed surface 842 of the foam 840, and another air hole 847 having a diameter of 1 mm is punched for smooth injection of a material such as a polyurethane solution. The foam 840 having the air holes 846 and 847 is disposed into an aluminum molding die 830, and then a heat is applied to the foam 840 at a temperature of 30 to 40 degrees Celsius.

A polyurethane solution 820 is injected through the injection hole 831 of the molding die 830, the air hole 846 and the air injection passage 845, such that the air injection passage 845 becomes a polyurethane solution injection path 845 during the polyurethane solution injection process. Before injecting the polyurethane solution 820, the polyurethane solution is blended with a polyether-based polyol containing isocyanate prepolymer, determined catalytic and foaming agent, in a ratio of 1:3 at a high speed (impellar rpm; 6,000). At this time of blending, the polyurethane solution 820 has a weight of 25 g that is determined by multiplying the volume of the space, i.e., the inner cavity 843, formed by the internally-formed surface 842 and a desired specific gravity. Accordingly, the blended material of the polyurethane solution 820 and the polyether-based polyol is injected into the inner cavities 843 through the air hole 846 and the polyurethane solution injection path 845. After the blended material injection, the foam 840 and the injected blended material are cured for about 8 minutes in the aluminum molding die 830 without applying heat additionally, and then the foam 840 is de-molded from the molding die 830, thereby forming a composite foam 850 integrally interconnected with the polyurethane. As shown in the cross section of FIG. 8, a composite inner formed layer 854 including a foamed polyurethane 853 is formed in a grid type structure in an inside 852 of the foam 850. The grid-shaped inner-formed layer 854 is disposed at a depth of 3 mm from a surface 851 of the composite foam 850. Additionally, the foamed polyurethane 853 filled in the composite inner-formed layer 854 has a diameter of 4 mm.

According to the eighth embodiment of the present invention, a variety of materials can be substituted for the polyurethane. For example, polyester or polyether based urethane material having a variety of densities and molecular structures can be utilized. Further, a variety of plastic resins, a natural and/or synthetic rubbery material including urethane rubber, silicon rubber and latex (SBR, NBR, BR, Acrylate Latices), a plaster material, a clay material, or other minerals can be used instead of the polyurethane. Such materials may be injected into the inner cavities, inserted, joined or attached thereto, and formed integrally with the foam. Thus-obtained foam can directly be used as industrial components, or compression re-molded, if necessary, to reform the shape of the composite foam.

In cases when an EVA based foam and a polyurethane are integrated with each other, the weaknesses of the polyurethane material, e.g., decolorization, hydrolysis, bacteria corrosion, and heavy weight, can be eliminated such that a polyurethane material having a variety of properties and characteristics is effectively used. As a result, weak properties of materials are supplemented. Additionally, foams are molded even without using an additional molding die in accordance with the structure of the inner cavities and characteristics of materials injected in the inner cavities. Further, manufacturing procedures and costs can be reduced as compared with a conventional method where foams of different materials are individually molded and attached with each other through an additional process.

The following table 6 shows a comparison of properties of composite cross-linked foam with the polyurethane injected into the inner cavities formed by the internally-formed surface of the EVA based foam. A letter A denotes the properties between the polyurethane material and the foam, and a letter B denotes the properties between the polyurethane materials.

TABLE 6

| | Density (g/cc) ASTM D-297 | Surface hardness (Shore 000, type C) ASTM D-2240 | Tensile (Kgf/Cm3) ASTM D-412 | Tear strength (Kgf/Cm3) ASTM D-624 | Repulsive elasticity (%) |
|---|---|---|---|---|---|
| EVA based foam | 0.29 | 52 (C type) | 26 | 12 | 41 |
| PU(A) | 0.38 | 60 (000 type) | 4 | 2 | 3 |
| PU(B) | 0.34 | 62 (C type) | 31 | 12 | 33 |

* Surface hardness is measured by using Shore 000 type for the PU(A) portion, and Asker type C for the EVA foam and the PU(B) portion.

Ninth Embodiment

Figure 9:
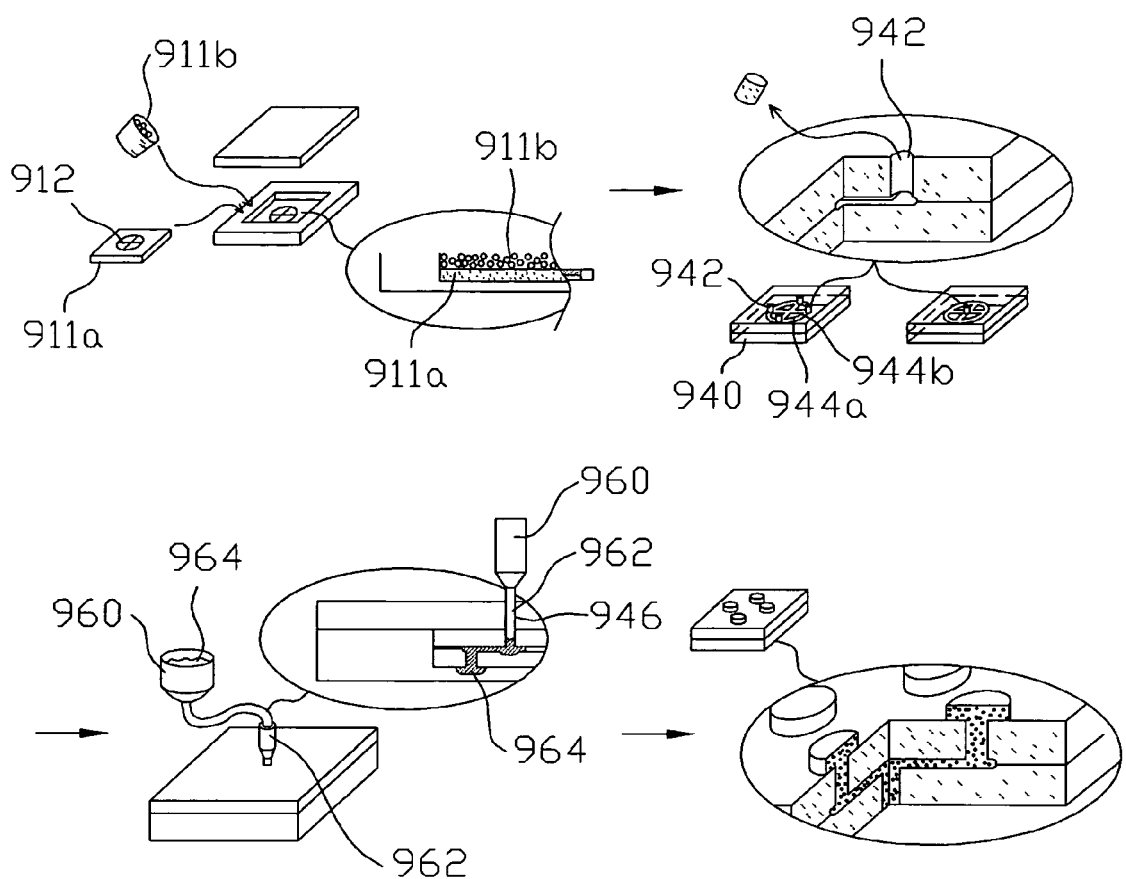
FIG. 9 illustrates a manufacturing process of a cross-linked foam according to a ninth embodiment of the present invention.

FIG. 9 illustrates a manufacturing process of a cross-linked foam according to a ninth embodiment of the present invention. This ninth embodiment is a modification of the eighth embodiment. In the ninth embodiment, the same and different materials are injected into inner cavities formed by the internally-formed surface of a foam, and the injected materials are molded at both the inner cavities and the outer surface of the foam.

Material Preparation: A sheet of white material 911a having a foaming rate of 150% is injection-molded.

Interfacing Pattern Formation: A circle pattern having a diameter of 50 mm is printed at the center of the material 911a. Additionally, vertical and horizontal lines having a length of 50 mm are also printed inside the circle pattern along the diametric lines of the circle pattern. The circle pattern and the vertical and horizontal lines are formed of a urethane-resin-based ink at a thickness of approximately 50 micrometers, thereby completing an interfacing pattern 912. Thereafter, thus-obtained interfacing pattern 912 is thermal-dried at a temperature of 60 degrees Celsius for 15 minutes.

Foaming Process: The material 911a having the printed patterns is disposed into a cavity of a press type molding die, and then a residual space of the cavity is filled with a black particle type material 911b that has the same foaming rate as the material 911a. After disposing the material 911a and filling the black particle type material 911b, the press type molding die is closed, and then the heat and pressure are applied to the materials 911a and 911b therein for foaming, thereby forming a cross-linked foam 940. After curing the foam to stabilize the physical properties, thus-obtained foam 940 has an internally-formed surface 944a and 944b forming an inner cavity therein that is formed along the shape of the interfacing pattern 912. The internally-formed surfaces have the circularly shaped portion 944a and the linearly shaped portions 944b.

The foam 940 having the internally-formed surface 944a and 944b is punched from a surface of the foam 940 to form four holes 942 at positions where the circularly shaped portion 944a meets the linearly shaped portions 944b. Each of the four holes 942 has a diameter of 2 mm. Further, another hole 942 having a diameter of 3 mm is formed at a position where the linearly shaped portions 944b cross each other. After the punching process of forming the holes 942, the foam 940 is inserted into a cavity of an injection-type molding die while adjusting the hole 942 of 3 mm diameter to correspond to a material injection path 946 of the injection-type molding die. Thereafter, a nozzle 962 of a material injector 960 is disposed to correspond to the material injection path 946 of the injection-type molding die, and then a material 964 different from the foam material, e.g., a urethane-based resin, is injected through the nozzle 962. Thus, the material 964 is inserted into the inner cavities formed by the internally-formed surface 944*a* and 944*b* and a residual space of the injection-type molding die. After hardening the injected material 964, the injection-type molding die is opened and the foam is de-molded. As shown in FIG. 9, the resultant foam becomes a composite foam that includes the urethane resin in the inner cavities. The urethane resin is extended from the inner cavities to a surface of the foam and the urethane resin on the surface is shaped along a shape of the cavity of the injection-type molding die. Thus-obtained foam can be directly used as industrial components, or compression re-molded if necessary, to reform the shape of the composite foam.

Further, fabric, non-woven fabric, natural/synthetic leather, and/or rubber can be selectively attached to the surface of the cooled and cured foam 940 or a variety of pattern shapes can be attached to the surface of the foam. Thereafter, the surface of the foam can be perforated and then other materials may be injected into the inner cavities formed by the internally-formed surface through perforations such that the injected material is extended from the inner cavities to the surface of the foam.

As described above, materials are injected into the inner cavities 944*a* and 944*b* and molded integrally at the inside and outer surface of the EVA based foam. This results in aesthetic enhancement and improvement in adhesion strength, product quality, properties and functions.

Tenth Embodiment

Figure 10:
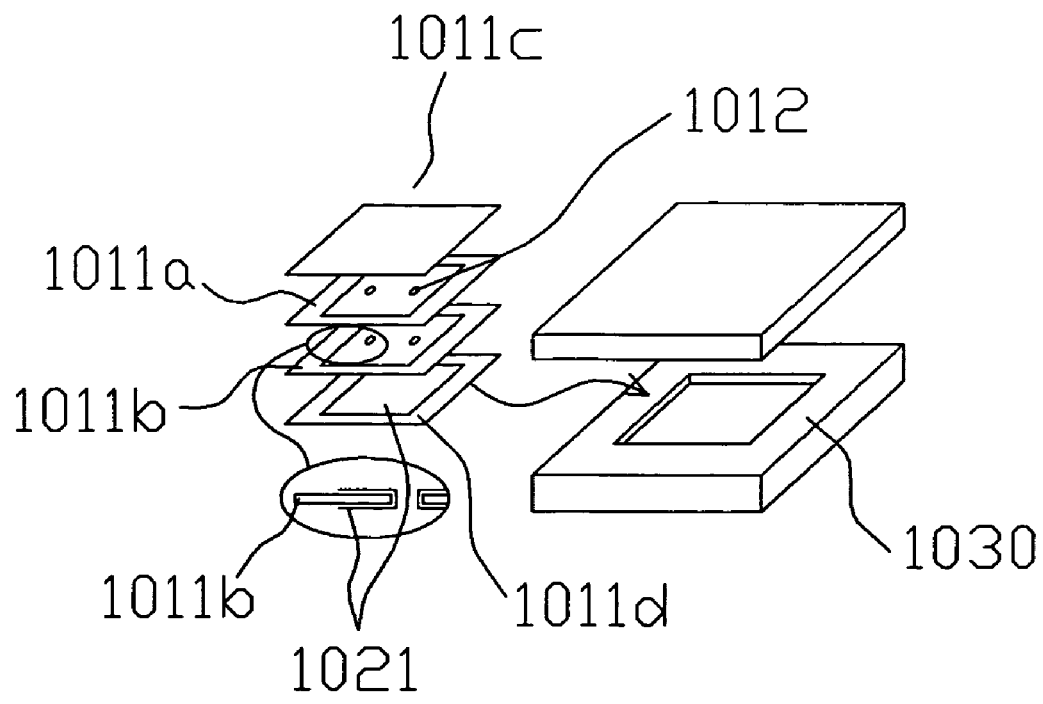
FIG. 10 illustrates a manufacturing process of a cross-linked foam according to a tenth embodiment of the present invention.
Figure 10:
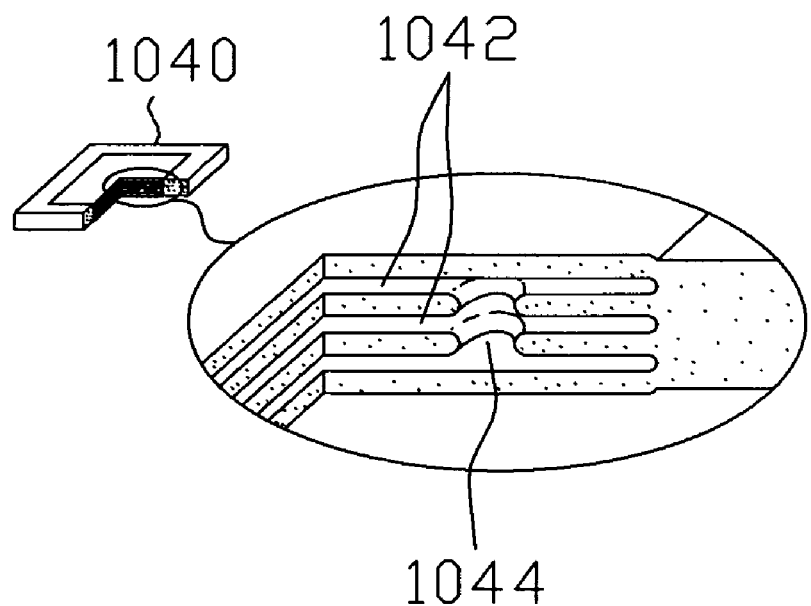

FIG. 10 illustrates a manufacturing process of a cross-linked foam according to a tenth embodiment of the present invention. In this tenth embodiment, an internally-formed surface of a form is divided into more than two parts in a wide variety of shapes.

Material Preparation: Four sheets of flat-film-type materials 1011*a*, 1011*b*, 1011*c* and 1011*d* having a foaming rate of 150% are calender-molded, and then cut into a shape having a thickness of 2.5 mm, a width of 100 mm and a length of 100 mm. First and second flat-film-type materials 1101*a* and 1101*b* each are perforated to form two holes 1012 each having a diameter of 2 mm.

Interfacing Pattern Formation: A urethane ink is printed on both surfaces of the materials 1011*a* and 1011*b* in such a manner so that margins of 10 mm are arranged from the cutting edges of each direction. The cross section of the perforated portion is also covered by the urethane ink, and selected one side of materials 1011*c* and 1011*d* is printed, thereby forming an interfacing pattern 1021. Thereafter, thus-obtained interfacing pattern 1021 is dried.

Foaming Process: The first and second materials 1011*a* and 1011*b* are attached to each other, and the printed sides of the third and fourth materials 1011*c* and 1011*d* are combined with the combination of the first and second materials 1011*a* and 1011*b*. Thereafter, the resultant structure is inserted into a cavity of a press or injection type molding die 1030, which has a width of 100, a length of 100 mm and a depth of 10 mm, and then heated and pressed so as to be foamed, thereby forming a foam 1040 after cooling and curing. The foam 1040 has a width of 150 mm, a length of 150 mm and a thickness of 15 mm. Further, a multi-layered internally-formed surface 1042 and two holes 1044 each having a diameter of 3 mm are formed in the foam 1040. Thus, the internally-formed surface forming an inner cavity has the multi-layered structure of 120/120/3.5 mm. Similar to the ninth embodiment, other materials can be injected into and filled in the inner cavities (1042) and the holes 1044.

Eleventh Embodiment

Figure 11:
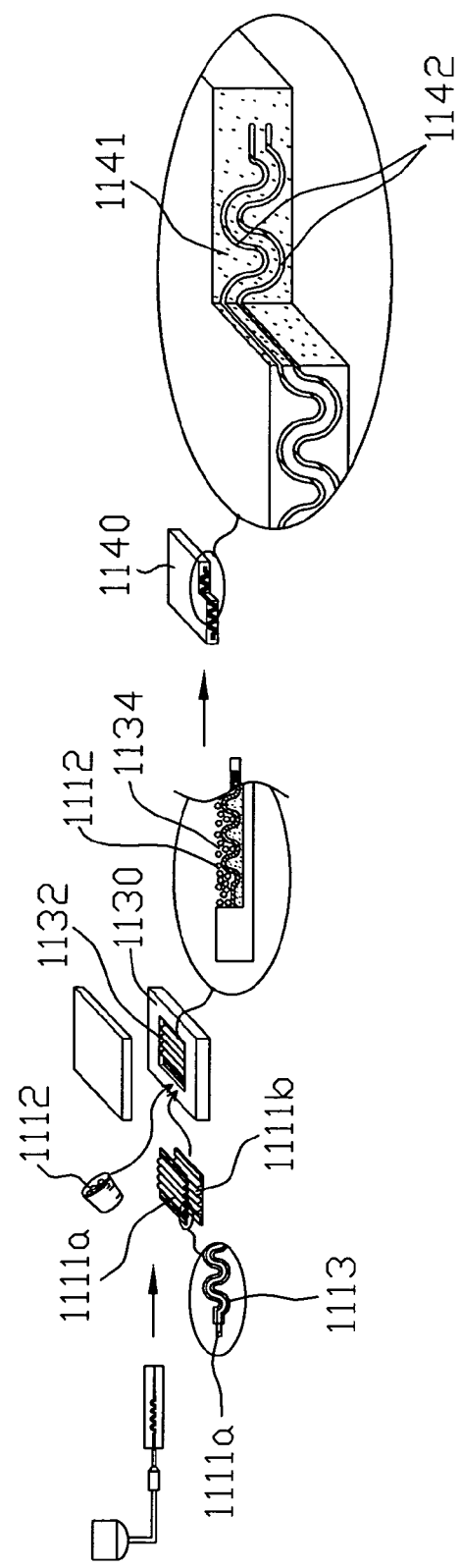
FIG. 11 illustrates a manufacturing process of a cross-linked foam according to an eleventh embodiment of the present invention.

FIG. 11 illustrates a manufacturing process of a cross-linked foam according to an eleventh embodiment of the present invention. This eleventh embodiment is to provide a method of forming a three-dimensional internally-formed surface having a variety of curved shapes.

Material Preparation: First and second materials 1111*a* and 1111*b* are injection- or compression-molded from a white particle material having a foaming rate of 170%. The first and second materials 1111*a* and 1111*b* have bumpy surfaces. Also, a particle type material 1112 having a weight of 20 g is prepared.

Interfacing Pattern Formation: An enamel-based ink is sprayed on both sides 1113 of the first bumpy material 1111*a* except for a masking portion, and then dried. The sprayed ink has a thickness of 40 micrometers.

Foaming Process: The dried material 1111*a* is combined with the second bumpy material 1111*b*, and the combination of the first and second bumpy materials 1111*a* and 1111*b* is inserted into a cavity 1132 of a press-type molding die 1130. Thereafter, a residual space 1134 of the cavity 1132 is filled with the particle type material 1112. Then, the combination and the particle type material 1112 are together heated and pressed in the press-type molding die 1130 to be foamed, thereby forming a foam 1140. The foam 1140 has a curved internally-formed surface 1142 at an inside 1141, as shown in FIG. 11.

Twelfth Embodiment

Figure 12:
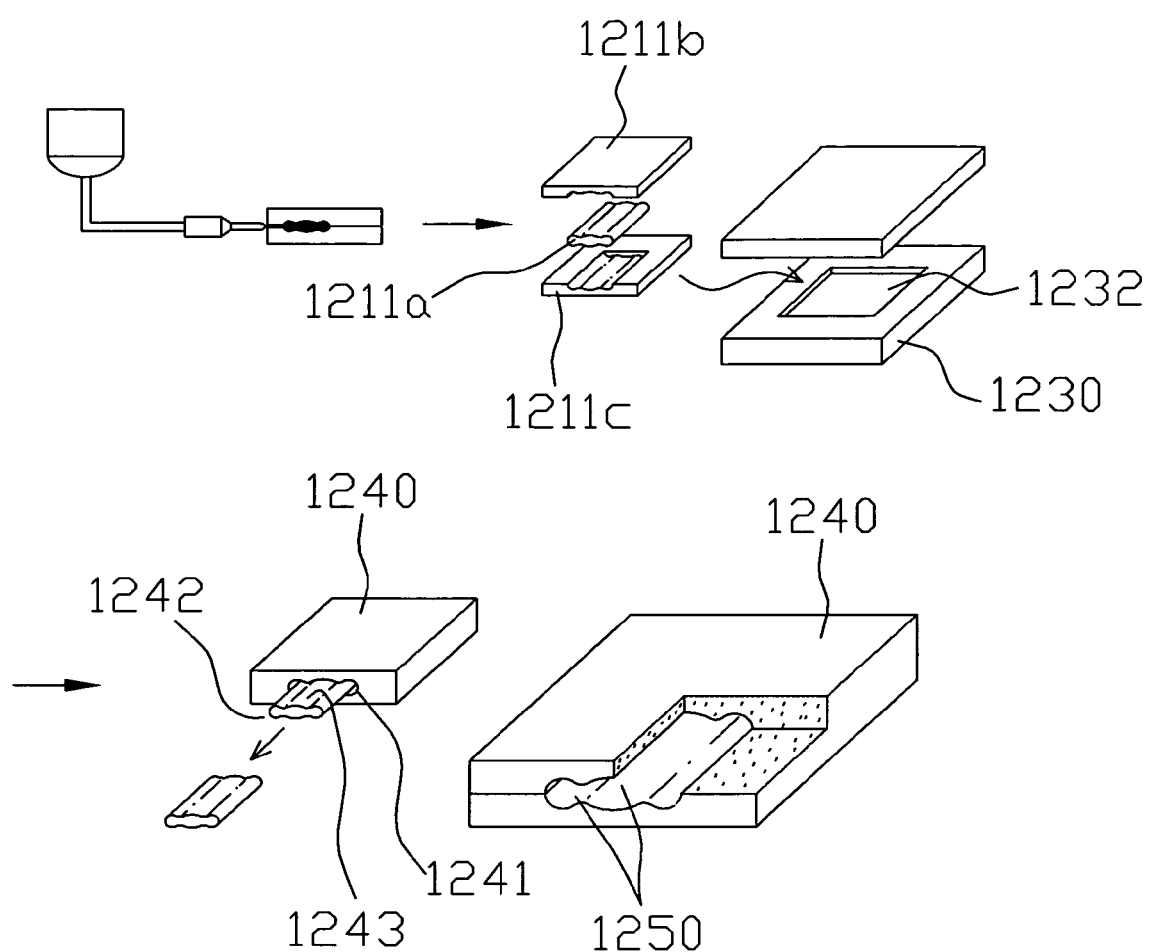
FIG. 12 illustrates a manufacturing process of a cross-linked foam according to a twelfth embodiment.

FIG. 12 illustrates a manufacturing process of a cross-linked foam according to a twelfth embodiment of the present invention.

Material Preparation: A first material 1211*a* is injection- or compression-molded using a particle-type material having a foaming rate of 130%, and second and third materials 1211*b* and 1211*c* having a foaming rate of 150% are also prepared using the method used to prepare the first material 1211*a*.

Interfacing Pattern Formation: A urethane-based ink including a 5% foaming agent is sprayed on a whole surface of the first material 1211*a* at a thickness of 30 micrometers, and then dried to provide an interfacing pattern on the first material 1211*a*.

Foaming Process: The first material 1211*a* covered by the interfacing pattern is combined with the second and third materials 1211*b* and 1211*c*, and then the combination thereof is inserted into a cavity 1232 of a press-type molding die 1230. Thereafter, the combination is heated and pressed so as to be foamed, thereby forming a foam 1240. Then, the obtained foam 1240 is cooled down and cured, and has internally-formed surfaces 1241 and 1243.

Although the first material 1211*a* is foamed simultaneously with the second and third materials 1211*b* and 1211*c*, there exists a space between the foamed first material and the foamed second and third materials due to the fact that the foaming rate of the first material 1211*a* is lower than that of the second and third materials 1211b and 1211c by approximately 20%. Therefore, a separated inner part 1242 derived from the first material 1211a can easily be taken out of the internally-formed surface, and a predetermined space 1250 can be obtained. The formed space 1250 is exposed outward such that other foam of different material can be inserted and filled into this space 1250.

Thirteenth Embodiment

Figure 13:
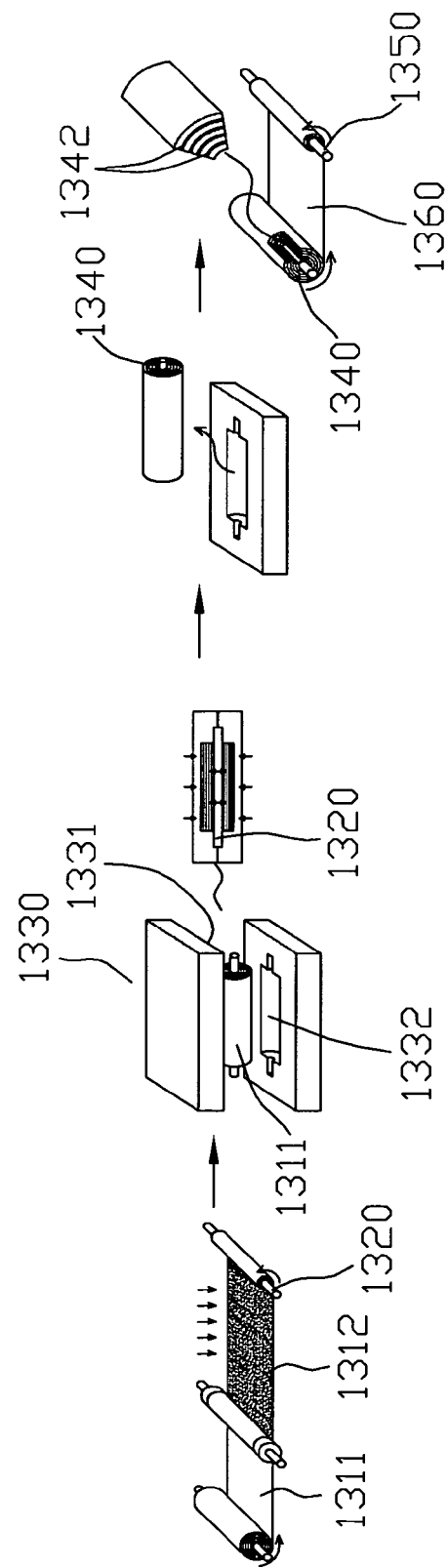
FIG. 13 illustrates a manufacturing process of a cross-linked foam according to a thirteenth embodiment of the present invention.

FIG. 13 illustrates a manufacturing process of a cross-linked foam according to a thirteenth embodiment of the present invention. The thirteenth embodiment is to provide an internally-formed surface connected or opened to the outside in more than one direction.

Material Preparation: A film-type material 1311 having a foaming rate of 150% is calender-molded to have a size of 1 mm thickness, 20 inches width and 20 mm length. Thereafter, the film-type material 1311 is taken up on a roll.

Interfacing Pattern Formation: A colorless PVA resin based ink is gravure-printed onto one surface of the film-type material 1311 at a thickness of 30 micrometers so as to form an interfacing pattern 1312, and then the resultant structure having the interfacing pattern 1312 is thermal-dried at a temperature of 60 degrees Celsius for 15 minutes. Thereafter, the dried material is taken up on a re-heating roll 1320 that is formed of aluminum and includes a heater.

Foaming Process: The material 1311 wound on the re-heating roll 1320 is inserted into cavities 1331 and 1332 of a press-type molding die 1330 where a heater is installed. Each of the cavities 1331 and 1332 has a half cylindrical shape, such that a half of the wound material 1311 is inserted into the first cavity 1331 of the upper part of the molding die 1330 and the other half of the wound material 1311 is inserted into the second cavity 1332 of the other molding die part. After inserting the material 1311, the press-type molding die 1330 is closed, and then the inserted material 1311 is heated and pressed at a temperature of 150 degrees Celsius under a pressure of 150 kg/cm² so as to be foamed. After being de-molded from the press-type molding die, a roll-type foam 1340 is formed and then sequentially cured at a temperature of 40 degrees Celsius for 2 hours to stabilize the size and the physical properties. After that, the foam 1340 is unwound from the re-heating roll 1320 and then re-wound on a winding beam 1350, thereby forming a foam having a uniform cross section and a continuous shape. This thirteenth embodiment allows a formation of a foam having a uniform and continuous cross section, which is not obtained through a conventional pressure cross-linked foaming method.

Fourteenth Embodiment

Figure 14:
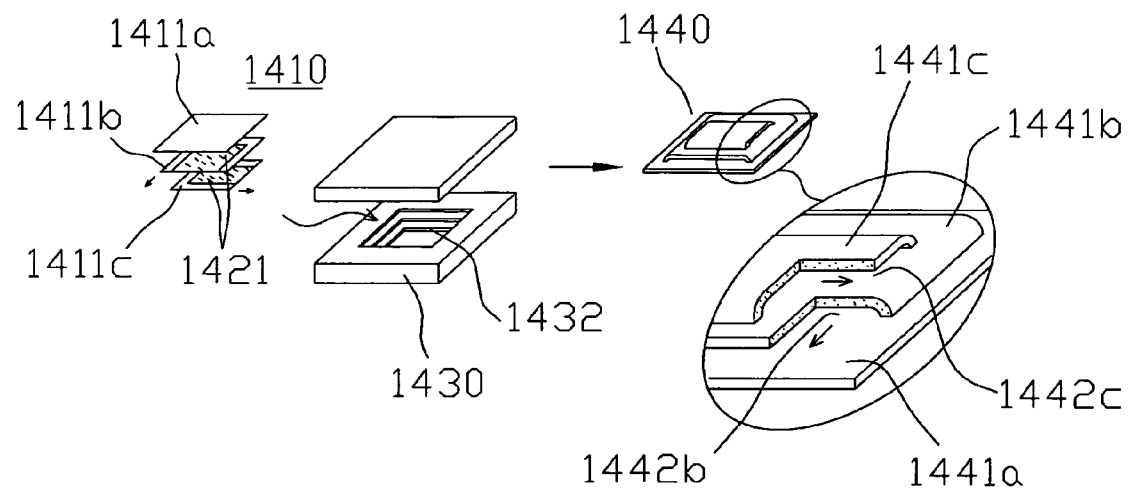
FIG. 14 illustrates a manufacturing process of a cross-linked foam according to a fourteenth embodiment of the present invention.

FIG. 14 illustrates a process of manufacturing a cross-linked foam according to a fourteenth embodiment of the present invention. The fourteenth embodiment is to provide an internally-formed surface having a multiple-plane structure.

Material Preparation: Three sheets of film-type materials 1411a, 1411b and 1411c having a foaming rate of 150% are calender-molded using the same material. Each of the film-type materials 141la-1411c has a thickness of 2 mm. The maximum dimension of each of the first, second and third materials 1411a, 1411b and 1411c is 100×100 mm. It is desirable that the first material 1411a have a width of 100 mm and a length of 100 mm, the second material 1411b have a width of 90 mm and a length of 90 mm and the third material 1411c have a width of 80 mm and a length of 80 mm, for example.

Interfacing Pattern Formation: A urethane-base ink is screen-printed on one surface of each of the second and third materials 1411b and 1411c with a margin being spaced apart from the side edges by a distance of 5 mm except from a certain edge, thereby forming an interfacing pattern 1421. Thereafter, the resultant structure is dried.

Foaming Process: The first to third materials 1411a-1411c are sequentially attached in such a manner that the interfacing patterns 1421 formed on their surfaces are arranged in an upper direction so as not to face each other as shown in FIG. 14. The second material 1411b is inserted between the first and third materials 1411a and 1411c, thereby forming a combination 1410. After that, the combination 1410 is inserted into a cavity 1432 of a press-type molding die 1430, and then heated and pressed to be foamed. After the foaming process, a foam 1440 is formed and de-molded from the press-type molding die 1430. And then, the foam is cured and cooled down at a temperature of 40 degrees Celsius for 20 minutes.

The foam 1440 has a size of 150 mm width, 150 mm length and 3 mm thickness, and has a bottom surface 1441a, a middle surface 1441b and a top surface 1441c. The bottom surface 1441a that is larger than the middle surface 1441b is derived from the first film-type material 1411a, the middle surface 1441b that is larger than the top surface 1441c is derived from the second film-type material 1411b, and the top surface 1441c is derived from the third material 1411c, whereby the sides of the foam 1440 have steps due to the size difference thereof. As shown in FIG. 14, the foam 1440 has a double-layered internally-formed surface 1442b and 1442c which is opened in different directions as indicated by arrows. This internally-formed surface shown in FIG. 14 could not actually be accomplished by the conventional pressure cross-linked foaming method or normal pressure cross-linked foaming method, but this fourteenth embodiment makes it possible.

Fifteenth Embodiment

Figure 15:
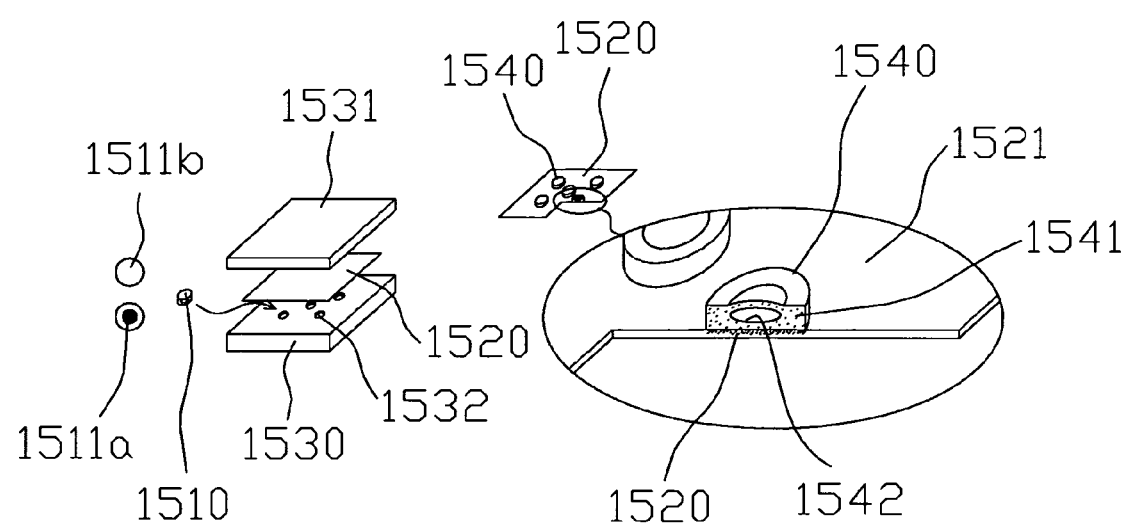
FIG. 15 illustrates a manufacturing process of a cross-linked foam according to a fifteenth embodiment of the present invention.

FIG. 15 illustrates a manufacturing process of a cross-linked foam according to a fifteenth embodiment of the present invention. The fifteenth embodiment is to provide a method in which the foam having an internally-formed surface is formed on a different material at a time.

Material Preparation: A first film-type material 1511a is calender-molded at a thickness of 2 mm and cut into a circular shape having a diameter of 10 mm.

Interfacing Pattern Formation: A urethane-resin-based ink is printed onto the circular-shaped material 1511a in a shape of circle having a diameter of 3 mm and a thickness of 50 micrometers, and then dried to provide an interfacing pattern on the first film-type material 1511a.

Foaming Process: A second film-type material 1511b that also has a circular shape is combined with the first film-type material 1511a having the interfacing pattern thereon, and then a combination 1510 of the first and second film-type materials 1511a and 1511b is inserted into a cavity 1532 of a press-type molding die 1530. At this time, one or more combinations 1510 may be inserted into one or more holes (cavity 1532) of the die 1530. After that, the combination 1510 is covered by a polyester-based synthetic textile 1520 having a thickness of 1 mm, and then a top cover 1531 of the molding die 1530 is closed. The combination 1510 is heated and pressed, and therefore a portion of the combination 1510, especially the first film-type material 1511*a*, is molten, infiltrated into a surface 1521 of the textile 1520 and adhered to the surface of the textile 1520. Generally, the combination 1510 is foamed in a thick-wise direction when the molding die 1530 is opened, thereby forming a foam 1540.

After the de-molding, the foam 1540 is formed on the surface 1521 of the textile 1520, and has an internally-formed surface 1542, which is filled with air, at an inside 1541 of the foam 1540. This fifteenth embodiment can be applied to polyester-based synthetic fiber, textile, non-woven fabric, artificial leather and natural leather. Further, the inner cavity (internally-formed surface) of the foam can be modified into a wide variety of shapes according to the fifteenth embodiment of the present invention.

Sixteenth Embodiment

Figure 16:
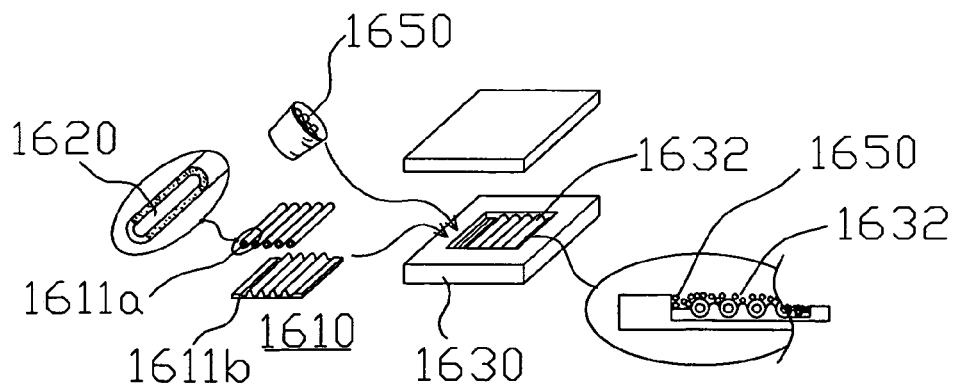
FIG. 16 illustrates a manufacturing process of a cross-linked foam according to a sixteenth embodiment of the present invention.
Figure 16:
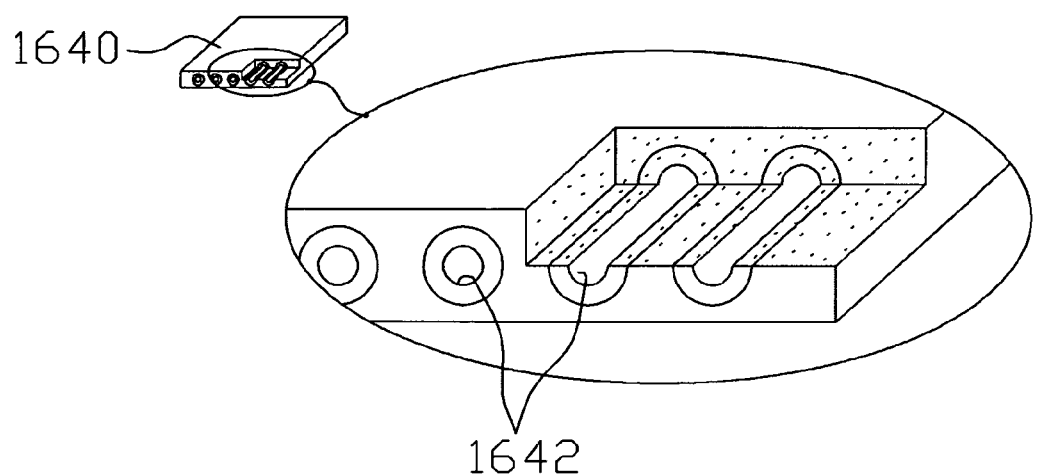

FIG. 16 illustrates a manufacturing process of a cross-linked foam according to a sixteenth embodiment of the present invention The sixteenth embodiment is to provide a method where a material for the inner cavity of a foam is extrusion-molded.

Material Preparation: A red pellet type material, which is formed from a material having a foaming rate of 170%, is injected into an extruder and then heated in a cylinder to be molten. The molten material is compressed by a screw and discharged through a tube-type die. The discharged material is solidified by a cooling device to be a red pipe-type material 1611*a* that has pipes each having a 5 mm outer diameter and a 2.5 mm inner diameter.

Interfacing Pattern Formation: An enamel-based transparent ink including a 10% foaming agent is injected into the inside of the red pipe-type material 1611*a* and then coated on the inner surface of the red pipe-type material 1611*a* so as to form an interfacing pattern 1620. After that, the enamel-based transparent ink is dried.

Foaming Process: The resultant red pipe-type material 1611*a* is cut into pieces such as 5 pieces in this example, and then combined with a white material 1611*b* that is similar to the injection- or compression-molded white material 1111*b* of the eleventh embodiment, thereby producing a combination 1610. After that, the combination 1610 of the red pipe-type material 1611*a* and the white material 1611*b* is inserted into a cavity 1632 of a press-type molding die 1630, and then a residual space of the cavity 1632 is filled with a white particle-type material 1650 that has the same foaming rate as the red pipe-type material 1611*a*. The inserted combination 1610 and white particle-type material 1650 are then heated and pressed so as to form a foam 1640.

During the foaming process, the hollow portion of the red pipe-type material 1611*a* is recessed and then becomes an internally-formed surface 1642 having cylinders each having a diameter of 4 mm. The internally-formed surface 1642 forms an inner cavity. Namely, the white foam 1640 includes the five internally-formed surfaces 1642. And the portion between 4 to 8 mm of diameter is formed in a red color.

Accordingly, the cross-linked foaming methods of the present invention provide a wide variety of inner cavity structures integrally formed with the foam. The cross-linked foam produced by the present invention mainly comprises a form body and an inner cavity structure at an inside of the foam body. The shape of the inner cavity structure may be determined by the internally-formed surface that may be classified into a closed type and an open type.

In the closed type, the internally-formed surface is disposed inside the foam body and the internally-formed surface is closed. However, the internally-formed surface of the open type extends to the surface of the foam to communicate with the outside.

The foam body may have air passage(s) communicating with the inner cavities, such that the air or gas can freely keep up the stream from the outside into the inner cavities or vise versa. Further, the foam body may have a valve system in the air passage so as to control a flow of the air, gas or vapor, wherein the valve system may have a check valve. The number and shape of the air passage(s) and valve(s) are not limited, and many other modifications and variations are possible for them.

One or more of the material that is the same as or different from the foam body may be filled or inserted into the inner cavity structure. Thus, the foam may have various physical properties depending on its parts.

Figure 17A:
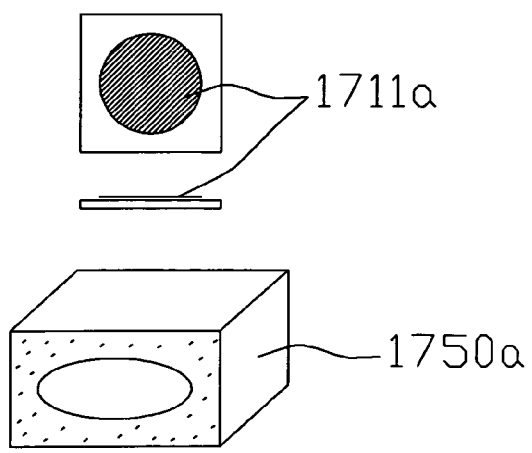
FIGS. 17a to 17v illustrate diverse examples of the cross-linked foam according to the present invention.
Figure 17B:
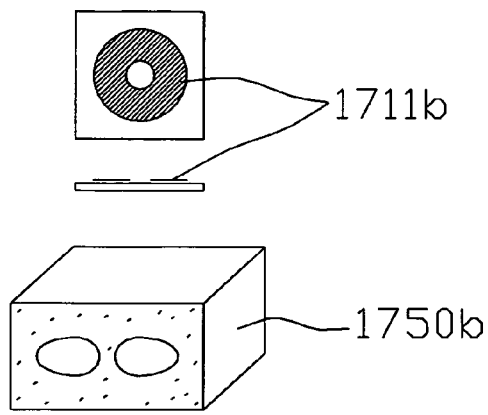
Figure 17C:
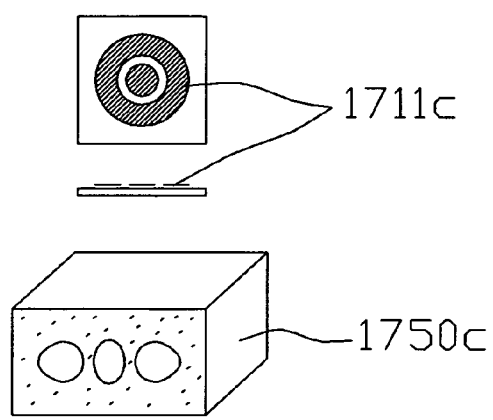
Figure 17D:
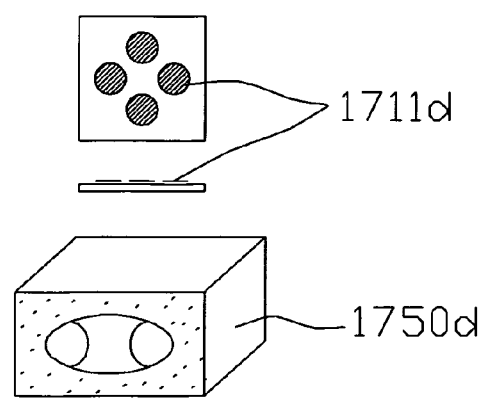
Figure 17E:
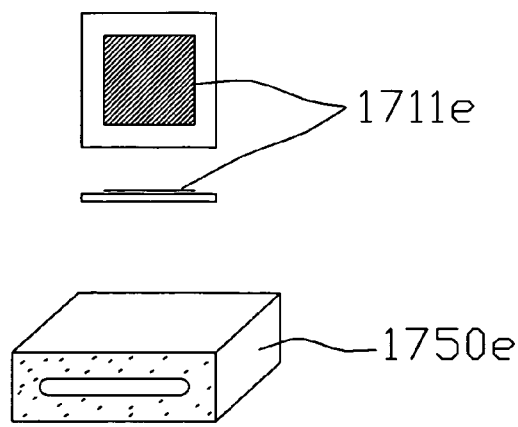
Figure 17F:
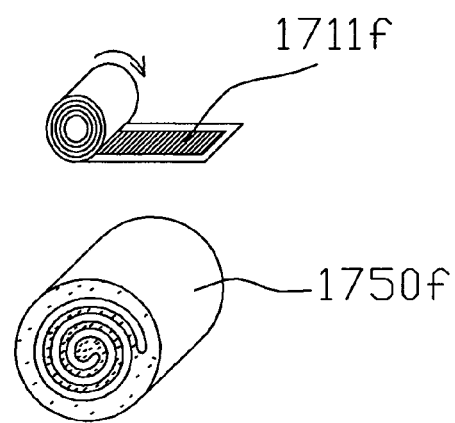
Figure 17G:
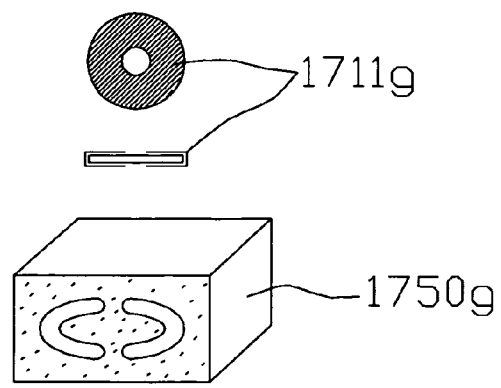
Figure 17H:
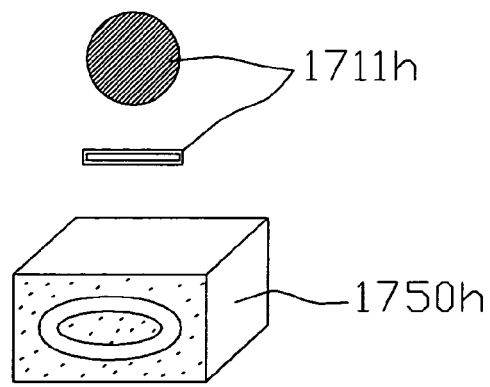
Figure 17I:
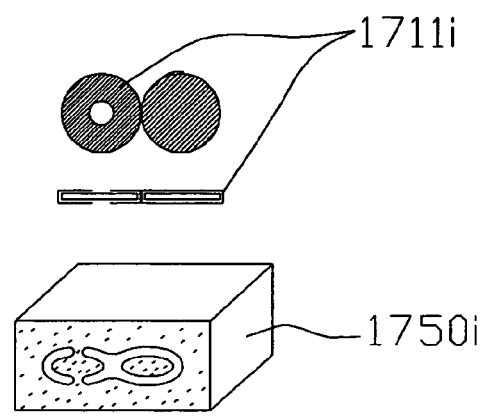
Figure 17J:
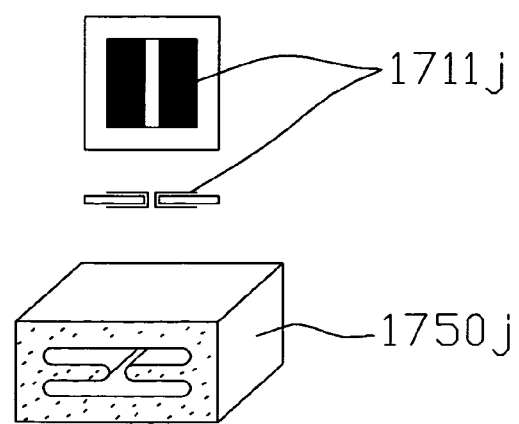
Figure 17K:
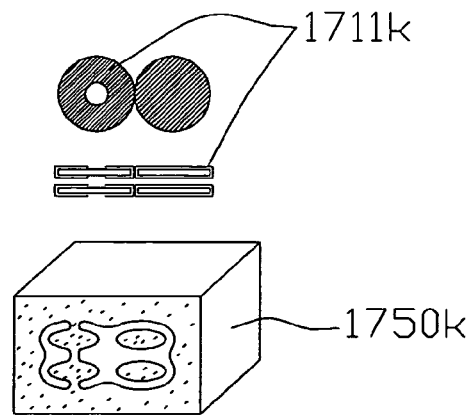
Figure 17L:
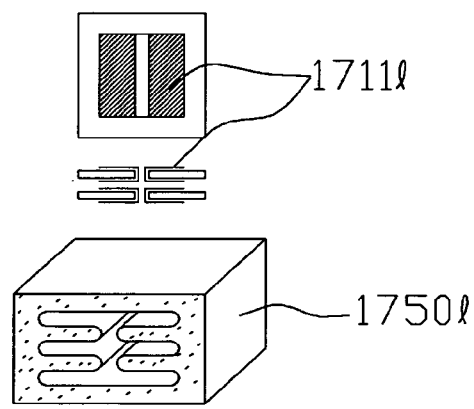
Figure 17M:
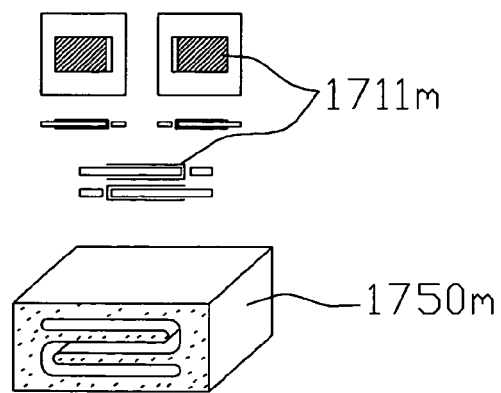
Figure 17N:
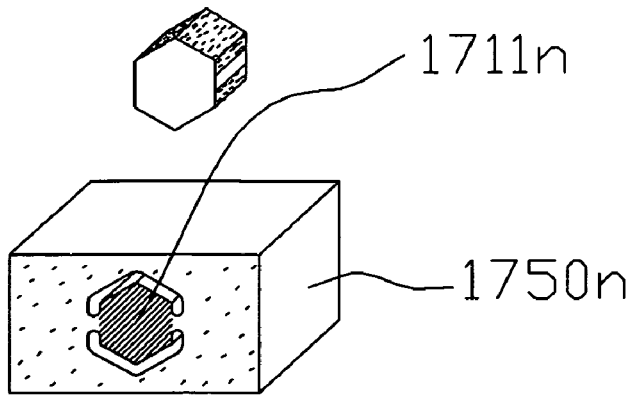
Figure 17O:
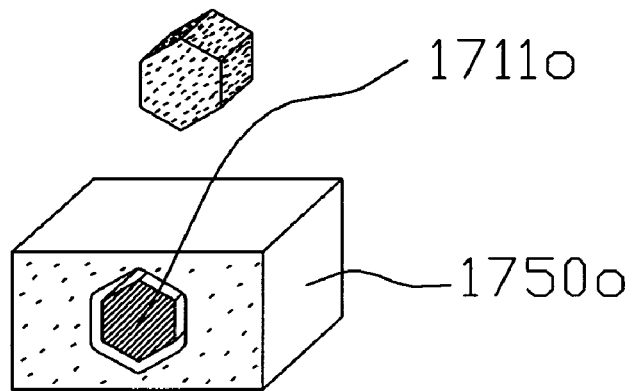
Figure 17P:
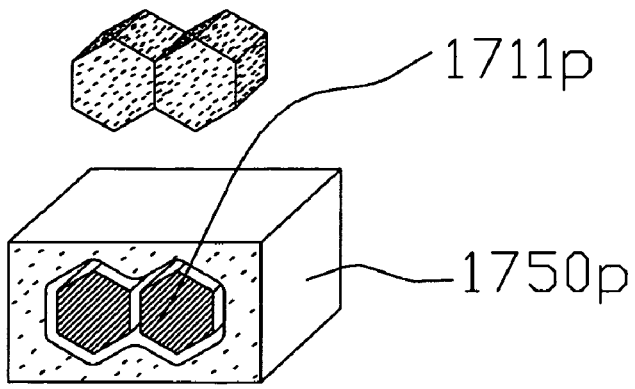
Figure 17Q:
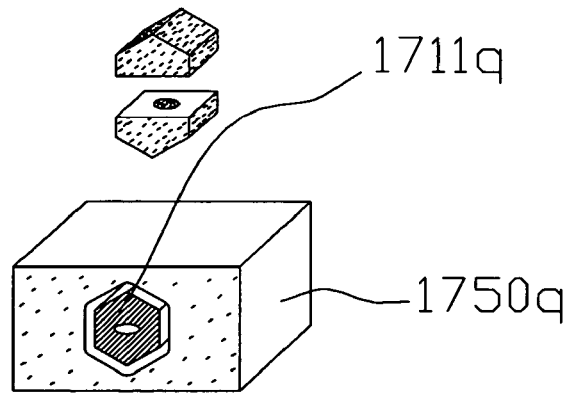
Figure 17R:
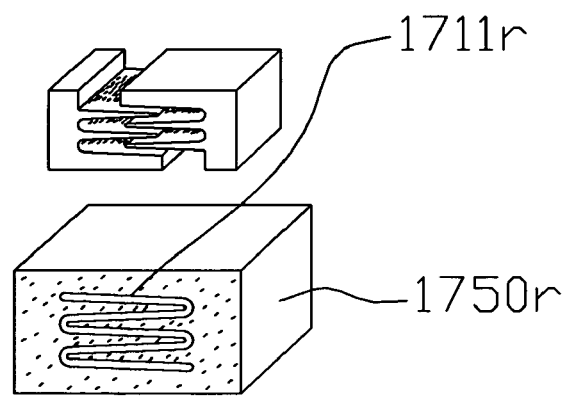
Figure 17S:
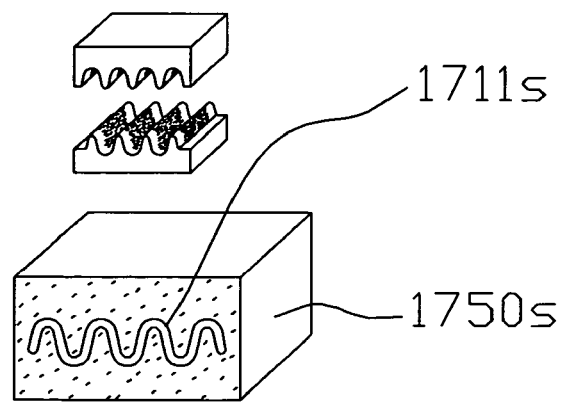
Figure 17T:
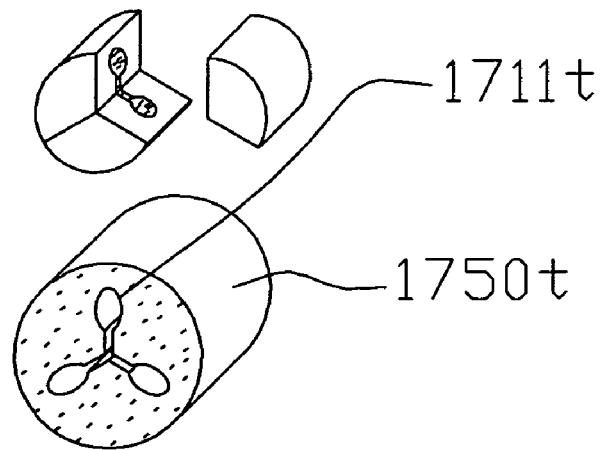
Figure 17U:
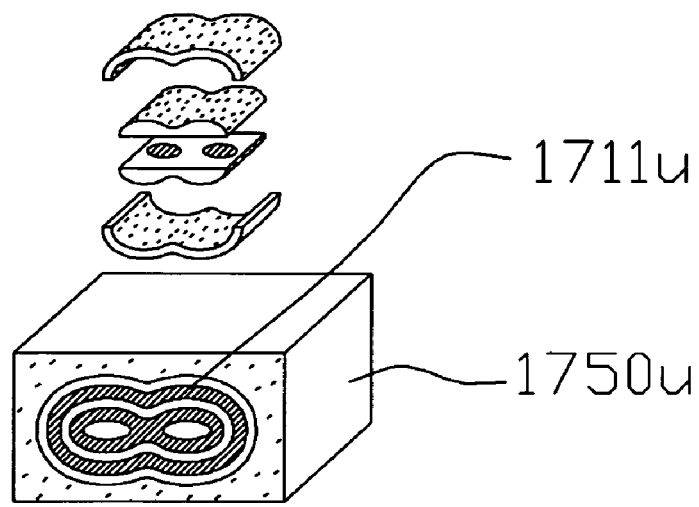
Figure 17V:

FIGS. 17*a* to 17*v* illustrate diverse examples of the cross-linked foam according to the present invention. These foams are formed by the methods of the present invention discussed above.

FIGS. 17*a* to 17*j* show examples of cross-linked foams that are formed by foaming a combination of flat type materials having interfacing patterns 1711*a* to and other materials. As shown in FIGS. 17*a* to 17*j*, each of the cross-linked foams has a foam body 1750*a* to 1750*j* and an inner cavity structure formed by an internally-formed surface.

The inner cavity structure of the foams shown in FIGS. 17*a* to 17*j* may be filled with gas or air in such a manner that the external gas or air is injected thereto using an injector, e.g., as described with reference to FIG. 4, thereby properly controlling a pressure of the inner cavity structure. Further, as illustrated with reference to FIGS. 5*a* and 5*b*, an air passage communicating with the inner cavity structure may be formed in such a cross-linked form, and a check valve may be installed in the air passage.

FIGS. 17*k* to 17*m* show examples of cross-linked foams that are formed by way of piling up flat type materials having interfacing patterns 1711*k* to 1711*m*, combining the piled flat type materials with other materials, and then foaming the combination. As shown in FIGS. 17*k* to 17*m*, each of the cross-linked foams has a foam body 1750*k* to 1750*m* and a complex structure of inner cavities that is formed by an internally-formed surface.

FIGS. 17*n* to 17*u* show examples of cross-linked foams that are formed by way of foaming a combination of a foaming material (indicated with dots) and a three-dimensional material having interfacing patterns. As shown in FIGS. 17*n* to 17*u*, each of the cross-linked foams has a foam body 1750*n* to 1750*u* and a three-dimensional structure 1711*n* and 1711*u* in an inner cavity structure formed by the internally-formed surface. Although FIGS. 17*n* to 17*u* illustrate the foam body and the three-dimensional inner formed structure that are simultaneously formed by the foaming process, it is possible that the three-dimensional structure is formed separately from the cross-linked foam body and then inserted into the inner cavity formed by the internally-formed surface.

FIG. 17*v* illustrates materials having different examples of three-dimensional shapes for forming the inner-formed structures of FIGS. 17*n* to 17*u*.

Meanwhile, various physical properties are compared between the cross-linked foam produced by the following inventive method and that produced by the related art method and are discussed below.

Accordingly to an embodiment of the present invention, urethane ink is printed by a silkscreen method on a film-type material that has a foaming rate of 150% and a size of 24 mm width, 24 mm length and a 1 mm thickness. The urethane ink is formed at a thickness of 50 micrometers, thereby forming an interfacing pattern having a size of 20 mm width and 20 mm length. One sheet of material is formed on a front surface of the film-type material, and five sheets of materials are formed on a rear surface of the film-type material, thereby forming a combination, where those materials are the same as the film-type material. The combination is inserted into a cavity of a molding die, which has a 24 mm width, a 24 mm length and a 7 mm depth. After that, the combination is heated and pressed at a temperature of 165 degrees Celsius under a pressure of 150 Kg/cm² for 480 seconds, thereby forming a cross-linked foam. Table 7 shows some physical properties of the cross-linked foam manufactured by the above-described method of the preset invention as compared with those of the foam manufactured by a related art method.

TABLE 7 difference of properties in each part on a single foam having inner cavity structure

| Foam | Interface area (Cm²) | Inner cavity volume (Cm³) | Foaming rate (%) | Foam density (g/cc) ASTM D-297 | Surface hardness (C type) ASTM D-2240 | Repulsive elasticity (%) |
|---|---|---|---|---|---|---|
| Foam of the present invention | 4 | 1.35 | 150 | 0.26 | 35 | 50 |
| Foam of the conventional method | — | — | 150 | 0.29 | 50 | 42 |

The repulsive elasticity is the value of the highest height measured when the metal ball of 16.3 g is dropped from the height of 450 mm and bounced. The surface hardness and the repulsive elasticity are measured at a surface of the foam near the inner cavity.

As indicated in Table 7, the foam of the present invention according to one example has the same foaming rate as the foam of the related art method, but the foam of the present invention has a low surface hardness and a large repulsive elasticity rather than the foam of the conventional method due to the fact that it has a inner formed cavity structure in the foam.

When the foam manufactured throughout the aforementioned methods according to the present invention is combined with other material(s) such as fiber and artificial leather and when the combination of such materials is compressed and re-molded, the volume of the foam is reduced at a predetermined compression ratio, and a difference of the properties, such as the surface hardness and the elasticity, between the re-molded portion of the foam and the inner cavity structure filled with air becomes further increased. This shows significant differences between the foam manufactured by the related art foam molding method (i.e., primary process) and the foam manufactured by a compression re-molding method (i.e., secondary process). The following Table 8 shows an example of such differences.

TABLE 8 surface hardness and repulsive elasticity of the foams

| | | Other portion | | Inner cavity portion | |
|---|---|---|---|---|---|
| Foam/Foam | Foaming ratio & Compression ratio (%) | Surface hardness (type C) ASTM D-2240 | Repulsive elasticity (%) | Surface hardness (type C) ASTM D-2240 | Repulsive elasticity (%) |
| Foam (after foam molding) | 150 | 50 | 42 | 35 | 50 |
| Foam (after compression re-molding) | 135 | 58 | 45 | 37 | 55 |

Meanwhile, the cross-linked foam manufactured by the above-mentioned methods of the present invention will be applicable to shoe components or other goods in many ways. Hereinafter, as an example only, the wide rage of such foam usage in shoes will be described in detail; however, the present invention is not limited to such and is applicable any other goods or products.

FIGS. 18a to 18f illustrate exemplary applications of the cross-linked foam of the present invention to many parts of a shoe.

i) Upper—This upper component constitutes the upper part of a shoe, and includes an outer surface and an inner surface that are attached to each other. The outer surface is generally made of a natural/synthetic leather, fiber, textile, rubber, non-woven fabric, and/or a synthetic resin, and the inner surface is made of a PU, PE, latex, sponges, non-woven fabric, and/or textile. When the foam or re-molded foam of the present invention is combined with the above-mentioned upper component, the weight of the upper (i.e., part(i)) is reduced, and also the supporting force, air permeability, buffering, insulation, shape stability and tightness are improved. Moreover, such physical properties can be differentiated depending on each part of the foam.

ii) Inner sole—This inner sole component is disposed under the sockliner of the shoe, and absorbs the moisture generated from a foot of a wearer. In the related art, the leather, cellulose board, no-woven fabric or other textile is used for this inner sole, or a piece of steel plate and a trimmed sponge are attached to the inner sole of the boots or other specialized shoes so as to raise the hardness of the heal portion and the flexibility of the forefoot portion. However, the inner sole formed of the foam of the present invention reduces the component weight and makes it possible to obtain the improved air permeability or to differentiate the flexibility and hardness in each part of component.

iii) Midsole—This midsole is a main component of a sole-bladder for the sport shoes, slippers, sandals or casual shoes, and made of the EVA, PU or rubbers so as to improve the shock absorbance and repulsive elasticity.

When the foam of the present invention is adopted for the shoe midsole, the weight of the shoe is reduced because the inner cavities formed by the internally-formed surface contain the air layers. Further, the midsole can be formed of primary foam or a re-molded foam after the cutting, grinding and attaching process, whereby the shoes can have a diverse appearance and various properties and functions.

In one example, the midsole can be easily manufactured by using the foam described with reference to FIG. 8 (the eighth embodiment) where the material is injected into the inner cavity so as to produce a complex midsole combined with a composite material. In another example, the midsole can be easily formed with the foam described with reference to FIG. 9 (the ninth embodiment) where the material injected from an exterior is cross-link-foamed integrally with the inner formed surface and the outer surface of the foam.

If the foam of the present invention is properly modified or combined for the midsole to achieve the desired properties and design, the midsole can act as and substitute for a later-described outsole.

iv) Outsole—This outsole component is mainly used for shoes that require resistances against abrasion and friction. The outsole can be easily manufactured by using the primary-molded foam or the re-molded foam of the present invention. As an example, when the foam formed through the ninth embodiment is applied to the outsole, the shoes can obtain the lightweight and the various properties and functions.

v) Sock or Sockliner—This component is generally inserted into the shoe and disposed on the inner sole. The sock or sockliner directly contacts the foot such that this component requires properties such as the shock absorbing forces, supporting forces, repulsive elasticity, stability and moisture absorbing forces.

When the foam of the present invention is used for the sock or sockliner, the weight of the shoe is reduced because of the inner cavity structure and the air layers. For instance, the foam of the present invention used for the sock or sockliner allows easy enhancement of properties and functions in every part of the sockliner to be acquired. The foam of the present invention is attached to other materials, such as textile, non-woven fabric and natural/synthetic leather, so as to be used as the sockliner.

vi) Foam padding—This component is a cushioning member for improving the buffering, wear comfort and heat insulation of the shoes. The foam padding adopting the foam of the present invention can protect the ankle, instep and outside of the foot. For instance, the foam padding can be easily provided with the improved properties and functions by using the foam of the present invention.

vii) Stiffener—This component is inserted to the upper so as to prevent distortions of the upper and protect the heel and ankle. The stiffener can be easily provided with the improved properties and functions by using the foam of the present invention.

viii) Instep pad or tongue—This component has the similar functions as the foam padding described above.

ix) Molded component—This component increases the shock absorbing forces, duration forces and supporting forces of the upper so as to achieve the functional enhancement of shoes, or improves the appearance of the shoe. This molded component is separately molded to be attached to a portion of the upper. Namely, the molded component can be formed of the foam manufactured by the present invention, and coupled to portions of the upper.

In the related art, a natural/synthetic leather, fiber, textile, rubber, non-woven fabric, or synthetic resin is compression-molded or extruded in a various shape to be used for such molded component, and then the molded or extruded material is combined with other adhesive buffing material to be attached to the upper. However, the present invention adopts the foam described above singly or with other re-molded foam, and then attaches the foam to the upper of the shoe.

Figure 18A:
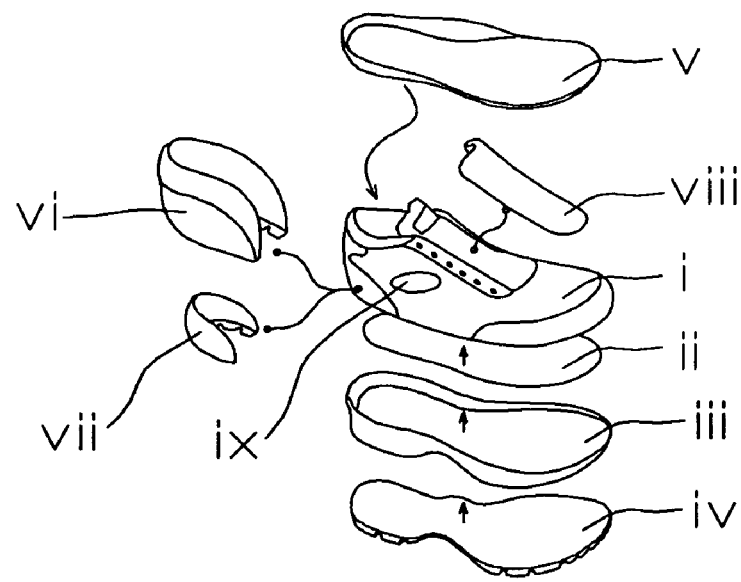
FIGS. 18a to 18f illustrate exemplary applications of the cross-linked foam of the present invention to many parts of a shoe.
Figure 18B:
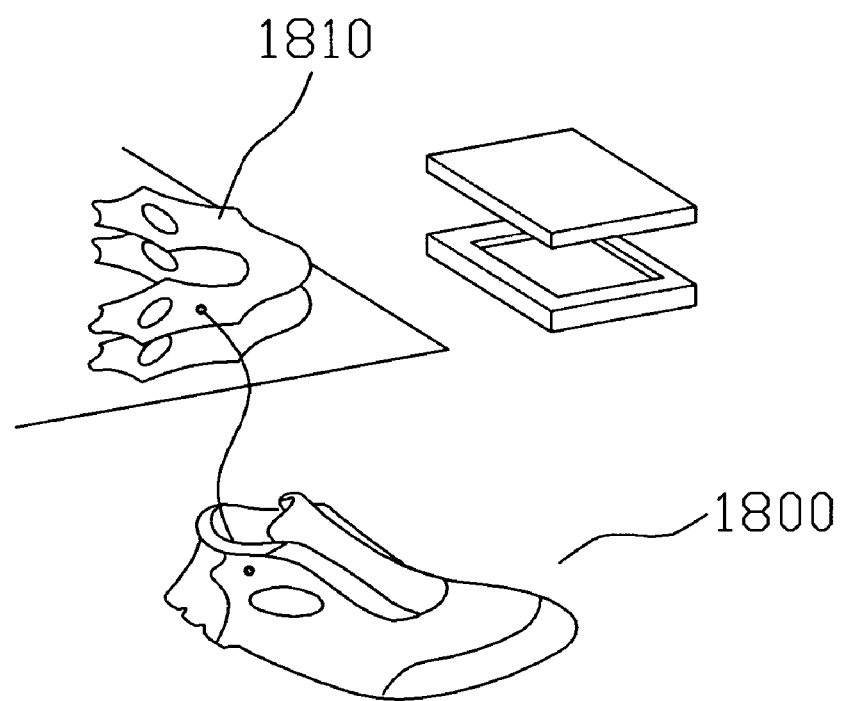

FIG. 18b illustrates an upper formed from an upper material 1810. The upper material 1810 is first cut into a desired shape, and then the cut material is sewed with and attached to other materials to form the upper 1800.

Figure 18C:
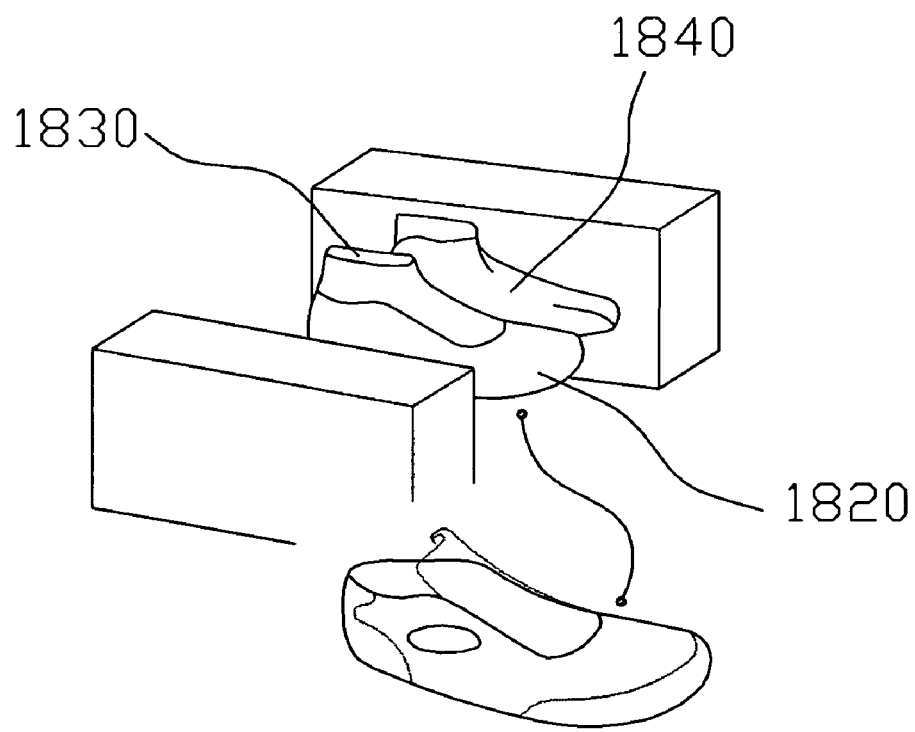

FIG. 18c illustrates a manufacturing process of a three-dimensional upper. A film-type material 1820 having a thickness of 1 mm covers a metal last 1830 that has a foot shape. Then, the metal last 1830 covered by the film-type material 1820 is inserted in a cavity 1840 of a molding die, and foamed by the pressure cross-linked foaming method of the present invention. Therefore, the three-dimensional upper is completed.

Figure 18D:
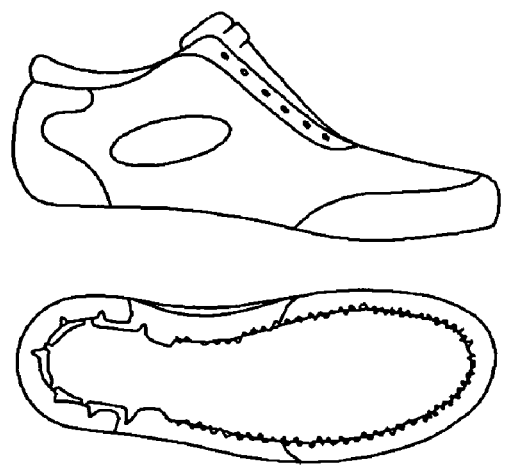

FIG. 18d illustrates an upper obtained by attaching or sewing the inner sole to the three-dimensional upper of FIG. 18c.

Figure 18E:
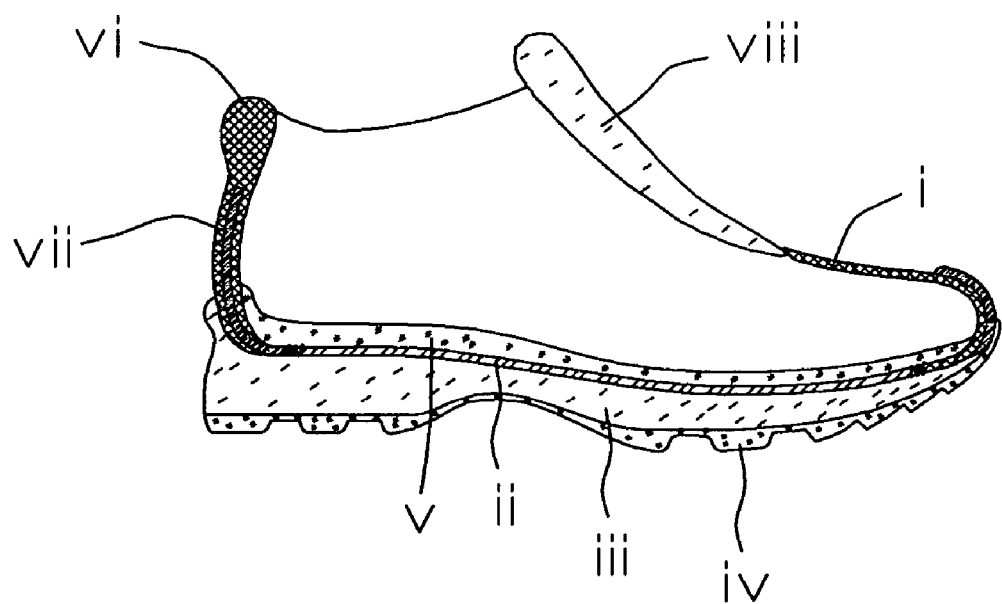
Figure 18F:
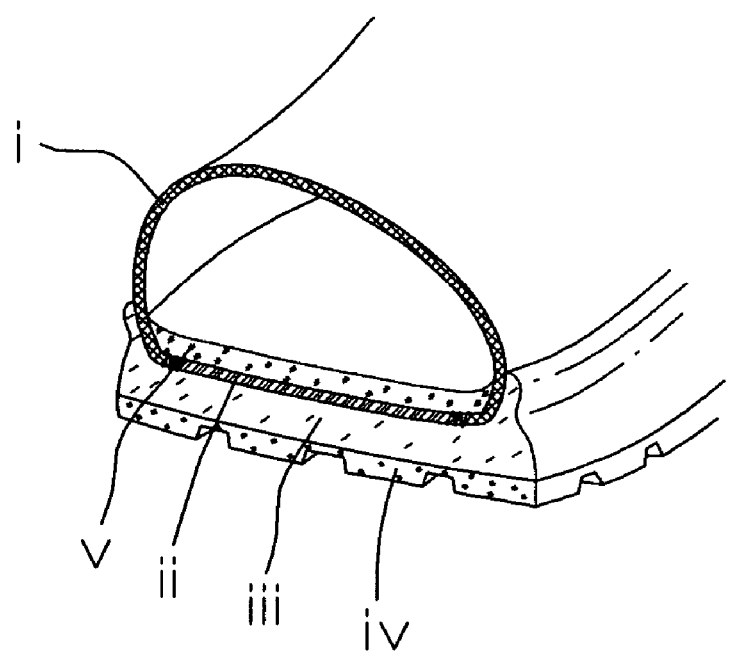

FIGS. 18e and 18f are cross sectional views illustrating a shoe that is obtained by attaching a midsole, an outsole and a sockliner to the three-dimensional upper of FIG. 18d.

The above-described components are used herein so as to effectively explain embodiments of the present invention, and the types of shoes are not restricted by those components. The components can be selectively used or modified so as to manufacture shoes of a wide variety of uses and designs. For example, the upper can be simply connected to the midsole so as to manufacture slippers and sandals. The components can be applied to in-line skate shoes or ski shoes.

Examples of Upper Structure

FIGS. 19a to 19e illustrate exemplary applications of the cross-linked foam of the present invention to an upper of a shoe.

Figure 19A:
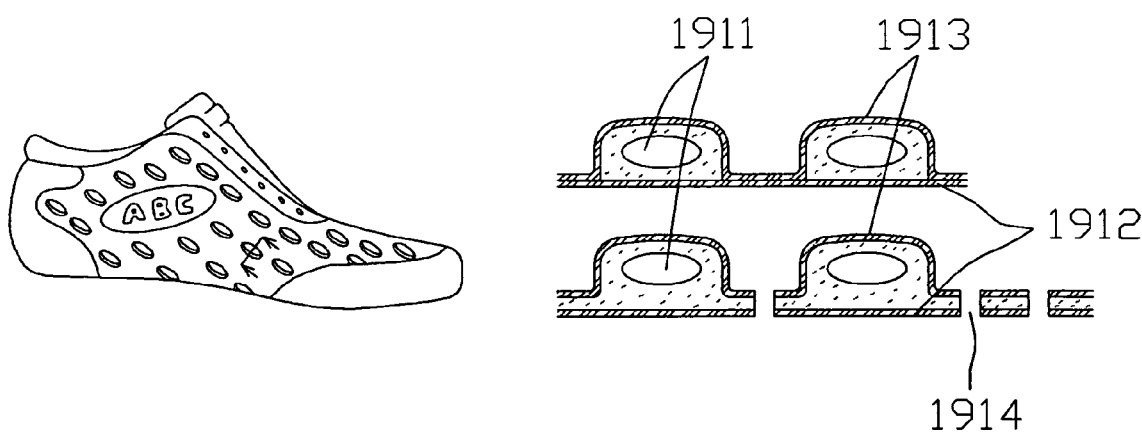
FIGS. 19a to 19e illustrate exemplary applications of the cross-linked foam of the present invention to the uppers of a shoe.

FIG. 19a shows side and cross-sectional views of an upper that is manufactured by one of the aforementioned third, thirteenth and fifteenth embodiments. A foam having an inner cavity structure 1911 is independently disposed on a textile 1912, thereby forming an intermediate structure. An additional stuff 1913, such as textile or natural/synthetic leather, is attached to the surface of the intermediate structure, and then the intermediate structure including the additional stuff 1913 is re-molded or punched to form holes 1914 for an air flow, completing the upper. Other components may be attached to the upper for decoration.

Figure 19B:
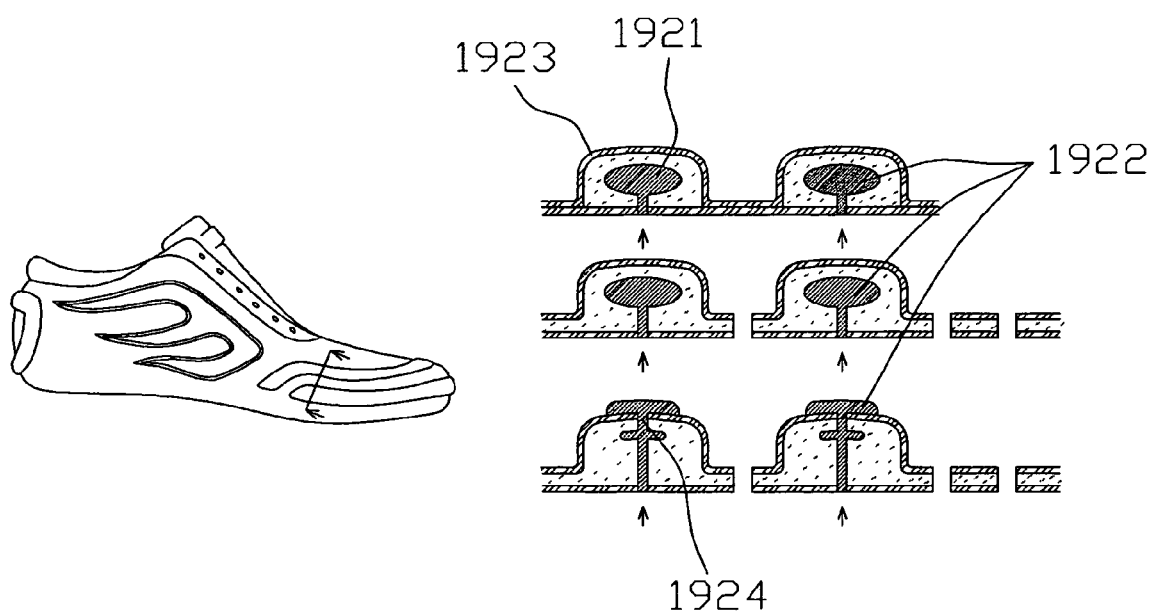

FIG. 19b shows side and cross-sectional views of an upper that is manufactured by one of the aforementioned eighth and ninth embodiments. A material 1922 that is the same as or different from a foam is injected into an inner cavity formed by an internally-formed surface 1921. Alternatively, the foam is punched to have a hole 1924 to the inner cavity 1921, and the material 1922 is injected into the inner cavity 1921 and formed both in the inner cavity 1921 and on the surface 1923 of the foam. Therefore, the upper having various properties is completed. Also the upper may be attached with other components.

Figure 19C:
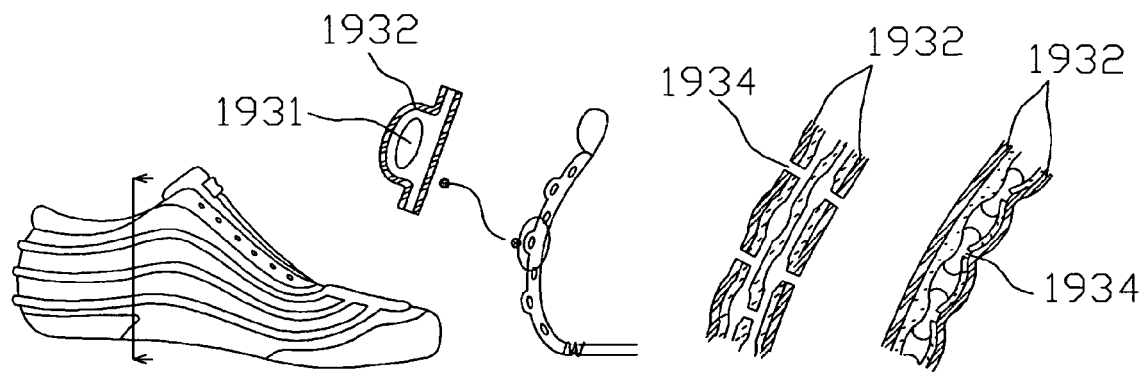

FIG. 19c shows side and cross-sectional views of an upper that is manufactured by one of the aforementioned first and second embodiments. A foam having an inner cavity 1931 is provided, and then a material 1932 different from the foam is attached to the foam before or after perforating to the inner cavity 1931 to form a hole 1934. Also, the foam having the material 1932 and the hole 1934 may be re-molded. Thus, the upper having the air circulation system and buffering functional system can be obtained.

Figure 19D:
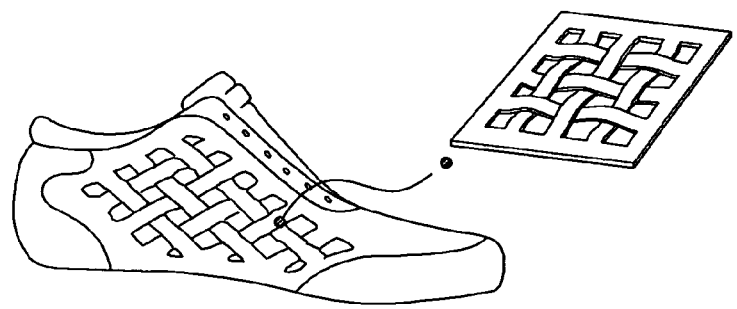

FIG. 19d shows an upper that is manufactured by one of the twelfth and fourteenth embodiments. The upper of FIG. 19d is formed to have an air circulation system, and combined with other components to improve properties and functionality.

Figure 19E:
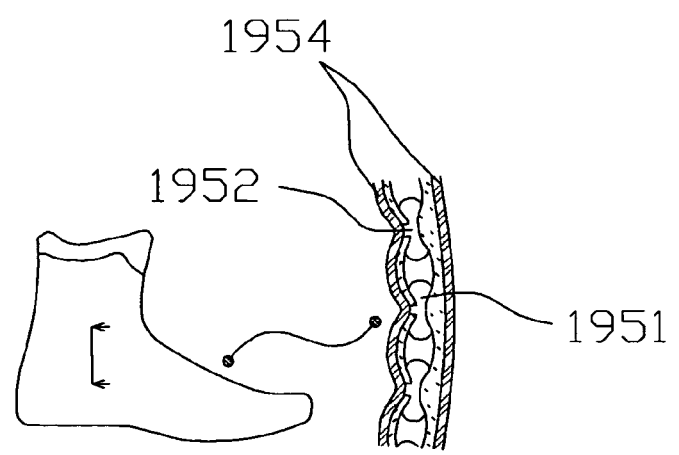

FIG. 19e shows an upper that is manufactured by one of the first and second embodiments. A foam having an inner cavity 1951 is provided and a perforation process is performed to form a hole 1952 to the inner cavity 1951. Thereafter, other desired material 1954 is attached to the foam so as to achieve the improved buffering and heat insulating performances. Thus, the upper of FIG. 19*e* is completed.

Examples of Inner Sole Structure

Figure 20:
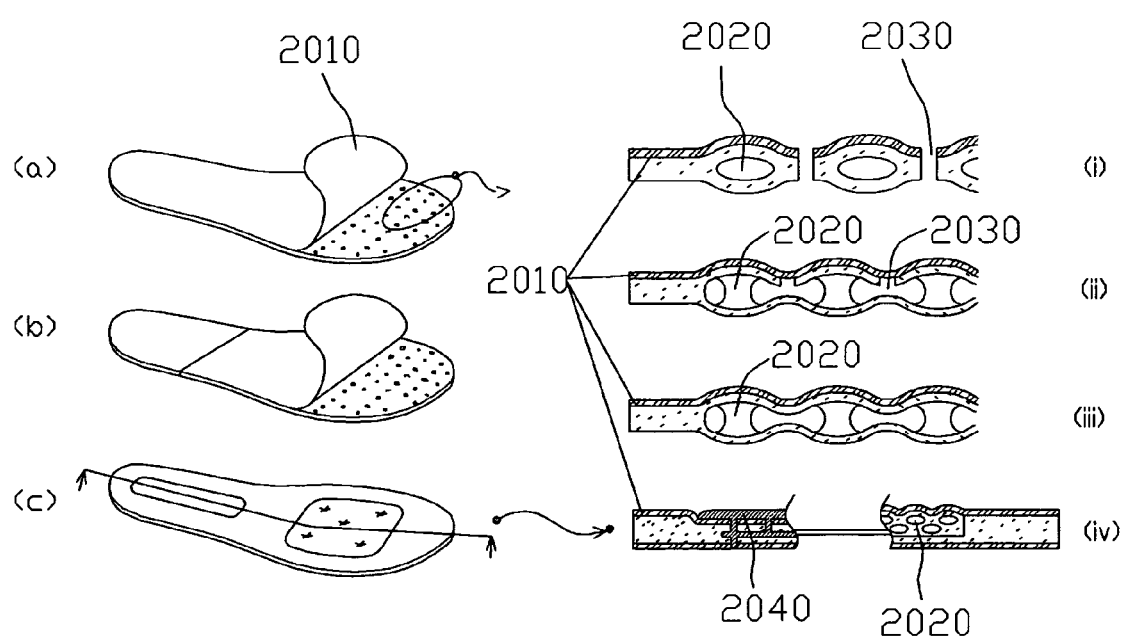
FIG. 20 illustrates an exemplary application of the cross-linked foam of the present invention to an inner sole of a shoe.

FIG. 20 illustrates an exemplary application of the cross-linked foam of the present invention to an inner sole of a shoe. Particularly, three examples (a)-(c) of the inner sole are shown. Parts (i)-(iii) of FIG. 20 correspond to the examples (a) and (b) of FIG. 20, and part (iv) corresponds to the example (c) of FIG. 20.

The foam having an inner cavity structure 2020 is joined with a material 2010, for example, a leather plate, a cellulose plate, a non-woven fabric, or textile. Thereafter, the foam joined with the material 2010 is perforated to form holes 2030 that expose the inner cavity structure 2020 (ii) or penetrate the foam (i), such that the foam can have the improved air ventilation and the moisture discharge. Especially, the example (b) of FIG. 20 has different flexibility and hardness in the forefoot and heel portions of the inner sole ((ii)-(iii) of FIG. 20). Additionally, the example (c) of FIG. 20 has a required hardness in a specific desired portion by way of injecting other material(s) 2040 as shown in (iv) of FIG. 20.

Examples of Midsole Structure

Figure 21:
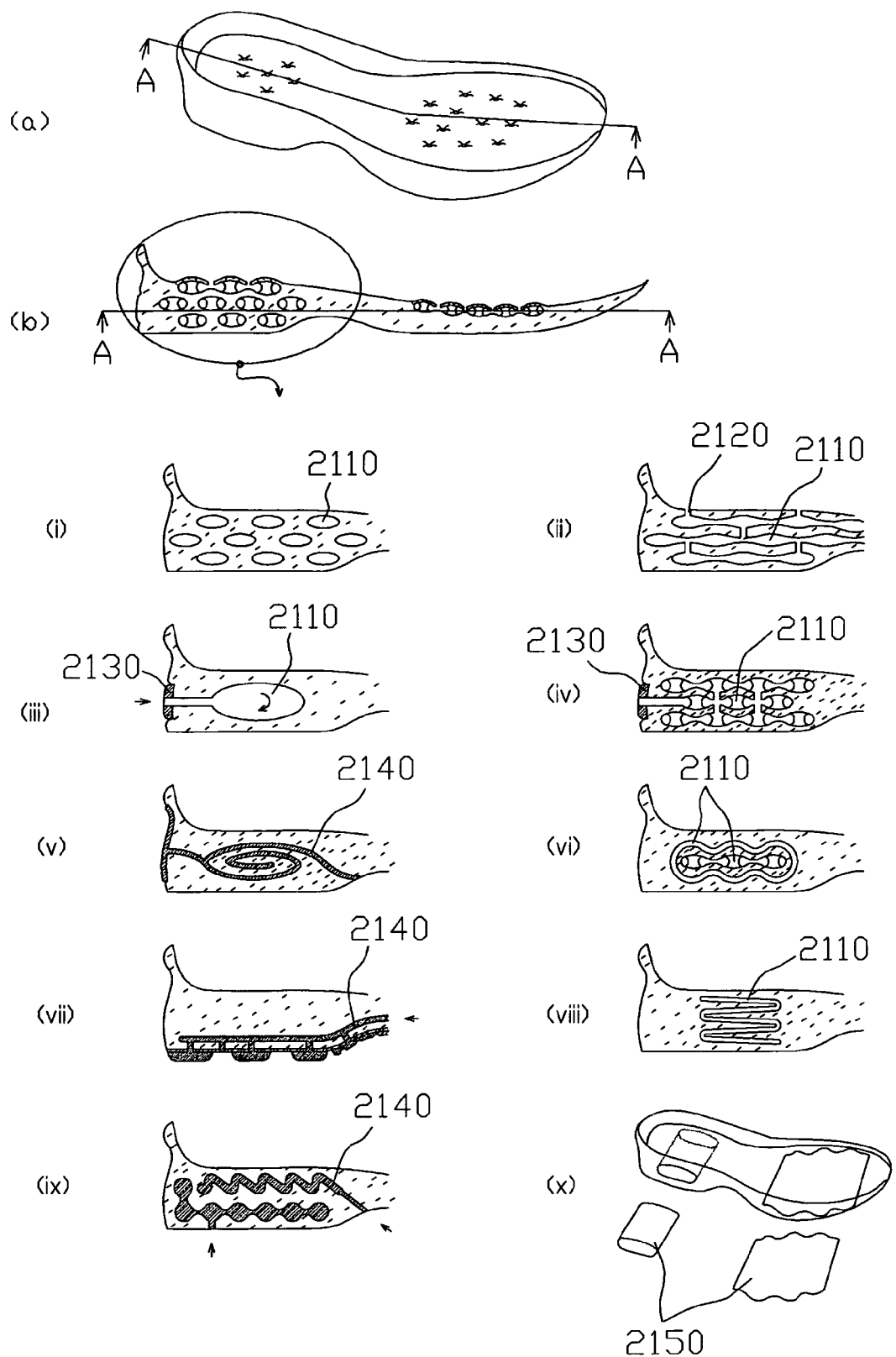
FIGS. 21, 22a and 22b illustrate exemplary applications of the cross-linked foam of the present invention to a midsole of a shoe.
Figure 22A:
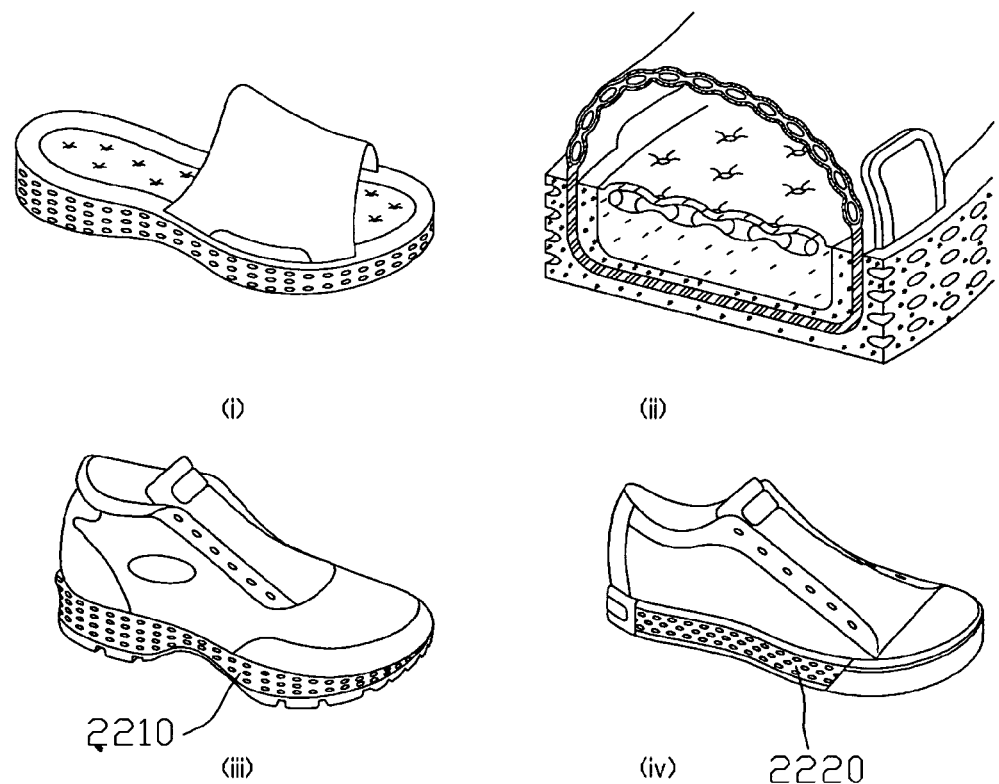
Figure 22B:
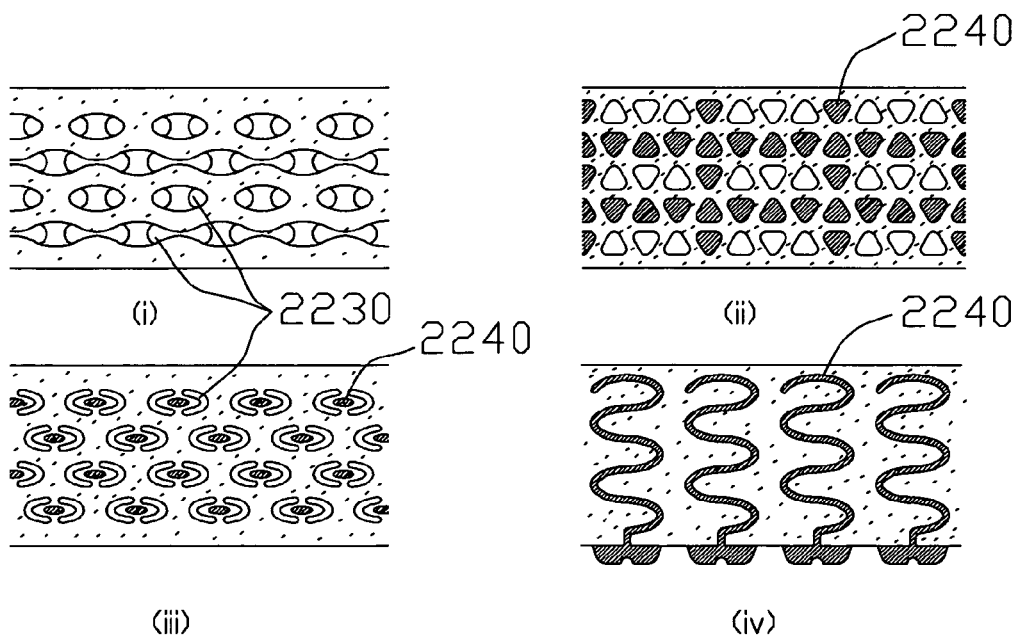

FIGS. 21, 22*a* and 22*b* illustrate exemplary applications of the cross-linked foam of the present invention to a midsole of a shoe. Foams or re-molded foams, which have a variety of inner cavity structures 2110, are shown in (a)-(b) and (i)-(x) of FIG. 21. Holes 2120 are formed in the foams or remolded foams, and a valve 2130 is attached to the foam around the hole 2120. The examples (v), (vii) and (ix) show that a material 2140 different from the foam is injected into the inner cavity 2110. The example (x) of FIG. 21 shows a method that separates a portion 2150 from the foam or re-molded foam.

FIG. 22*a* illustrates different examples of shoes including the midsole of the present invention, and FIG. 22*b* are cross-sectional views illustrating various examples of the foam structure of the midsole of FIG. 22*a*. The midsoles of FIGS. 22*a* and 22*b* are obtained by cutting or grinding the panel-shaped foam. The obtained midsole can be used in an entire portion 2210 or a part 2220 of the shoe outsole, e.g., in the slippers or sandals. The midsole has an inner cavity structure 2230 that has a wide variety of shapes, and an inner cavity structure 2240 that is formed of composite materials. The inner cavity structure 2240 can be exposed outward so as to achieve the improved functionality and aesthetic enhancement of the midsole. The present invention permits shoe component to be formed by assembling the foam having the cut surface and an inner cavity containing air layers, as shown in an example (ii) of FIG. 22*a*.

Examples of Outsole Structure

Figure 23:
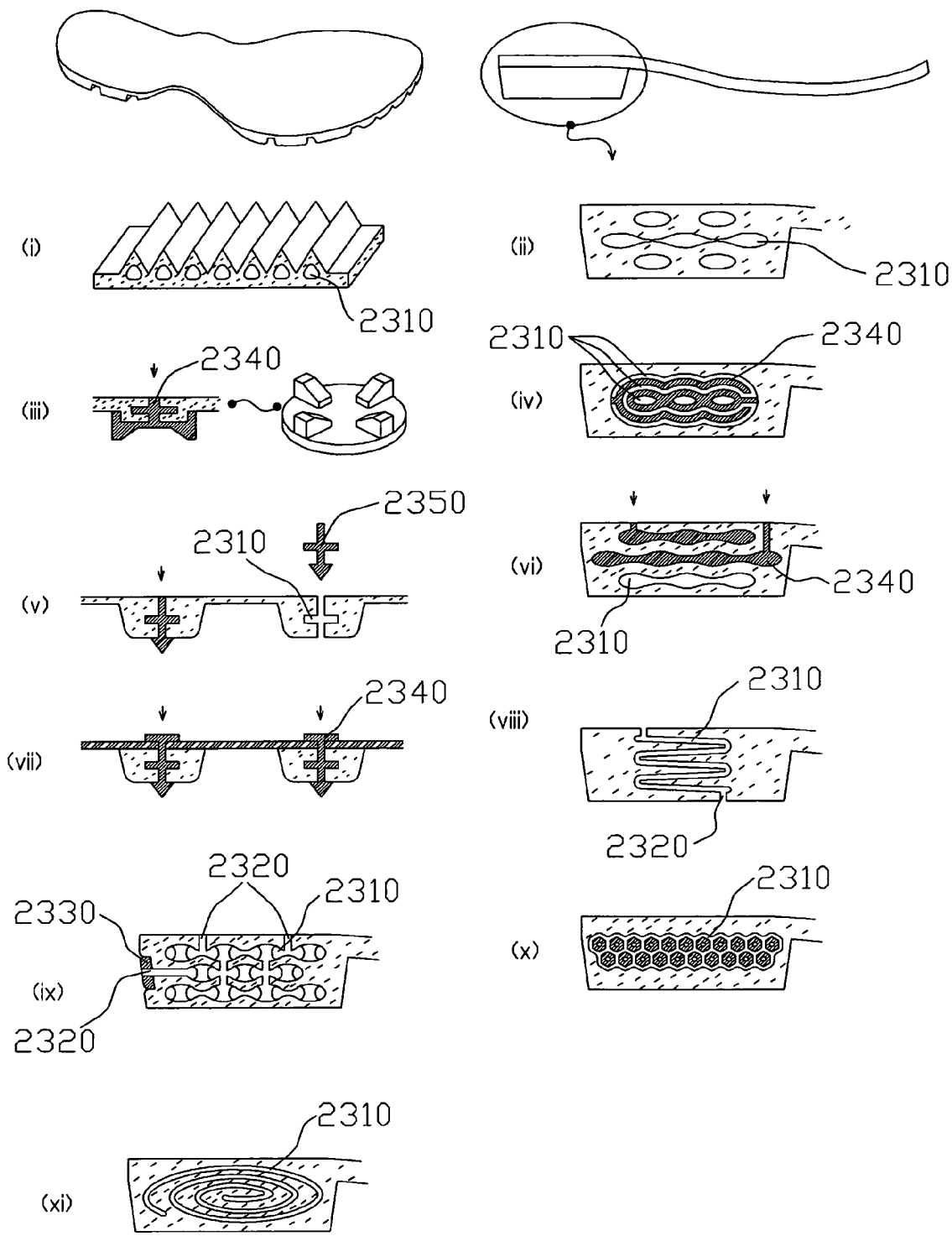
FIG. 23 illustrates exemplary applications of the cross-linked foam of the present invention to an outsole of a shoe.

FIG. 23 shows exemplary outsoles that adopt the foams of the present invention. As shown in different examples (i)-(xi) of FIG. 23, primary foam or secondary foam that has a variety of inner cavity structures 2310 is used for the shoe outsole. A hole 2320 is formed in such foams and a valve 2330 is installed in the foam around the hole 2320. A material 2340 different from the foam is injected into the foam to be attached to the inner cavity 2310, or a material 2350 also different from the foam is inserted into the inner cavity 2310.

Examples of Sock or Sockliner Structure

Figure 24:
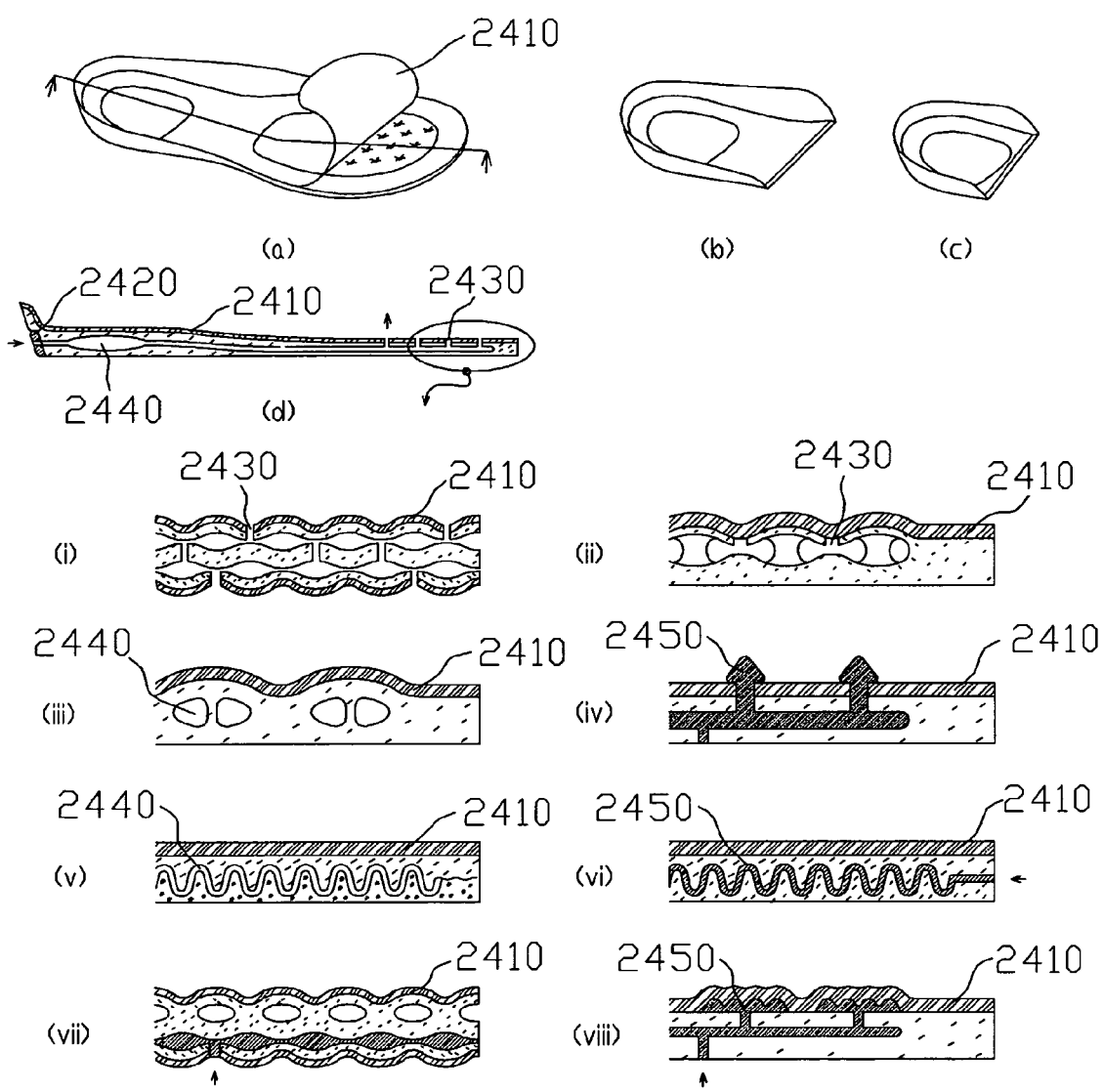
FIG. 24 illustrates exemplary applications of the cross-linked foam of the present invention to a sockliner of a shoe.

FIG. 24 illustrates exemplary shock or sockliner that adopts the foams of the present invention. As shown, examples (a), (b) and (c) of FIG. 24 show the entire shock, the half of the shock, and the heel part, respectively.

An example (d) of FIG. 24 is a cross-sectional view of a shock where one or more of a variety of materials 2410 as shown in (i)-(viii) of FIG. 24 is attached. A valve 2420 is installed in the foam body of the shock so as to form an inner cavity to inhale an external air. In the forefoot part of the sockliner, a plurality of ventilation holes 2430 are formed in order to achieve the air circulation of the inner cavity structure 2440. Namely, the sockliner has the structure where air inlet/discharge can be repeatedly performed when the volume of the inner cavity 2440 contracts/expands by a pressure applied from an external source.

The present invention allows for manufacture of a sock or sockliner that has a wide variety of air flow directions and structures in accordance with the structure of the inner cavity.

The examples (i) to (viii) of FIG. 24 are cross-sectional views illustrating the sock or sockliner that have a wide variety of properties and functions. One or more of the materials 2410 are attached to a foam body, and a plurality of holes 2430 are formed therein. A material 2450 different from the foam is injected into the inner cavity to achieve the variety of properties and functions.

Examples of Foam Padding or Instep Pad Structure

Figure 25:
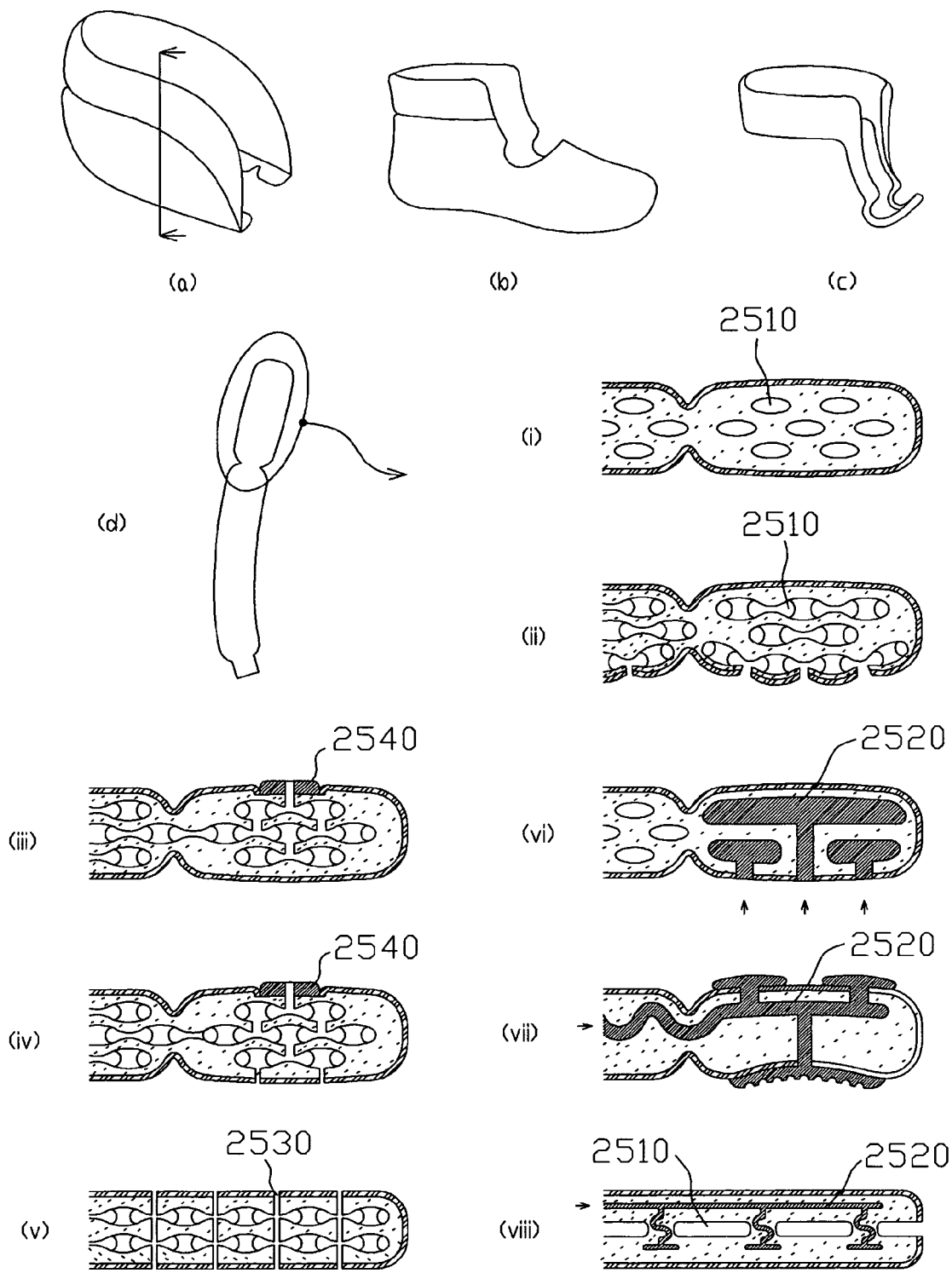
FIG. 25 illustrates exemplary applications of the cross-linked foam of the present invention to a foam padding of a shoe.
Figure 26:
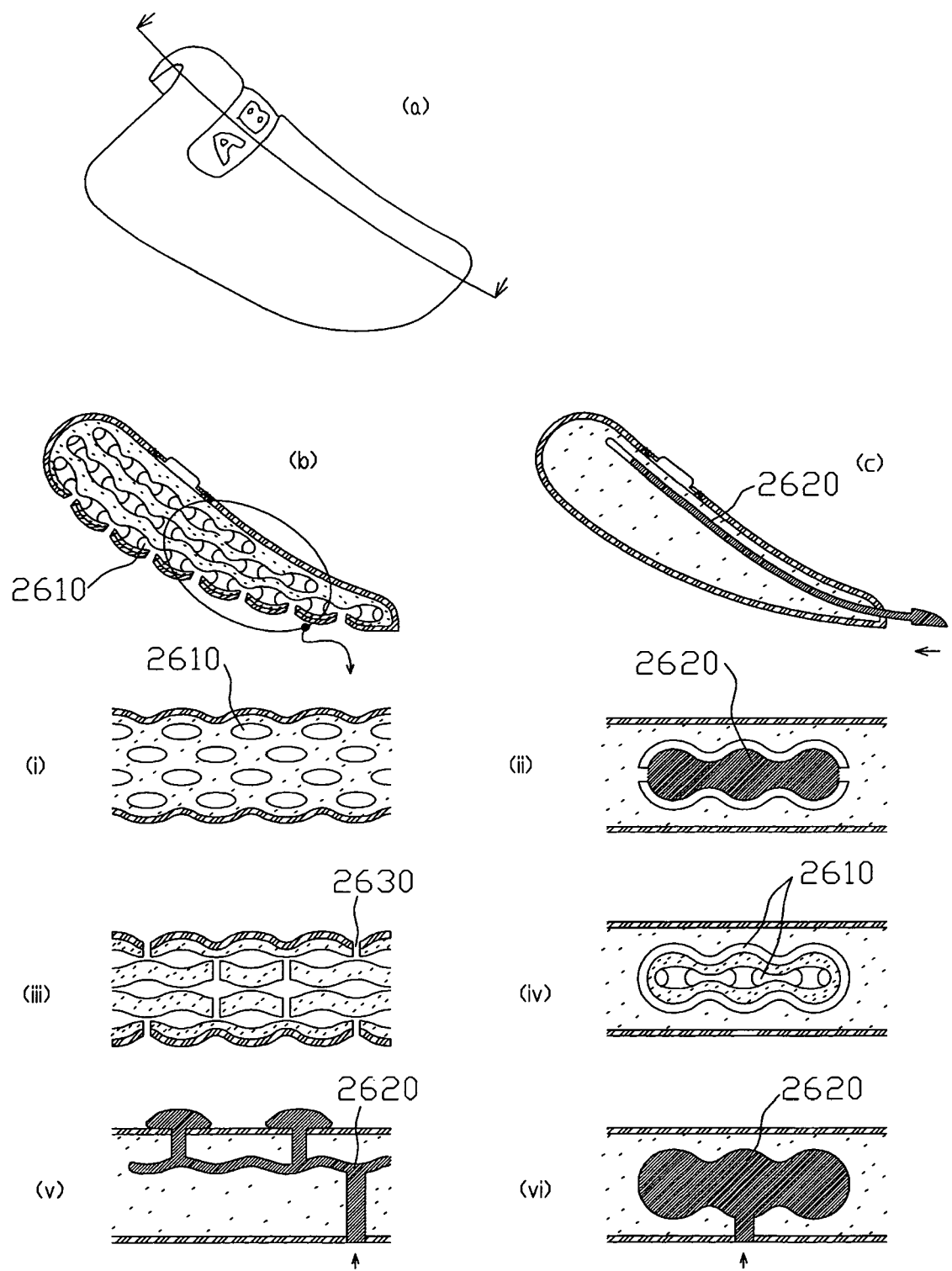
FIG. 26 illustrate exemplary applications of the cross-linked foam of the present invention to an instep pad of a shoe.

FIGS. 25 and 26 illustrate different examples ((a)-(d) and (i)-(viii) in FIG. 25, and (a)-(c) and (i)-(vi) in FIG. 26) of exemplary foam padding and instep pad, respectively, which adopt the foams of the present invention. As shown, the foam for the foam padding and instep pad has air layers 2510 and 2610 in various shapes. Also the foams have foreign materials 2520 and 2620 in the inner cavity structure, holes 2530 and 2630 penetrating the foam or the inner cavity, and valves 2540 around the holes 2530.

Example of Stiffener Structure

Figure 27:
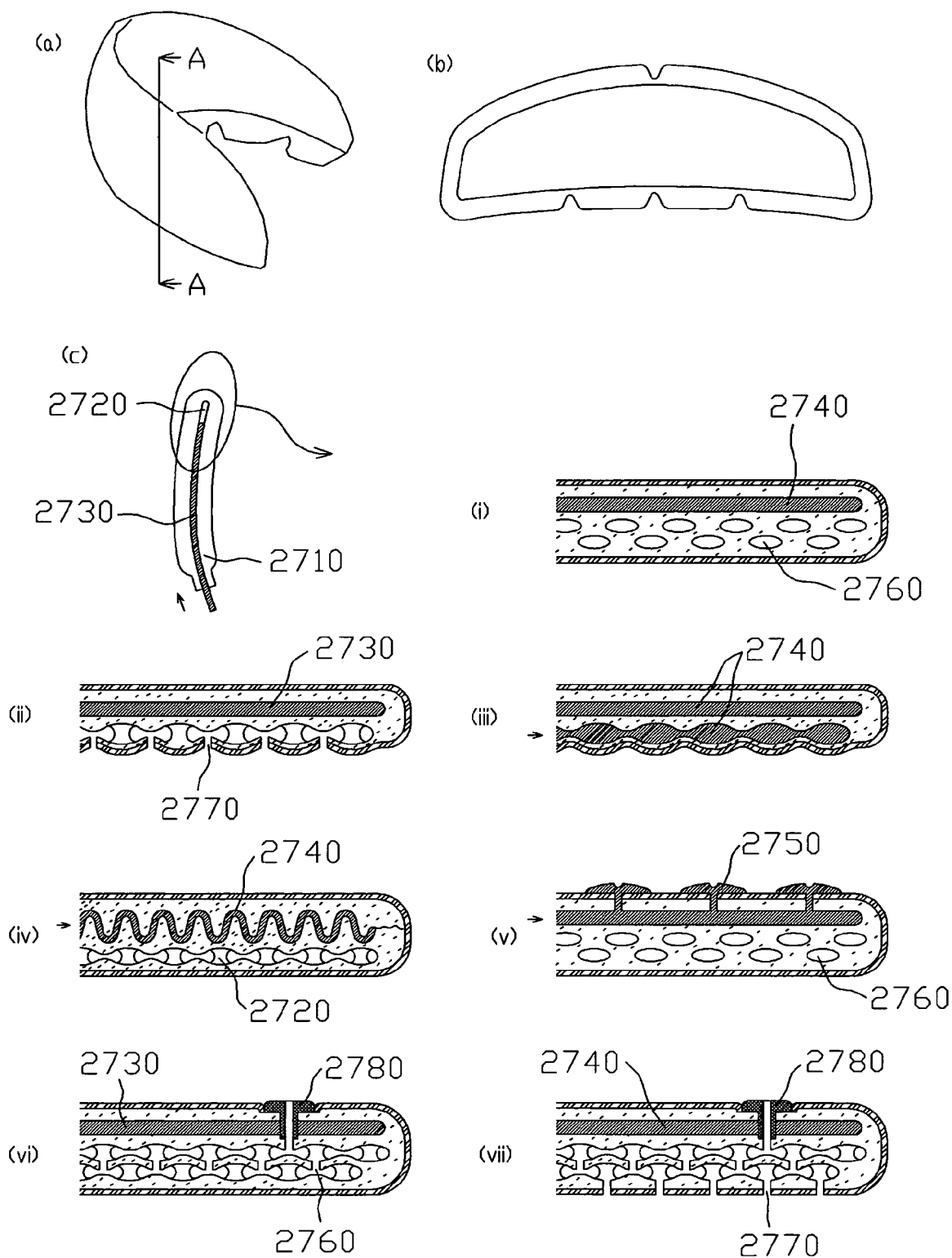
FIG. 27 illustrates exemplary applications of the cross-linked foam of the present invention to a stiffener of a shoe.

FIG. 27 illustrates an exemplary stiffener that adopts the foam of the present invention. Examples (a), (b) and (c) in FIG. 27 are a perspective view, a front view and a cross-sectional view taken along line A-A, respectively. Examples (i) to (vii) of FIG. 27 are cross-sectional views illustrating various examples of an inner cavity structure of the stiffer.

In the related art, a lightweight synthetic resin is inserted in the leather and then a cushiony is attached to the leather to form the stiffener. However, the present invention provides a foam 2710 having an inner cavity structure 2720 where a separately-made foam 2730 is inserted (ii) or a foreign material 2740 different from the foam is injected (iii or iv). The injected foreign material 2740 may extend to the surface of the foam to form a protrusion 2750. Further, an air layer 2760, a ventilation hole 2770 and valves 2780 may be formed installed in the foam of the present invention so as to control the density and hardness of the stiffener.

Examples of Molded Component Structure

Figure 28A:
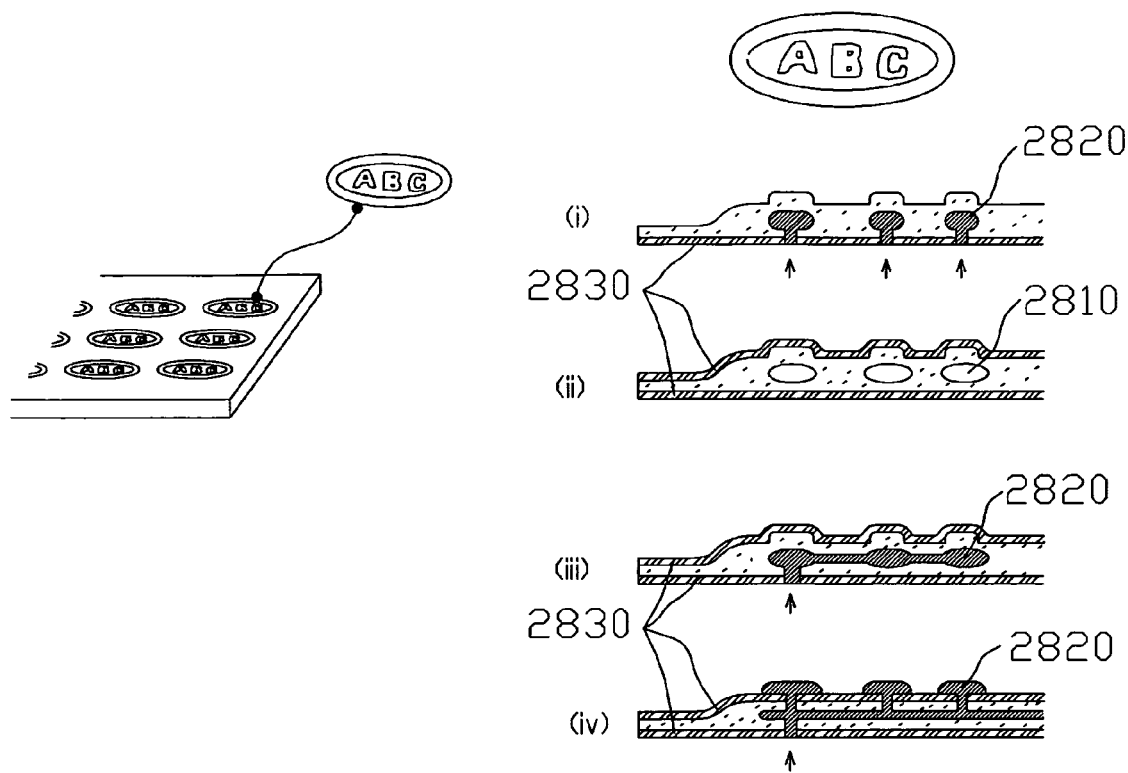
FIGS. 28a and 28b illustrate exemplary applications of the cross-linked foam of the present invention to molded components of the uppers of a shoe.
Figure 28B:
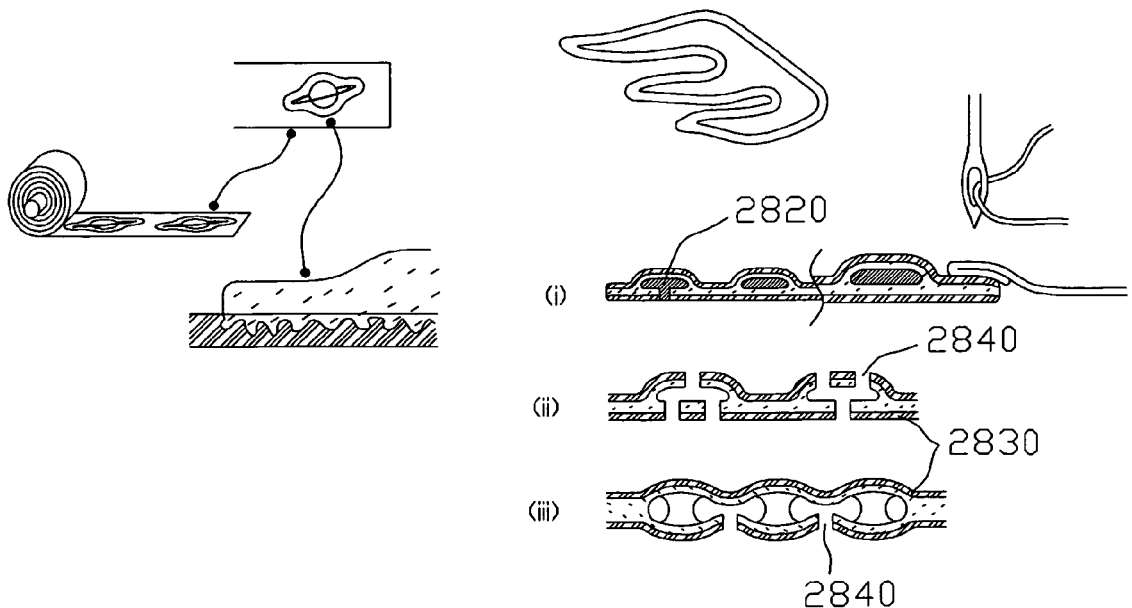

FIGS. 28*a* and 28*b* illustrate examples of molded components of shoes that adopt the foams of the present invention. Examples (i) to (iv) of FIG. 28*a* and examples (i) to (iii) of FIG. 28*b* are cross-sectional views showing different examples of the foams of the molded components.

The molded component of the related art includes a leathery material or a synthetic resin composite, which is designed and cut into various letters and logos, and a buffering material. However, the molded component of the present invention adopts a foam that has air layers 2810 and/or inserted composite materials 2820 to obtain a variety of densities and hardness. Also a foreign material 2830 different from the foam may be attached or printed onto the molded component. A plurality of holes 2840 may be formed to the inner cavity structure of the foam according to the present invention.

Figure 29A:
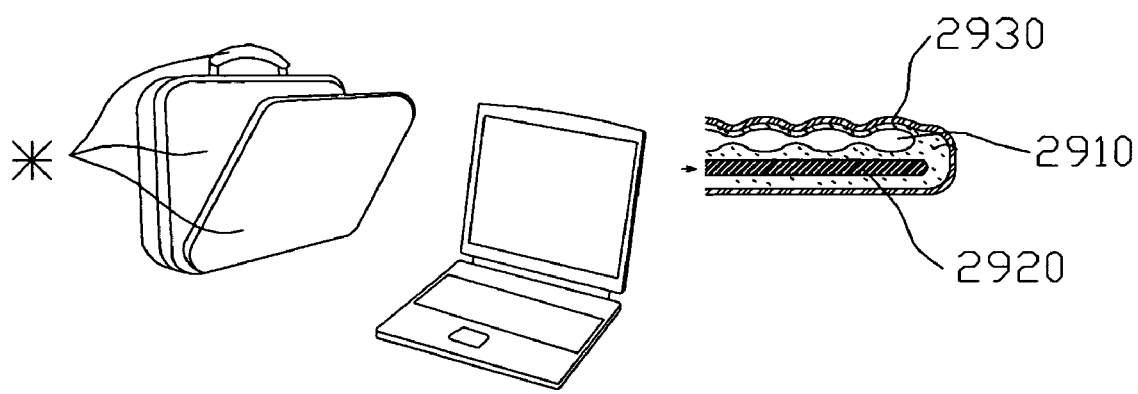
FIGS. 29a to 29t illustrates a wide variety of applications where the cross-linked foam of the present invention can be employed.
Figure 29B:
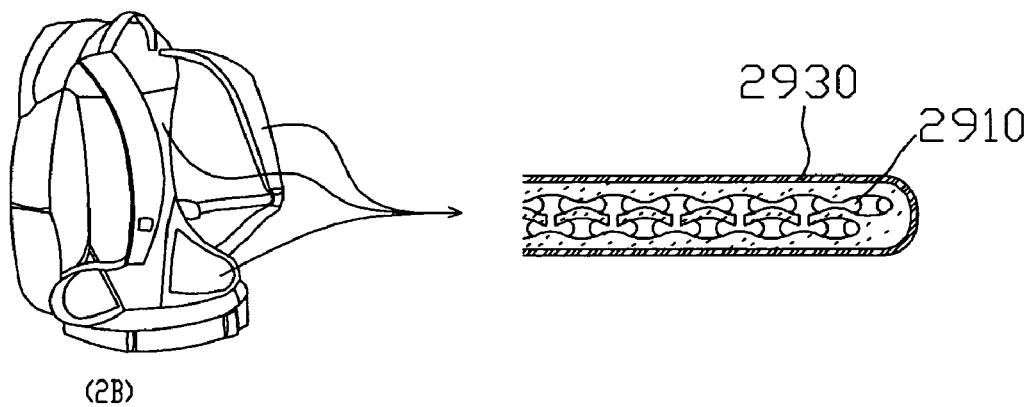
Figure 29C:
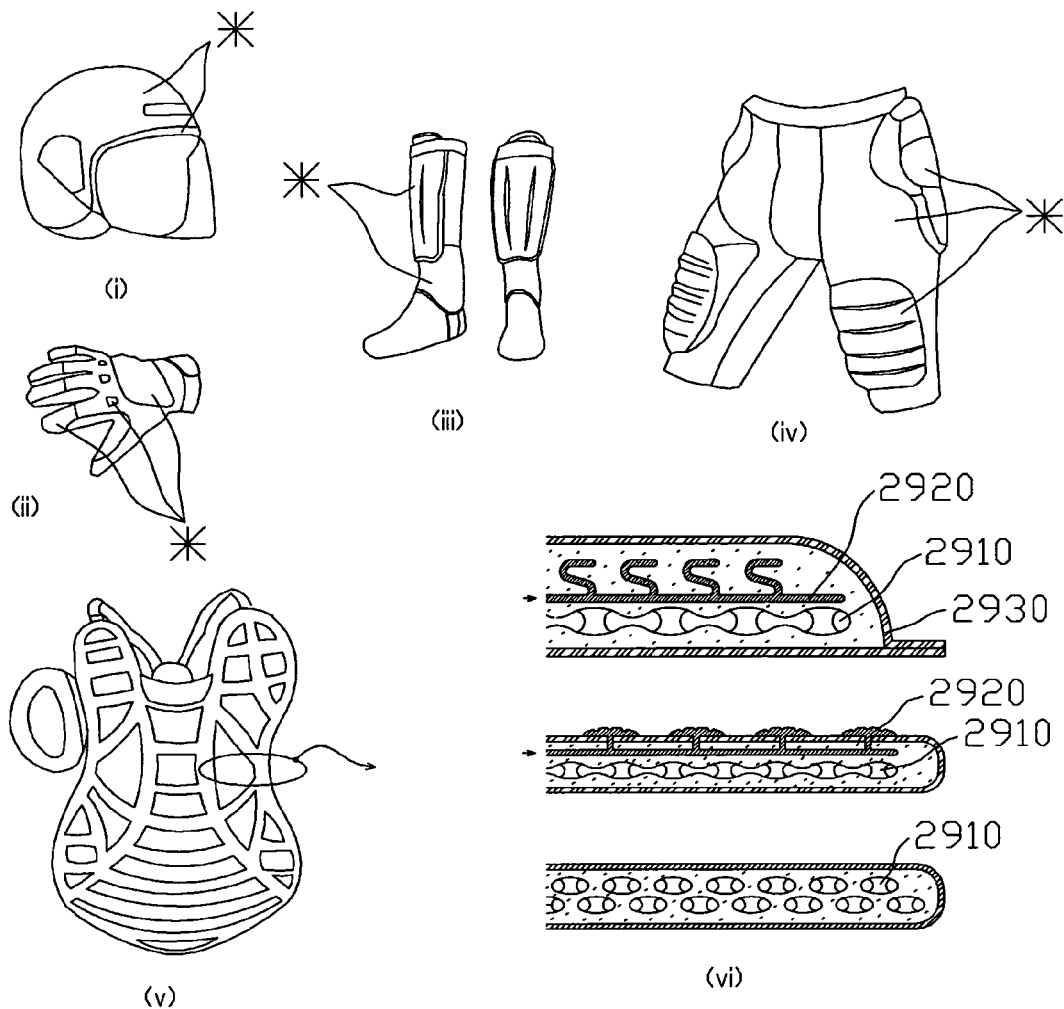
Figure 29D:
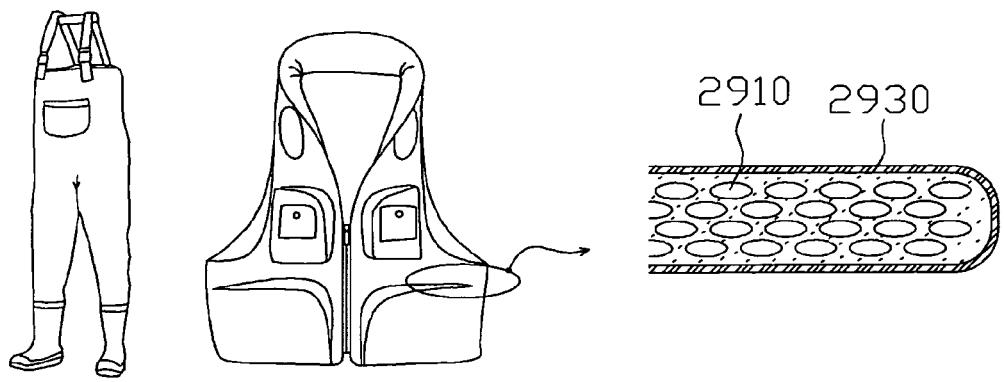
Figure 29E:
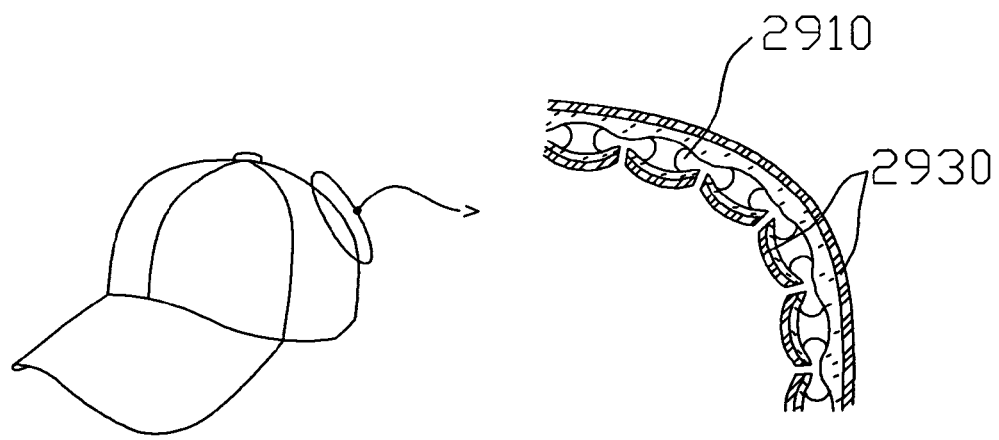
Figure 29F:
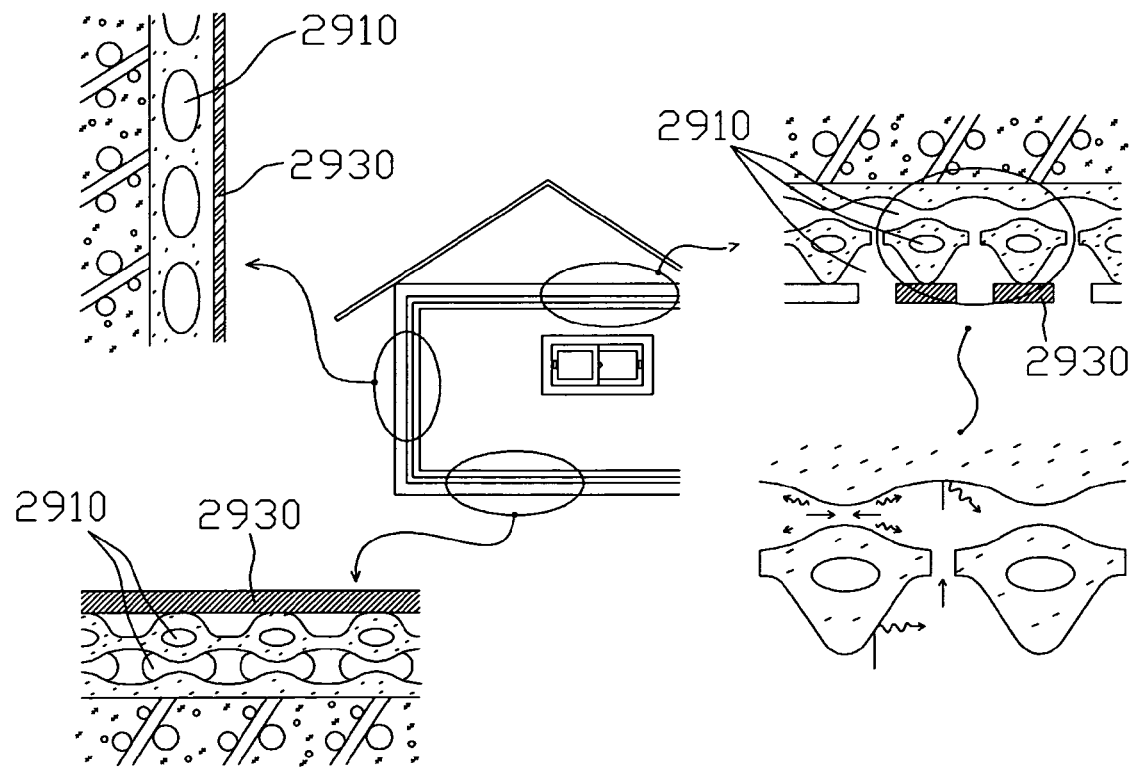
Figure 29G:
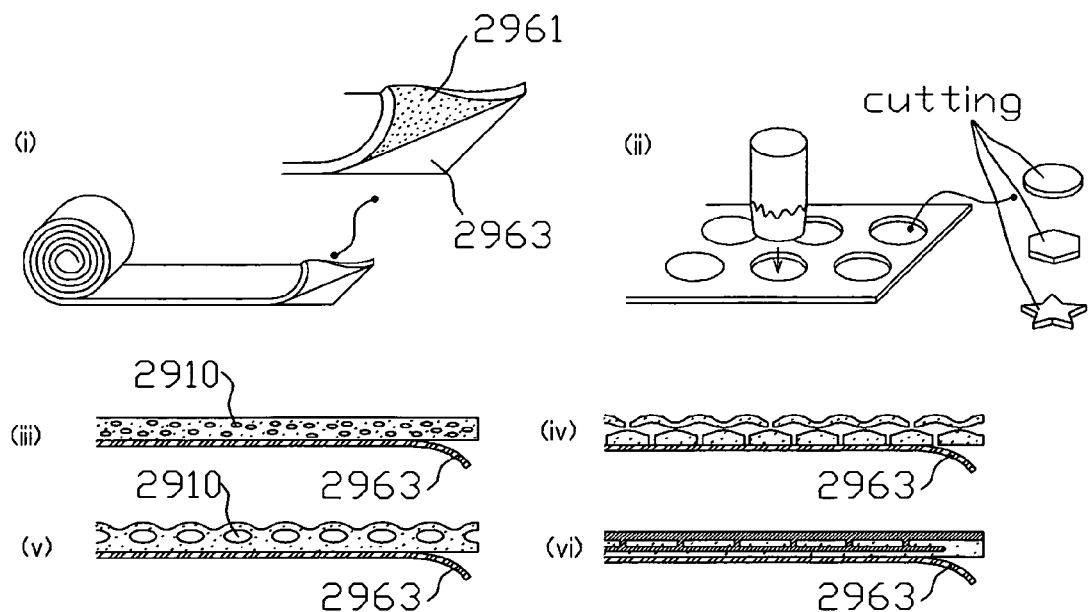
Figure 29H:
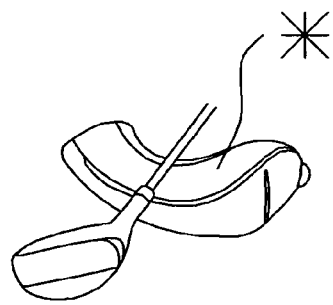
Figure 29I:
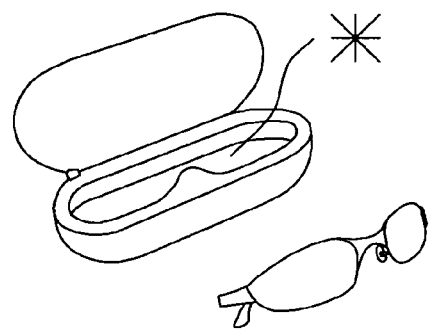
Figure 29J:
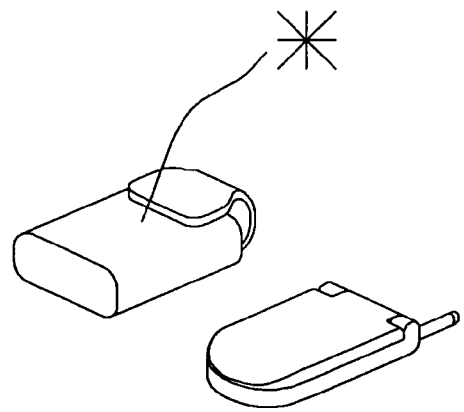
Figure 29K:
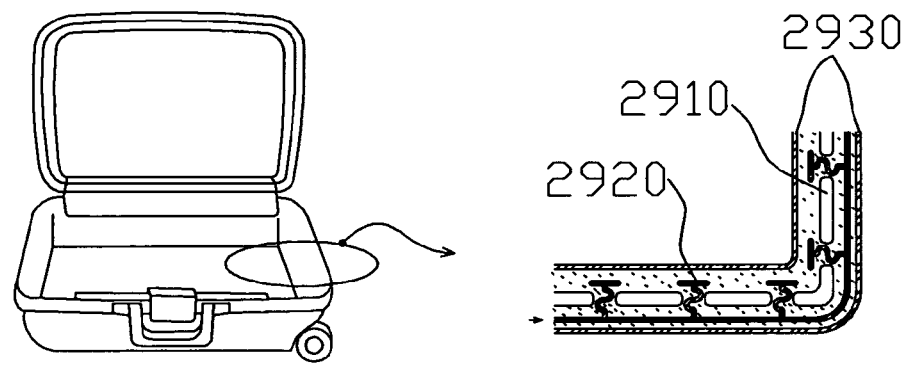
Figure 29L:
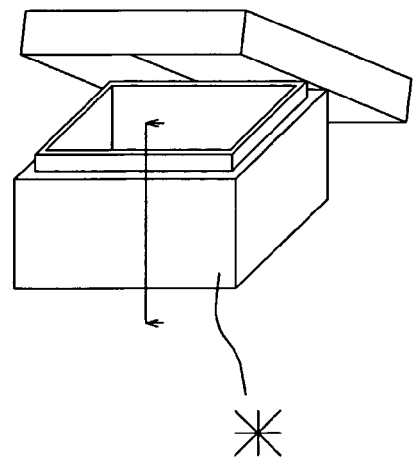
Figure 29M:
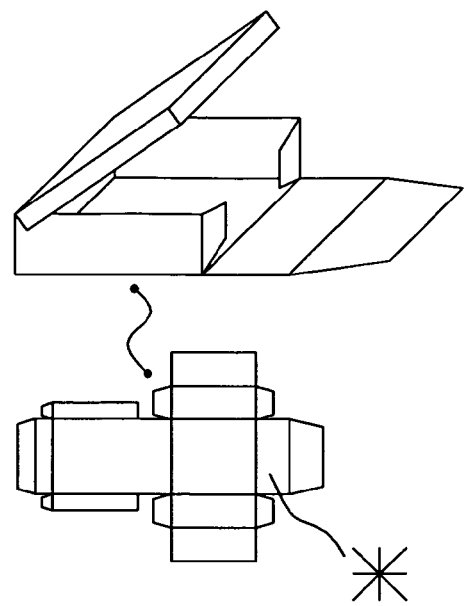
Figure 29N:
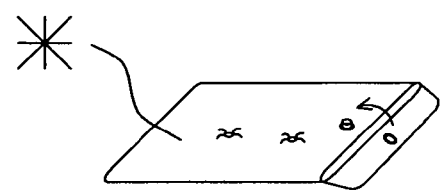
Figure 29O:
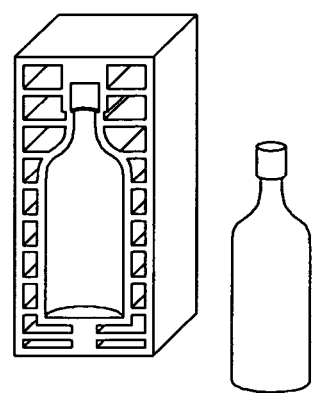
Figure 29P:
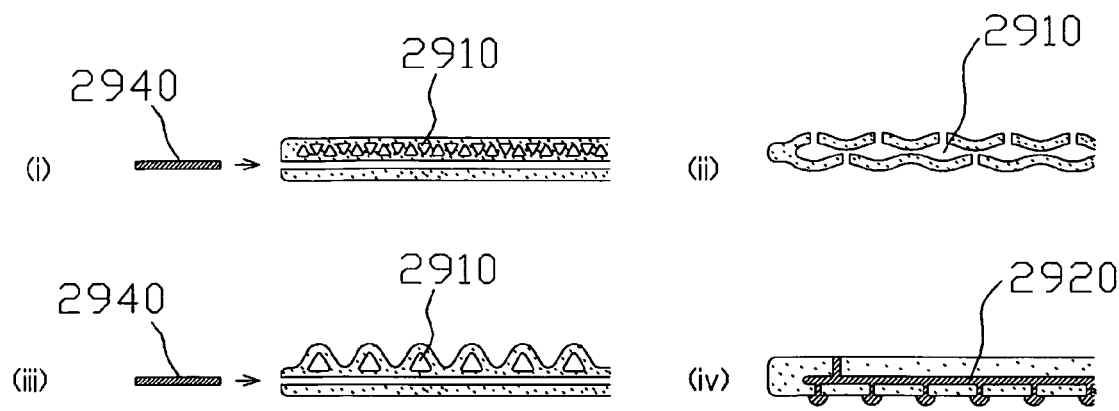
Figure 29Q:
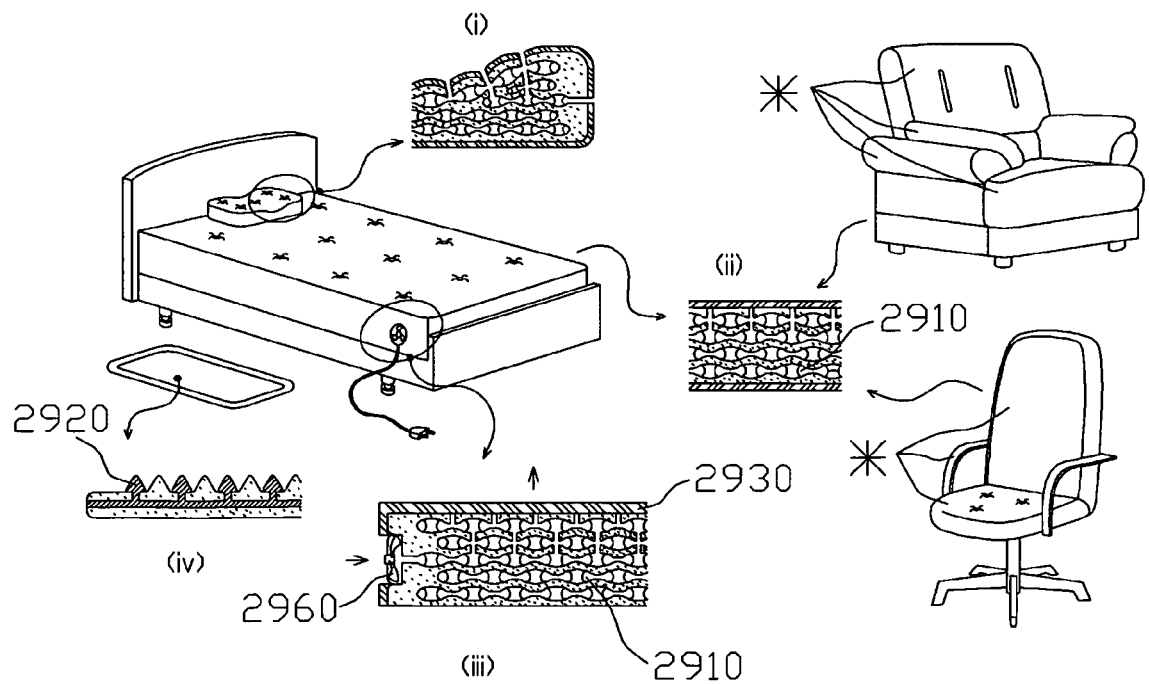
Figure 29R:
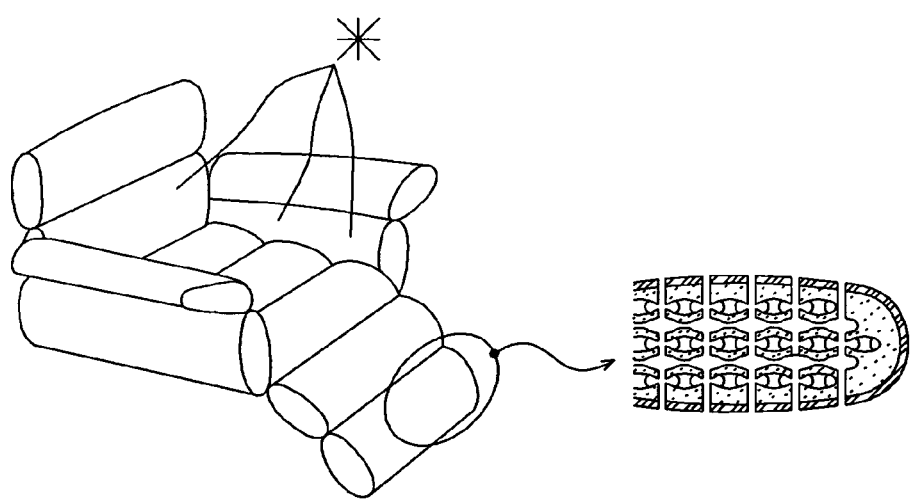
Figure 29S:
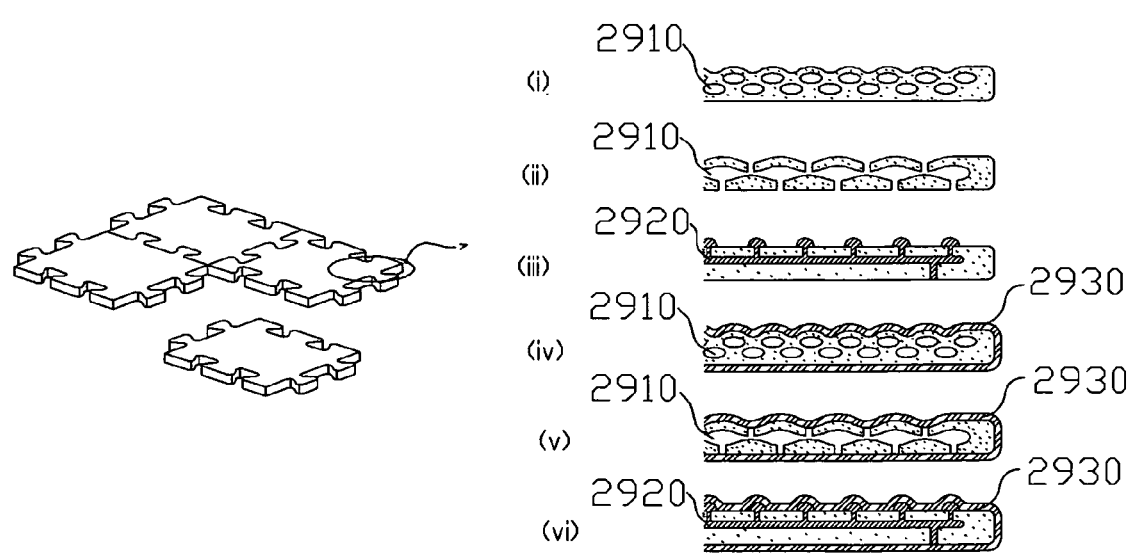
Figure 29T:
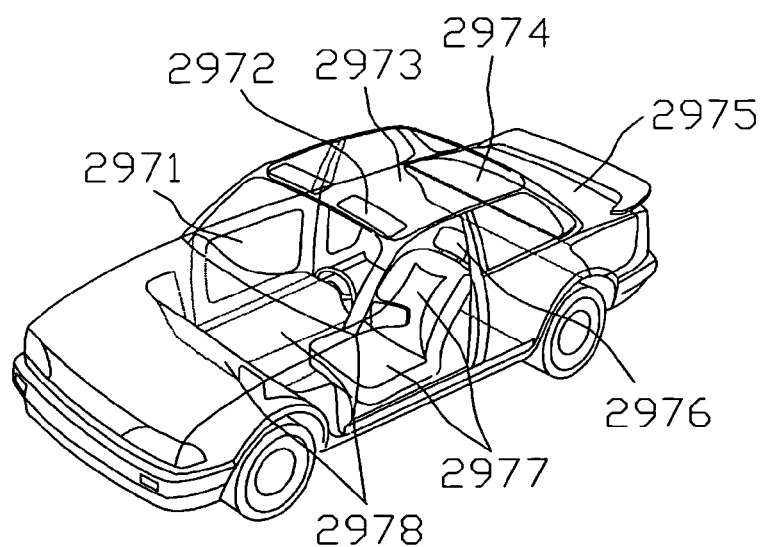
Figure 29T:
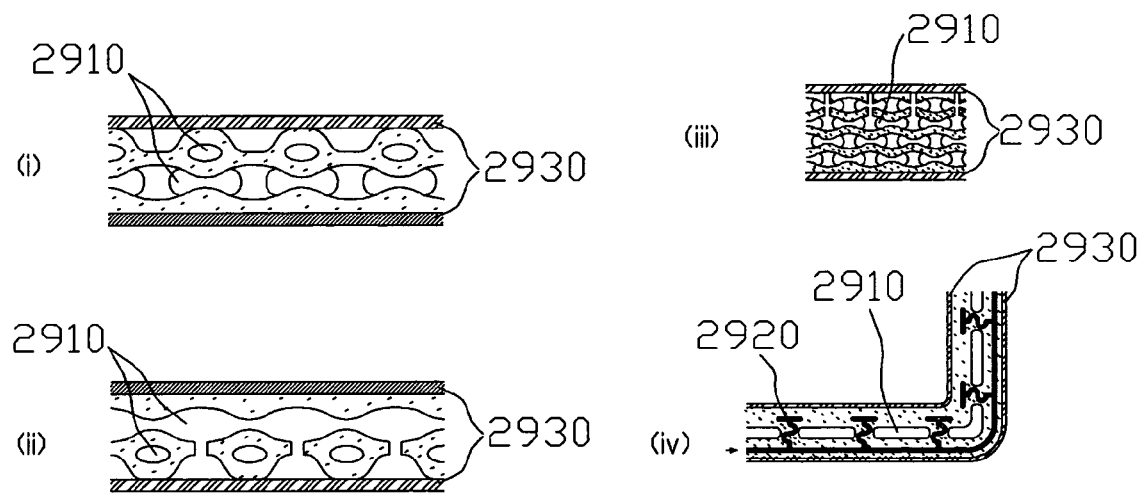
Figure 30:
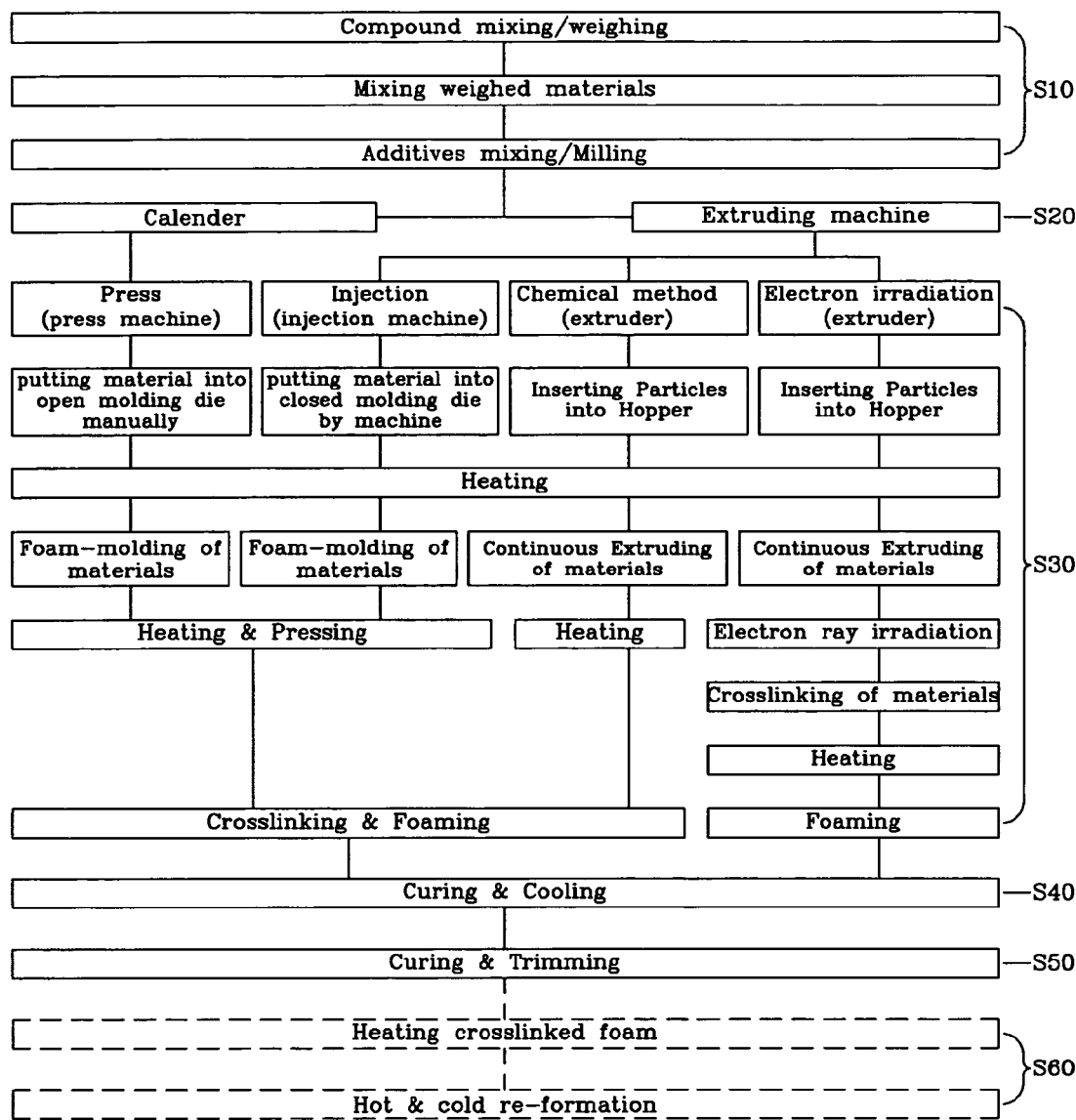
FIG. 30 is a flow chart illustrating process steps for manufacturing cross-linked foams according to a related art.

Examples of Employing the Foam of the Present Invention in Various Industrial Fields FIGS. 29a to 29t illustrate a wide variety of applications where the foam of the present invention is employed. It should be noted, however, that the present invention is not limited to such and is applicable to other fields or products. In FIGS. 29a to 29t, reference numeral 2910 denotes an air layer or an inner cavity structure, reference number 2920 denotes an injected material, reference number 2930 denotes foreign materials joined with the foam, reference number 2940 denotes a material molded independently and inserted into the inner cavity, and reference mark * denotes the portions where the foam of the present invention is applied.

Particularly, FIG. 29a illustrates a foam of the present invention employed in a laptop computer bag. Additionally, the foam may be applied to the carrier for the electronics goods, such as camera bags, or the briefcase, especially in tops, bottoms, and handles of the bags.

FIG. 29b illustrates a foam of the present invention employed in knapsacks or backpacks. The foam of the present invention may be applied to a shoulder strap and a back part of a bag. Additionally, the foam may be used as an internal/external buffering material in golf bags and other sports bags.

FIG. 29c illustrates a foam of the present invention employed in various parts of body protective equipment. Here in FIG. 29c, example (i) shows a helmet, example (ii) shows a glove, example (iii) shows a shin guard or leg protector, example (iv) shows a lower body protector, and example (v) shows a chest protector. Part (vi) of FIG. 29c are cross-sectional views illustrating modifications of foams usable in FIG. 29c. Additionally, the foam of the present invention may be applied to helmets, headgears, and ski goggles as an internal/external buffering or insulating material.

FIG. 29d illustrates a foam of the present invention employed in fishing goods, such as overalls and vests. The foam of the present invention can also be applied to a variety of floating equipment requiring buoyancy, for example, waterproof and heat insulating articles and life vests or preservers. The present invention can be applied to various aquatic sports equipment fabrication and other leisure industrial equipment fabrication. Further, the foam of the present invention may be used for various fishing components, marine product industries (e.g., buoys), and other oceanic industrial equipments.

FIG. 29e illustrates a foam of the present invention employed in a hat. The foam of the present invention can be applied to inner and outer members for hats and caps.

FIG. 29f illustrates a foam of the present invention employed in a building construction. The foam of the present invention can be applied to ceiling, wall, and floor appliances, as a soundproof or heat insulating materials. The foam can also be used in combination with other materials for finishing the indoor of the building.

FIG. 29g illustrates a foam of the present invention applied to foam tapes. An adhesive 2961 is formed on the foam of the present invention, and then a releasing sheet 2963 is attached to the adhesive 2961, thereby forming the foam tape, as shown in example (i) of FIG. 29g. Example (ii) shows the cutting process of the foam to form the tapes in various shapes. Examples (iii)-(vi) of FIG. 29g are cross-sectional views illustrating different the modifications of the foam tape according to the present invention.

FIG. 29h illustrates a foam of the present invention employed in a head cover of golf club. The foams formed by the aforementioned second, third, eighth or ninth embodiment can be applied to the articles requiring shock absorbance, shape recoverability, and internal/external hardness. The foam of the present invention can be also applied to covers and cases of musical instruments, tennis rackets, hockey sticks, and baseball bats.

FIGS. 29i and 29j illustrate a foam of the present invention used as a buffering member for glasses case and cellular phone case. The foam can be applied to protective cases for glasses, jewelry, watch, telephone, etc. that are fragile and vulnerable to the shock.

FIGS. 29k to 29o illustrate a foam of the present invention employed in various packing articles. The foam of the present invention is used as heat insulation and reservation material and a shock-absorbing material, such as in suitcases, boxes, containers, compatible box assembly, and a variety of envelopes.

FIGS. 29p to 29s illustrate a foam of the present invention used as a cushion member for beds, pillows, chairs, mattresses, mats, etc. Examples (i)-(iv) of a foam usable in various cushioning products are shown in each of FIGS. 29p and 29q. Example (iii) of FIG. 29q especially adopts a fan 2960 in the foam body, such that the air generated by the fan 2960 flows through the inner cavities and then is discharged to the outside through the ventilation holes, i.e., an air passage. Thus, the foam of the present invention can be utilized in the articles requiring the air ventilation system, such as mattresses and cushions. Further, the foam of the present invention can be used employed in the bicycle/motorcycle chair, car/train/airplane seats (e.g., FIG. 29r), and chair back so as to obtain a soft cushion, or in any cushioning product (e.g., (i)-(vi) of FIG. 29s).

FIG. 29t illustrates a foam of the present invention employed in part of car equipment. The foam of the present invention can be applied to a door cover 2971, sun visor 2972, headliner 2973, shelf 2974, trunk 2975, headrest 2976, seats 2977, and vehicle carpet 2978. Additionally, the foam of the present invention can be used as a sound proof and heat insulating member or a buffering member for vehicles, ship, and train. Further, it is possible for the foam to be combined with other materials for finishing and improving the internal/external appearance of the equipments. Different examples of the foam are shown in (i)-(iv) of FIG. 29t.

Meanwhile, the foam of the present invention may be used for the children's toys and sports requisites singly or with combining with other materials. Further, the foam can be employed in a water tank or a flowerpot for controlling the amount of water, in a cover for toilet seat lids, in a supporting member for conveying heavyweight stuffs, and in a tie-on strap for electric wires. Namely, the foam of the present invention is effectively applicable to various fields including, but not limited to, a household supply field, a decorating supply field, a securing or protecting supply field, and an industrial supply field.

The foam is not limited only in the embodiments of the present invention, but the various modifications are possible. The present invention can make the foam in various designs, sizes and structures to have desired properties. Namely, the present invention is not limited to the above-described embodiments and examples described herein.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A cross-linked foaming method comprising:
preparing at least two foaming materials for a cross-linked foaming, each of the foaming materials processed to have a plane or three-dimensional shape;
forming at least one interfacing pattern on a surface of at least one of the foaming materials using at least one interfacing material that prevents chemical and physical interaction between the foaming materials; and
forming a cross-linked foam by foaming the foaming materials including the foaming material having the interfacing pattern thereon, the cross-linked foam having a foam body and an internally-formed surface.

2. The method according to claim 1, further comprising combining another foaming material with the foaming material having the interfacing pattern thereon before the step of forming the cross-linked foam.

3. The method according to claim 1, wherein at least one of the foaming materials is selected from either an EVA-based film or a material having a plane or three-dimensional shape with a surface roughness to easily form the interfacing pattern thereon.

4. The method according to claim 2, wherein at least one of the foaming materials is selected from either an EVA-based film or a material having a plane or three-dimensional shape with a surface roughness to easily form the interfacing pattern thereon.

5. The method according to claim 1, wherein at least one of the foaming materials is selected from the group consisting of:
synthetic resins including an ethylene-vinyl acetate (EVA)-based resin and a polyethylene-based resin, or a copolymer of resins,
a natural or synthetic rubber, and
a composite material including at least one material selected from the synthetic resins and the copolymer and at least one material selected from the natural rubber and the synthetic rubber.

6. The method according to claim 2, wherein at least one of the foaming materials is selected from the group consisting of:
synthetic resins including an ethylene-vinyl acetate (EVA)-based resin and a polyethylene-based resin, or a copolymer of resins,
a natural or synthetic rubber, and
a composite material including at least one material selected from the synthetic resins and the copolymer and at least one material selected from the natural rubber and the synthetic rubber.

7. The method according to claim 1, wherein the interfacing material is selected from the group consisting of liquid phase materials, solid phase materials, and film-type materials.

8. The method according to claim 1, wherein the interfacing pattern is formed by one of process methods including a printing, a transcription, a coating, a deposition, a spraying, a cloth or other material attachment, and an inserting.

9. The method according to claim 1, wherein the interfacing material includes at least one foaming agent selected from foaming agents that are the same or different kinds of a foaming agent for at least one of the foaming materials.

10. The method according to claim 1, wherein in the step of forming the at least one interfacing pattern, two or more interfacing patterns are formed, and each of the interfacing patterns is formed using a same or different material.

11. The method according to claim 1, wherein the step of forming the cross-linked foam is performed either by using a pressure cross-linked foaming method or a normal pressure cross-linked foaming method.

12. The method according to claim 11, further comprising adding a material that is the same as or different from at least one of the foaming materials to a remaining space of a molding die before the step of forming the cross-linked foam when the step of forming the cross-linked foam is performed by using the pressure cross-linked foaming method.

13. The method according to claim 1, further comprising injecting air or liquid material into a space formed by the internally-formed surface of the cross-linked foam after the step of forming the cross-linked foam.

14. The method according to claim 1, further comprising re-molding the cross-linked foam after the step of forming the cross-linked foam.

15. The method according to claim 14, wherein the re-molding is performed together with one of materials that are the same as or different from the cross-linked foam.

16. The method according to claim 1, further comprising inserting at least one of materials that are the same as or different from at least one of the foaming materials into a space formed by the internally-formed surface after forming the cross-linked foam.

17. The method according to claim 14, further comprising inserting at least one of materials that are the same as or different from at least one of the foaming materials into a space formed by the internally-formed surface before re-molding the cross-linked foam.

18. The method according to claim 15, further comprising inserting at least one of materials that are the same as or different from at least one of the foaming materials into a space formed by the internally-formed surface before re-molding the cross-linked foam.

19. The method according to claim 16, further comprising re-molding the cross-linked foam after inserting the material into the space formed by the internally-formed surface.

20. The method according to claim 1, further comprising after the step of forming the cross-linked foam:
forming an air passage extending from a surface to a space formed by the internally-formed surface of the cross-linked foam; and
inserting one of materials that are the same as or different from at least one of the foaming materials into the space through the air passage.

21. The method according to claim 14, further comprising before the step of re-molding the cross-linked foam:
forming an air passage extending from a surface to a space formed by the internally-formed surface of the cross-linked foam; and
inserting one of materials that are the same as or different from at least one of the foaming materials into the space through the air passage.

22. The method according to claim 15, further comprising before the step of re-molding the cross-linked foam:
forming an air passage extending from a surface to a space formed by the internally-formed surface of the cross-linked foam; and inserting one of materials that are the same as or different from at least one of the foaming materials into the space through the air passage.

23. The method according to claim 16, wherein the different material from at least one of the foaming materials is selected from the group consisting of gas, liquid and solid materials.

24. The method according to claim 17, wherein the different material from at least one of the foaming materials is selected from the group consisting of gas, liquid and solid materials.

25. The method according to claim 1, further comprising rolling up the foaming material having the interfacing pattern thereon before the step of forming the cross-linked foam.

26. The method according to claim 2, further comprising rolling up the foaming material having the interfacing pattern thereon before the step of forming the cross-linked foam.

27. The method according to claim 1, further comprising adding a material different from the foaming material to the foaming material having the interfacing pattern before the step of forming the cross-linked foam.

28. The method according to claim 1, wherein the step of forming the cross-linked foam includes removing the foaming material including the interfacing pattern thereon from the cross-linked foam after foaming the foaming materials.

29. The method according to claim 1, wherein the internally-formed surface of the cross-linked foam defines a cavity in the cross-linked foam.

30. The method of according to claim 29, wherein the cavity has a pattern corresponding to the interfacing pattern.

* * * * *